United States Patent
Stoner, Jr. et al.

(10) Patent No.: US 9,808,754 B2
(45) Date of Patent: *Nov. 7, 2017

(54) AIR TREATMENT SYSTEM

(71) Applicant: Access Business Group International LLC, Ada, MI (US)

(72) Inventors: William T. Stoner, Jr., Ada, MI (US); Terry L. Lautzenheiser, Nunica, MI (US); Steve O. Mork, Lowell, MI (US); Sean T. Eurich, Holland, MI (US); Matthew J. Norconk, Grand Rapids, MI (US); Gregory K. Evans, Alto, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,105

(22) Filed: May 5, 2015

(65) Prior Publication Data

US 2015/0273381 A1 Oct. 1, 2015

Related U.S. Application Data

(63) Continuation-in-part of application No. 29/482,136, filed on Feb. 14, 2014, now Pat. No. Des. 739,512, (Continued)

(51) Int. Cl.
*B01D 46/00* (2006.01)
*B01D 46/42* (2006.01)

(52) U.S. Cl.
CPC ....... *B01D 46/001* (2013.01); *B01D 46/0019* (2013.01); *B01D 46/0023* (2013.01);
(Continued)

(58) Field of Classification Search
CPC ............ B01D 46/0086; B01D 46/4254; B01D 2273/30; Y10S 26/65; G06K 7/10207; G06K 7/01
(Continued)

(56) References Cited

U.S. PATENT DOCUMENTS 4,701,195 A   10/1987 Rosendall
4,737,173 A    4/1988 Kudirka et al.
(Continued)

FOREIGN PATENT DOCUMENTS

WO    2004014439    2/2004

OTHER PUBLICATIONS

The BioGS Ultra Quiet Air Purifier, www.rabbitair.com/biogs-2-ultra-quiet-hepa-air-purifier.aspx, pp. 1-3, dated Feb. 4, 2014.

*Primary Examiner* — Duane Smith
*Assistant Examiner* — Minh-Chau Pham
(74) *Attorney, Agent, or Firm* — Warner Norcross & Judd LLP

(57) ABSTRACT

An air treatment system having an improved control system. The control system may include a dynamic "dead front" display that varies the display based on mode of operation. The display may include capacitive touch sensors and include an array of capacitive film segments or traces integrated into the display. The control system may include a self-contained electronics module that can be tested and calibrated before installation in the ATS. A dust sensor assembly may be integrated into the electronics module. The front cover may be attached with a mechanical attachment at the top and a magnetic attachment on the bottom. The ATS may include a filter retainer assembly with a rotating clip configured to perform in a cam-like manner to firmly clamp the particulate filter and carbon filter in place.

31 Claims, 43 Drawing Sheets

Related U.S. Application Data and a continuation-in-part of application No. 29/490,049, filed on May 6, 2014, now Pat. No. Des. 765,234.

(60) Provisional application No. 61/989,089, filed on May 6, 2014.

(52) U.S. Cl.
CPC ......... *B01D 46/0086* (2013.01); *B01D 46/42* (2013.01); *B01D 46/4254* (2013.01)

(58) Field of Classification Search
USPC ..... 55/471, 472, 473, DIG. 34; 96/415, 416; 261/DIG. 65; 340/10.1, 10.5
See application file for complete search history.

(56) References Cited

U.S. PATENT DOCUMENTS

| | | | |
|---|---|---|---|
| D296,129 S | 6/1988 | Goodrich et al. | |
| D388,510 S | 12/1997 | Rick et al. | |
| 5,803,940 A | 9/1998 | Rick et al. | |
| 5,925,172 A | 7/1999 | Rick et al. | |
| 6,447,586 B1* | 9/2002 | Campbell | B01D 46/0086 |
| | | | 261/DIG. 65 |
| 6,673,250 B2 | 1/2004 | Kuennen et al. | |
| D503,972 S | 4/2005 | Pippel et al. | |
| D507,339 S | 7/2005 | Shapiro | |
| D529,154 S | 9/2006 | Koike | |
| D550,343 S | 9/2007 | Chen | |
| D553,718 S | 10/2007 | Shapiro | |
| 7,316,732 B2 | 1/2008 | Taylor, Jr. et al. | |
| D572,352 S | 7/2008 | Chiu | |
| D575,857 S | 8/2008 | Chiu | |
| D578,192 S | 10/2008 | Yoo et al. | |
| D584,805 S | 1/2009 | Yoo et al. | |
| D589,132 S | 3/2009 | Chiu | |
| D604,401 S | 11/2009 | Chun et al. | |
| 7,629,548 B2 | 12/2009 | Pippel et al. | |
| 7,679,879 B2 | 3/2010 | Furuhashi et al. | |
| D616,081 S | 5/2010 | Chiu | |
| D634,829 S | 3/2011 | Niki | |
| 7,914,598 B2 | 3/2011 | Evans et al. | |
| D643,520 S | 8/2011 | Choi | |
| D651,706 S | 1/2012 | Sidell | |
| D660,948 S | 5/2012 | Varma | |
| D681,789 S | 5/2013 | Chiu | |
| 8,689,603 B2 | 4/2014 | Niezgoda et al. | |
| D716,425 S | 10/2014 | Tai et al. | |
| D723,149 S | 2/2015 | Huang et al. | |
| 2001/0029728 A1* | 10/2001 | Massey | B01D 46/0023 |
| | | | 55/471 |
| 2002/0073664 A1* | 6/2002 | Campbell | F24F 13/28 |
| | | | 55/471 |
| 2004/0118288 A1* | 6/2004 | Kim | A61L 9/16 |
| | | | 96/417 |
| 2004/0118289 A1* | 6/2004 | Chang | B01D 46/0023 |
| | | | 96/417 |
| 2004/0182244 A1* | 9/2004 | Wu | B01D 46/26 |
| | | | 96/384 |
| 2007/0012185 A1 | 1/2007 | Taylor, Jr. et al. | |
| 2007/0012192 A1 | 1/2007 | Pippel et al. | |
| 2007/0013787 A1 | 1/2007 | Pippel et al. | |
| 2008/0028733 A1* | 2/2008 | Paterson | B01D 46/0002 |
| | | | 55/471 |
| 2012/0234166 A1 | 9/2012 | Markham et al. | |
| 2013/0044459 A1 | 2/2013 | Miles et al. | |
| 2013/0113606 A1* | 5/2013 | Etheridge | G06K 19/07345 |
| | | | 340/10.1 |
| 2013/0285797 A1* | 10/2013 | Paulsen | G06K 7/10207 |
| | | | 340/10.5 |
| 2013/0314900 A1* | 11/2013 | Timmerman | G09F 13/04 |
| | | | 362/97.1 |

* cited by examiner

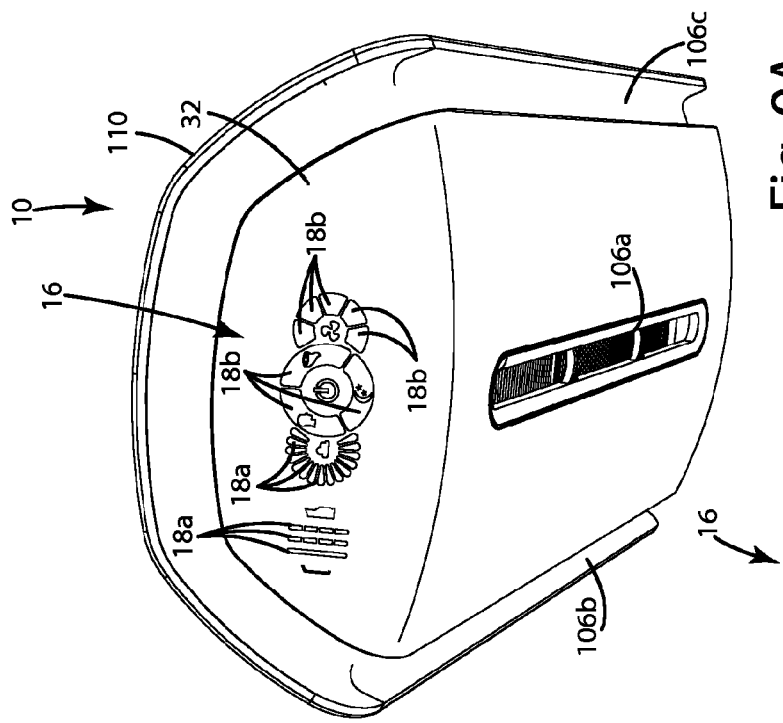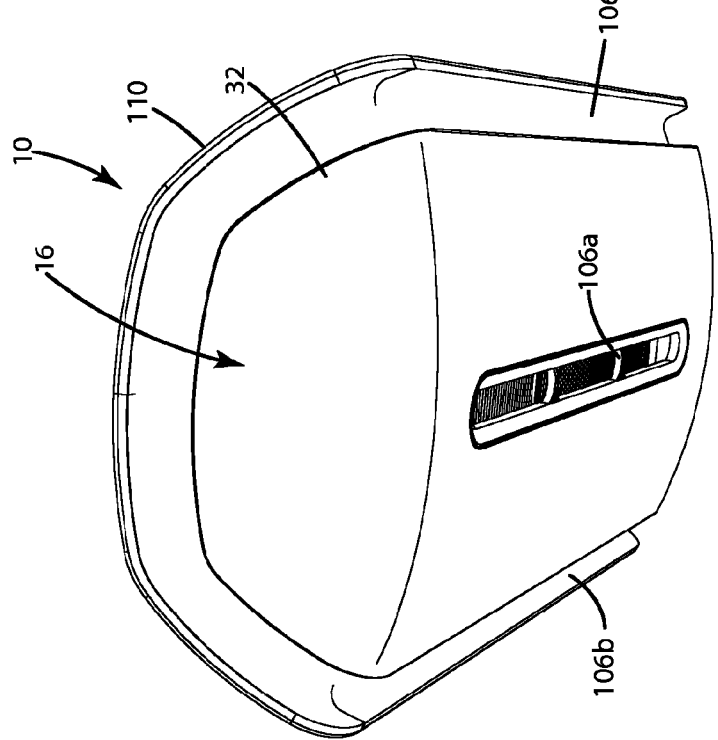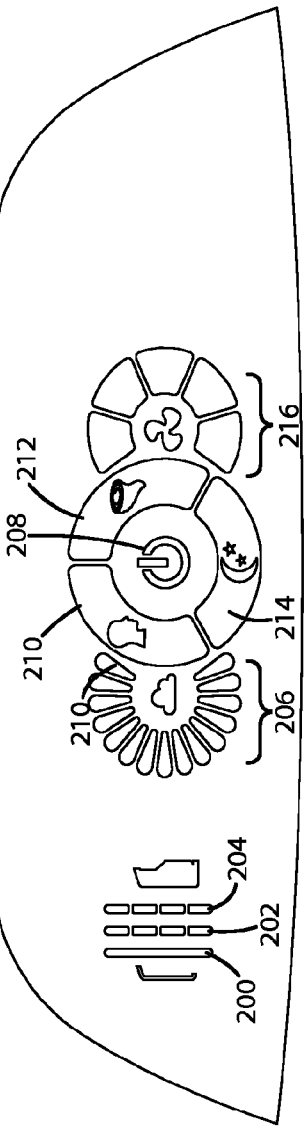

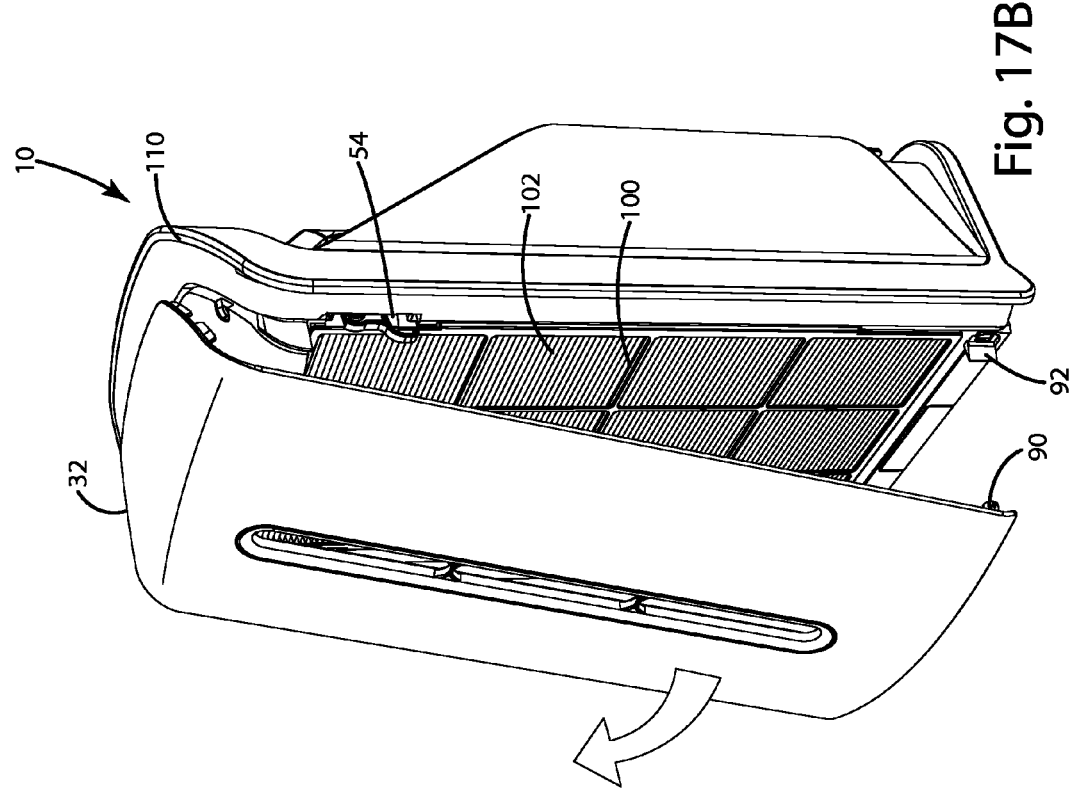
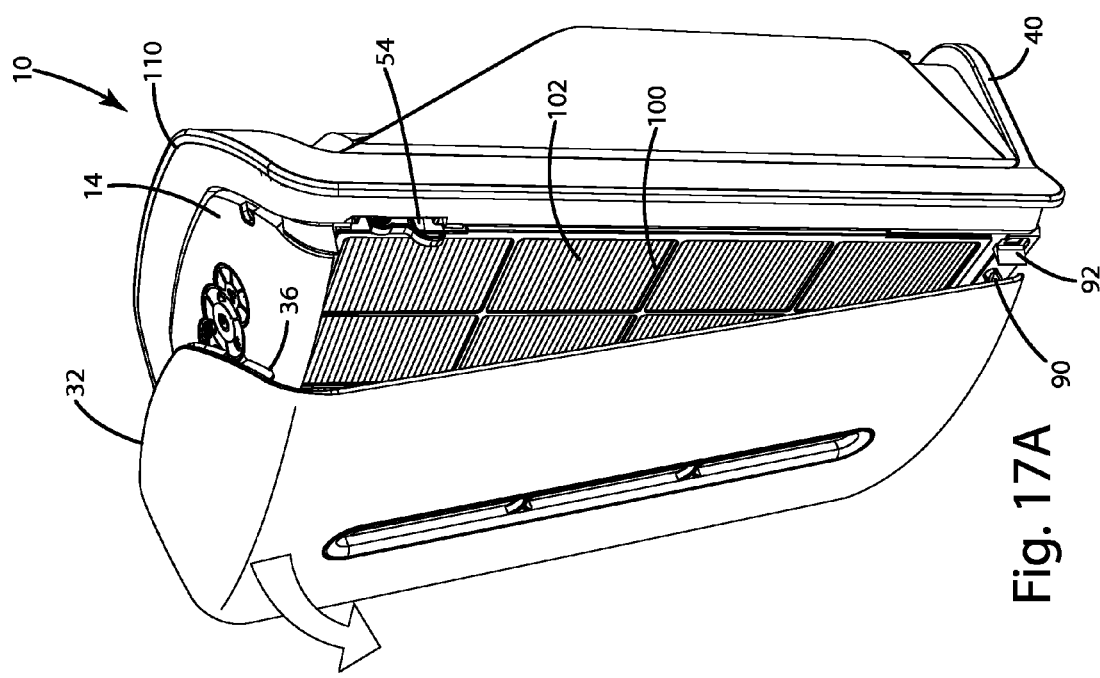
Fig. 17A
Fig. 17B

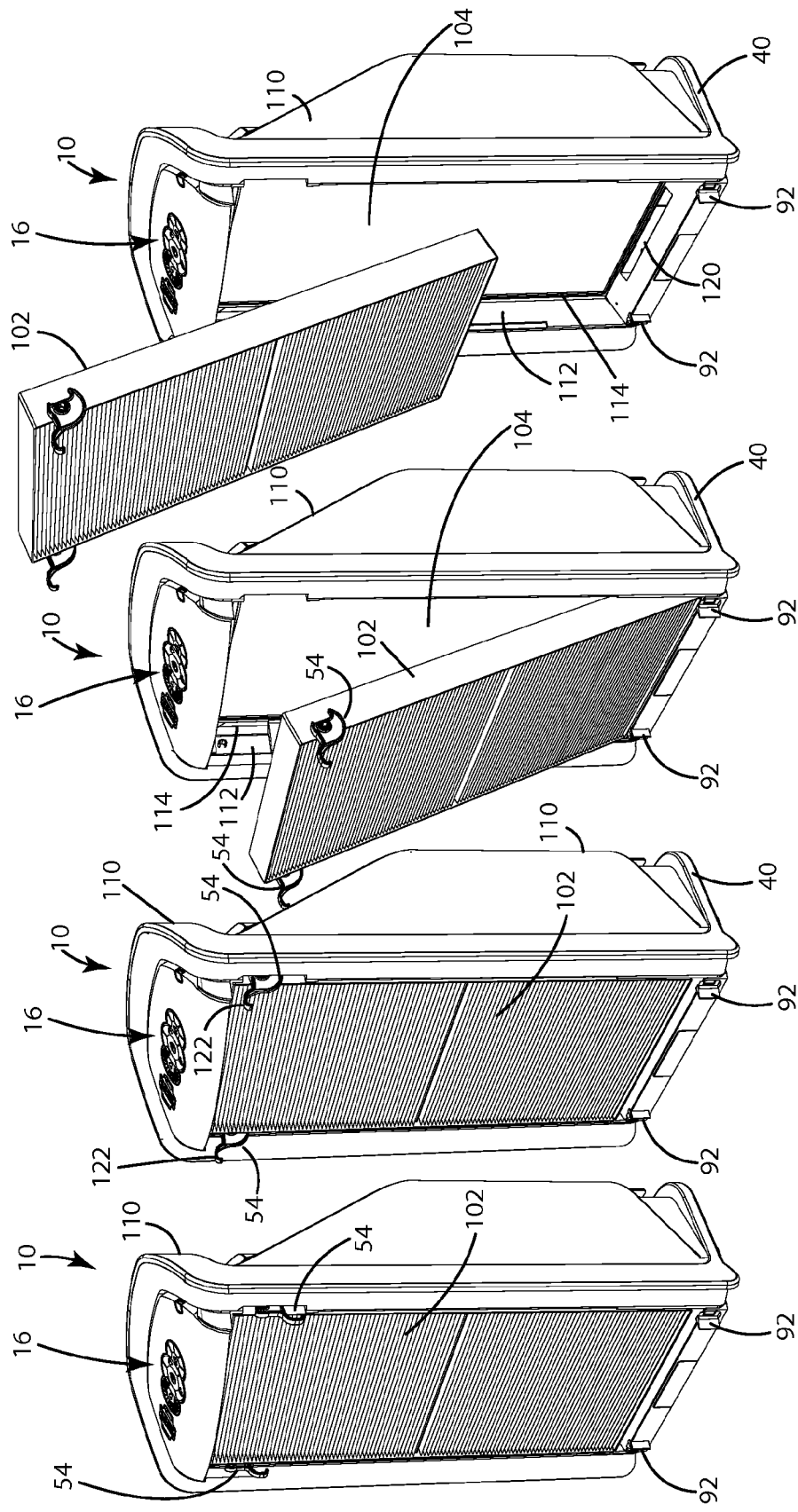

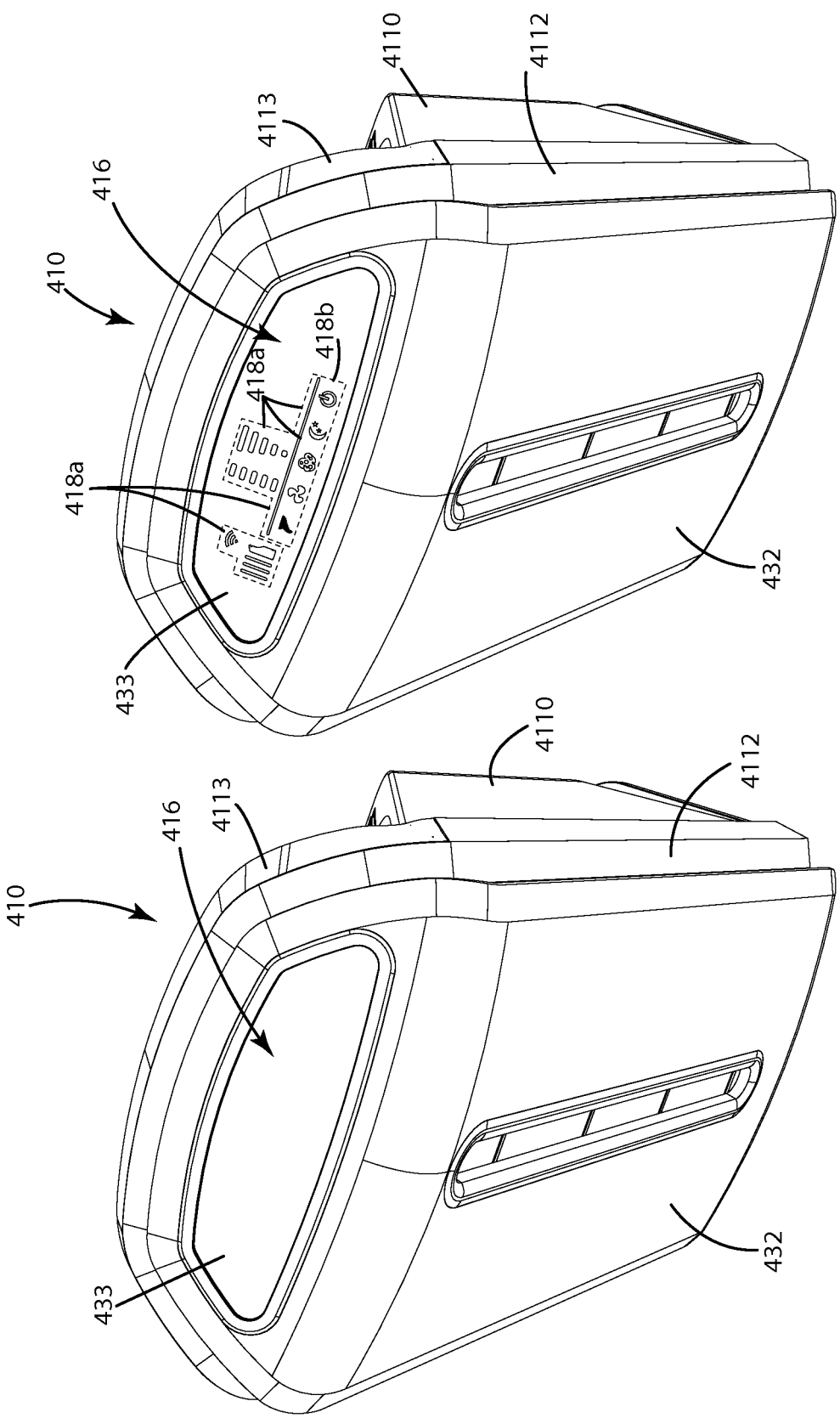

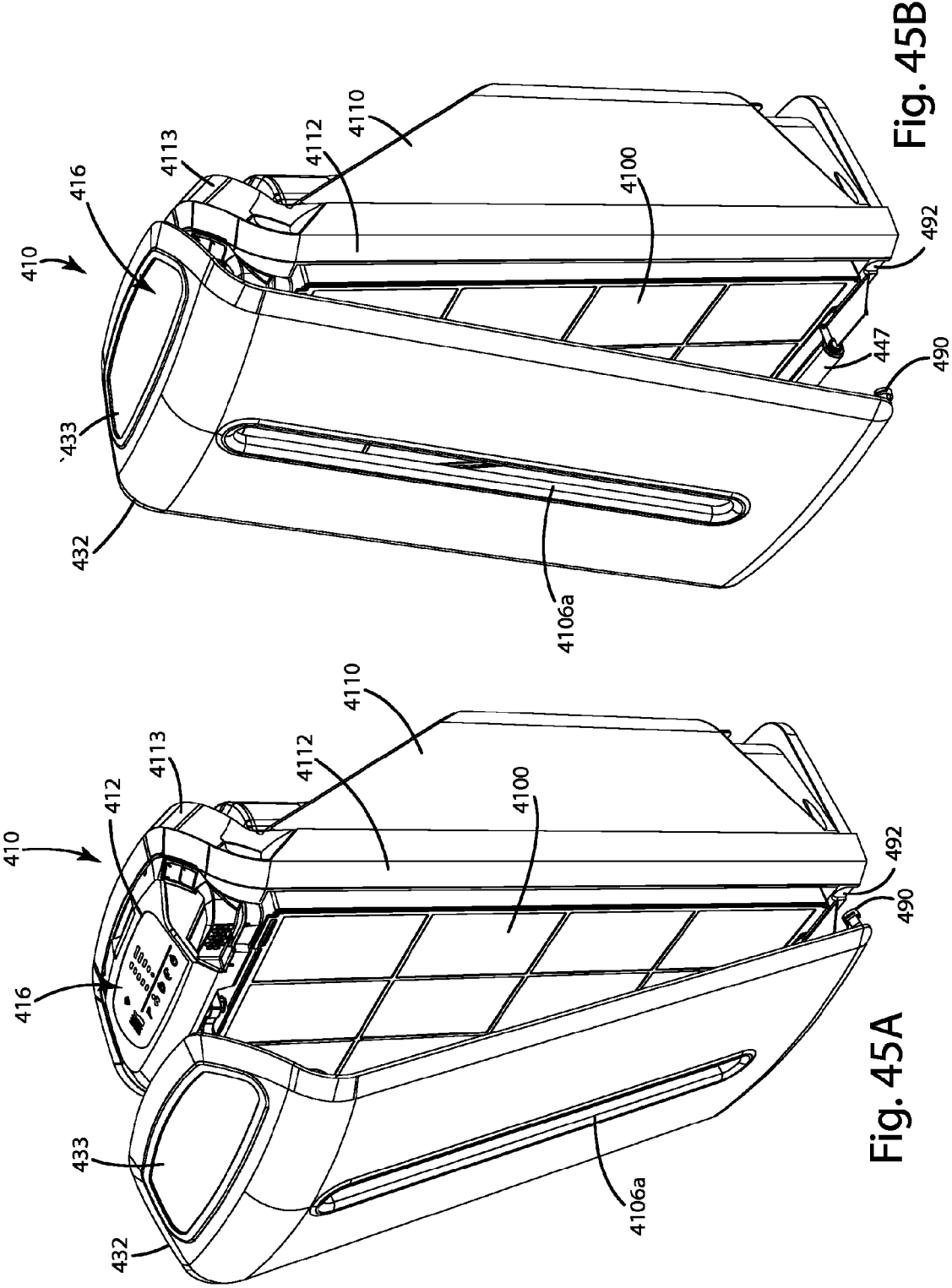

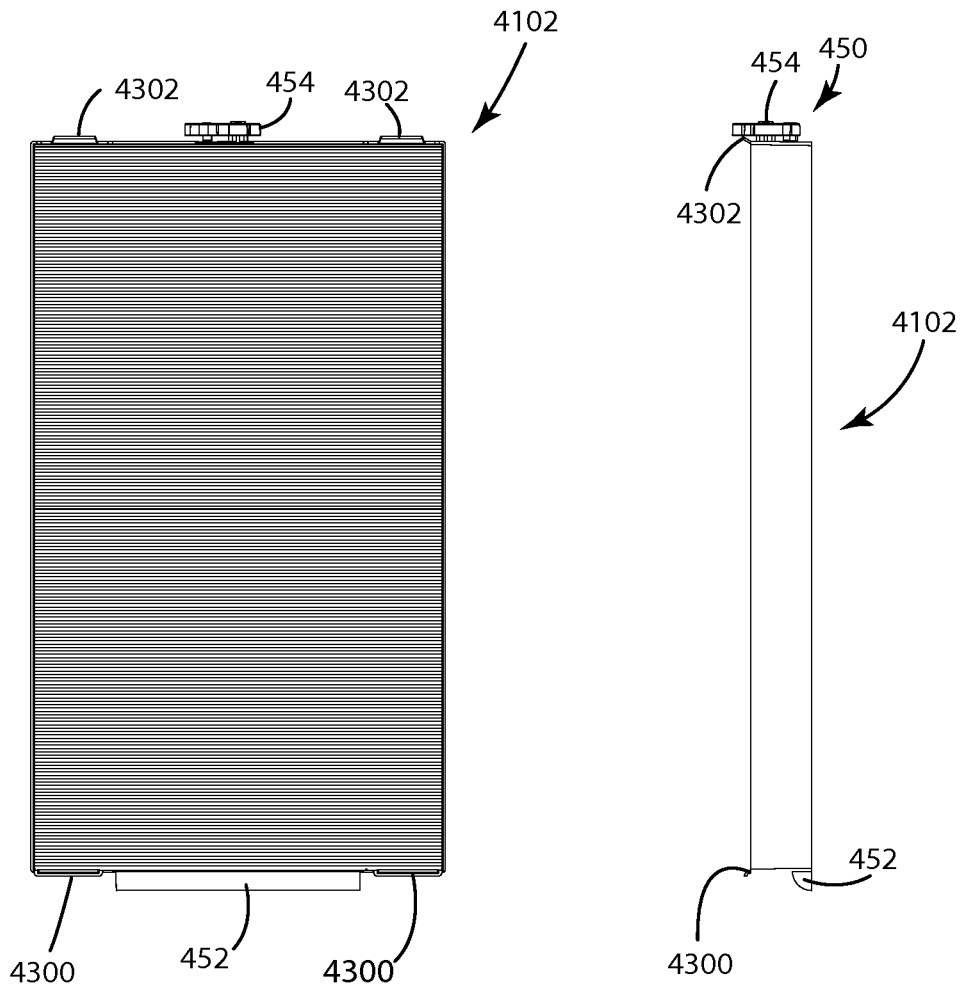
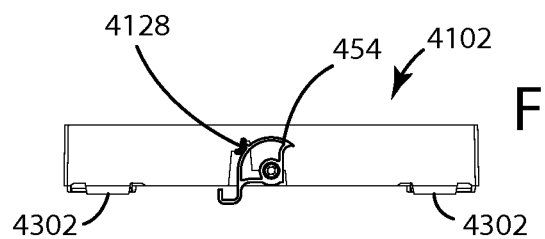
Fig. 51B    Fig. 51C
Fig. 51D

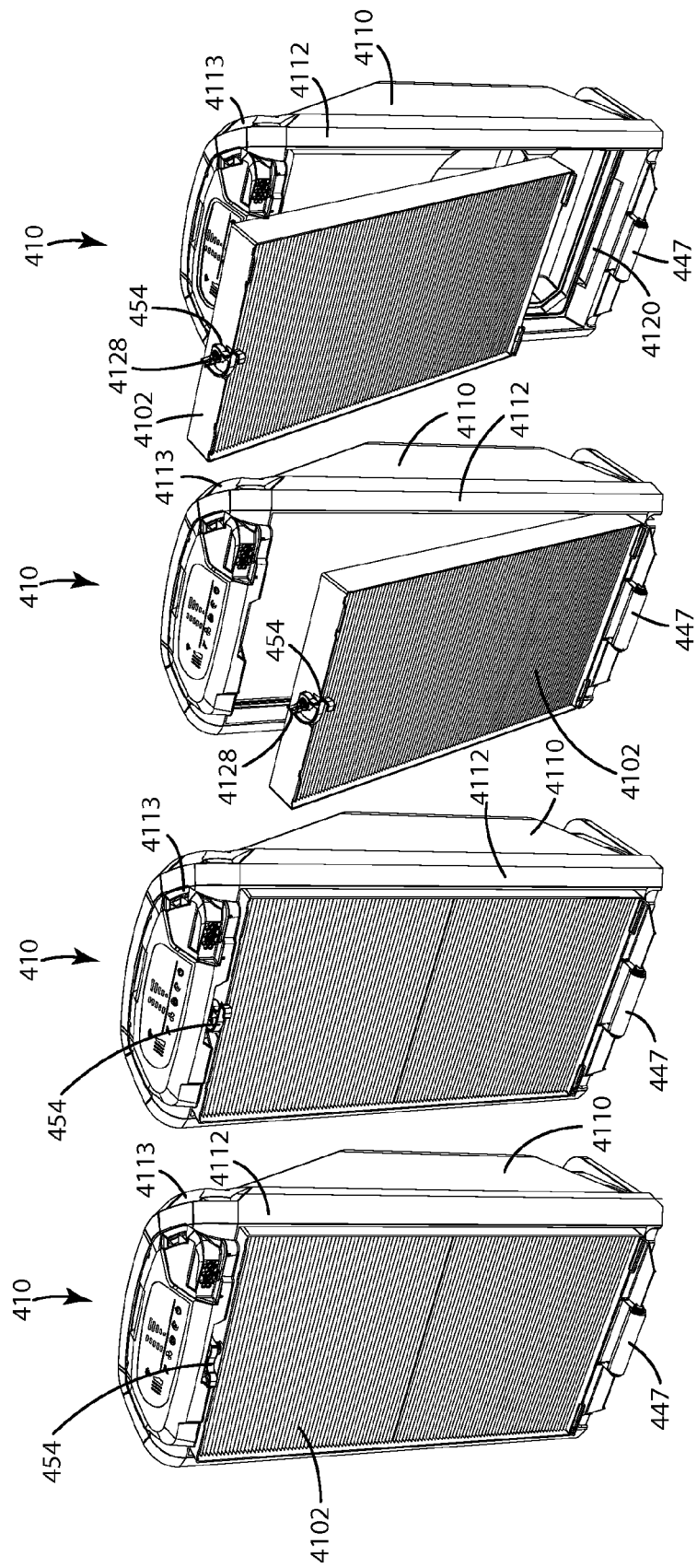

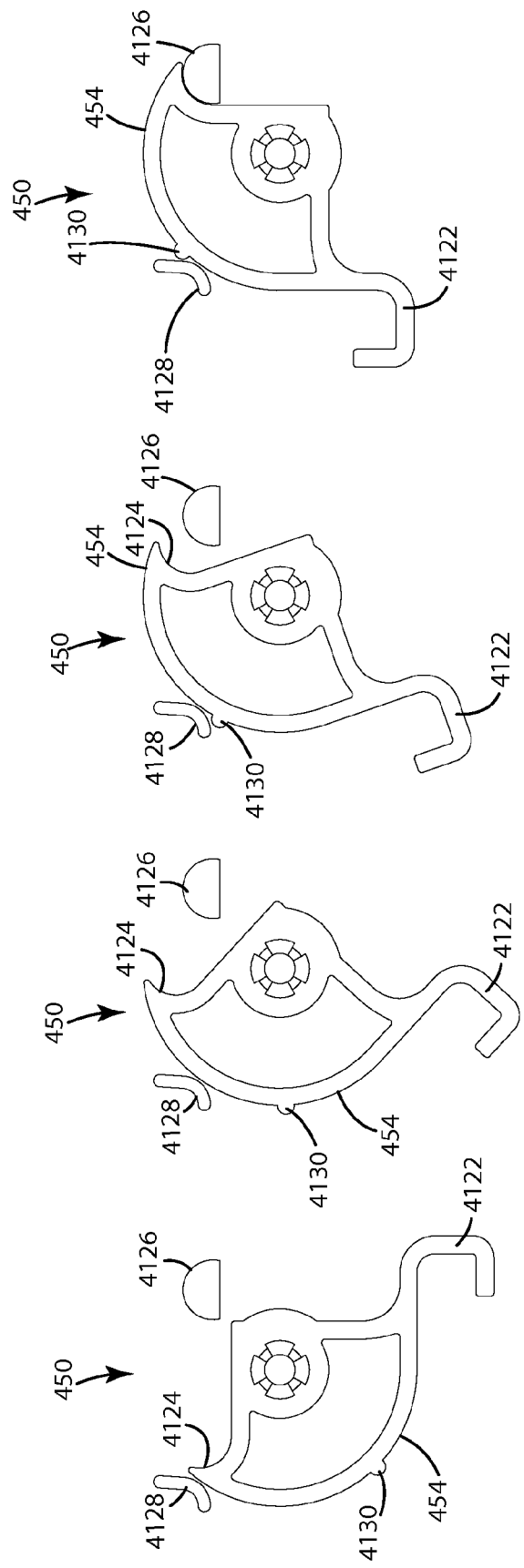

AIR TREATMENT SYSTEM

CROSS REFERENCE TO RELATED PATENT APPLICATIONS

This patent application claims benefit of 61/989,089 filed on May 6, 2014 and is a continuation-in-part of U.S. patent application Ser. No. 29/482,136 filed on Feb. 14, 2014, now Patent No. D739512, and is a continuation-in-part of U.S. patent application Ser. No. 29/490,049 filed on May 6, 2014, now Patent No. D765234.

BACKGROUND OF THE INVENTION

The present invention relates to air treatment systems and more particularly to a portable room air filtering system.

Air treatment systems continue to grow in popularity as concerns about air quality remain an issue of significant concern. This growth has led to an increase in the use of commercial and residential air treatment systems. A conventional residential air treatment system is a self-contained unit that can be placed in a room where it is desirable to treat the air. Residential air treatment systems generally operate by drawing room air into them, treating the air with one (or more) technologies, and releasing the treated air back into the room. The treated air contains a lower concentration of airborne contaminants than in the room at large. The treated air mixes with the room air, and thus, the concentration of contaminants in the room air is reduced.

Air treatment systems are available with different types of control systems. The control systems provide different methodologies for controlling operation of the air treatment system and for allowing operator input. The design and configuration of the control system can have a significant impact on the function and aesthetic appeal of the air treatment system.

Many conventional air treatment systems include a series of specialized filters that are tailored to address specific air quality issues. For example, residential air treatment systems often include a prefilter, a particulate filter and an odor filter. The function of the prefilter is typically to remove relatively large elements from the air, such as hair and agglomerations of dust. A particulate filter typically functions to remove smaller airborne particles. Particulate filters are available in a variety of configurations. For example, a particulate filter may include a pleated material with non-woven fibers that capture particles and are effective as a HEPA filter. Odor filters are also available in a variety of types and configurations. Many odor filters include activated carbon that adsorbs a range of impurities, including without limitation many organic chemicals. Conventional particulate filters and carbon filters have a limited life and require occasional replacement. The structure of the air treatment system and the mechanisms used to secure the filters within the air treatment system can have a meaningful impact of the effectiveness of the system and can dramatically affect the complexity and amount of effort required to replace the filters.

There are other aspects that may have an impact on function and commercial success of an air treatment system. For example, convenience features, such as power cord management, and mobility features, such as feet and handles, can affect the user experience.

SUMMARY OF THE INVENTION

The present invention provides an air treatment system having an improved control system. In one embodiment, the control system includes a "dead front" display that provides the ATS with a clean and simple appearance, and that facilitates an improved control experience. The display may include a plurality of informative display elements and a plurality of touch sensors that are selectively illuminated by an underlying arrangement of light sources, such as LEDs. To produce the desired graphics, each light source may be covered by a screen having a mask layer and a diffuser layer. A translucent cover may be disposed over the control system to hide the underlying structure and allow the graphic images to be seen only when illuminated. The translucent cover may be integrated into a removable front cover that closes the front of the ATS. In one embodiment, the electronics module includes a light duct assembly have a plurality of individual ducts joined side-by-side to shepherd light from the light sources to the corresponding display elements.

In one embodiment, the touch sensors are capacitive sensors. In such embodiments, a capacitive film, such as a transparent PET film coated with indium tin oxide, may be incorporated into the structure overlying each light source. For example, each light source may be covered by a laminated screen that includes a mask layer and a diffusing layer, and the capacitive film may be implemented as an additional layer of the screen. As another example, the capacitive film may be separate from the screen and may be positioned above or below the screen where it is capable of sensing the presence of an operator's finger. In an alternative embodiment, conductive traces may be incorporated into the structure overlying each light source to function as capacitive sensor. For example, a printed circuit board ("PCB") may be positioned over a light duct array. The PCB may define openings over each individual light duct and may include a trace around each opening that is associated with a light duct for an input display element. The PCB may also include a relatively large conductive trace that extends over a significant portion of the face of the PCB to provide a capacitive sensor that is sensitive enough to function as a proximity sensor. The proximity sensor may be configured to sense the presence of an operator (e.g. an operator's hand) within approximately two feet of the display.

In one embodiment, the ATS has a removable front cover that overlies the display, and the control system is configured to recognize touches differently depending on whether or not the cover is installed or removed. This allows a user to control the system whether or not the cover is in place. In one embodiment, the control system is configured to enable a different set of control options depending on whether or not the cover is installed. For example, the control system may offer a reduced set of control options and/or additional control options when the cover is removed. The control system may recognize whether the cover is installed or removed using one or more of the capacitive touch sensors, such as the proximity sensor.

In one embodiment, the control system includes a dust sensor that is integrated into the electronics module. The dust sensor may be arranged so that air is drawn into the dust sensor by virtue of the partial vacuum created by the ATS blower. After passing through the dust sensor, the air is passed through the filters and returned to the room in a treated state. Alternatively, the dust sensor may be arranged so that air is drawn into the dust sensor by virtue of the flow of treated air discharged by the ATS.

In another aspect, the present invention provides a front cover with a magnetic interlock that allows for easy installation and removal, as well as allowing the control system to recognize whether or not the cover is installed. In one embodiment, the front cover includes one or more mechanical attachment points at the top and one or more magnetic attachment points at the bottom. The mechanical attachment point may include a lip that is configured to catch on a corresponding structure in the ATS housing. For example, the lip may catch on the electronics module to help ensure true registration between the front cover and the electronics module. The size, shape and configuration of the catch may vary. For example, it may extend generally across the width of the front cover or it may extend across only a central portion of the front cover. As another example, the lip may be integrally formed with the front cover or may be a separate component that is attached to the front cover after manufacture. The front cover may be manufactured from a translucent plastic that is configured to provide the appearance of opacity, while allowing light from the display to shine through. In one embodiment, the exposed surface of the front cover may be covered with a film that is applied using an in-mold film process. In another embodiment, the exposed surface may be covered with a thin layer of paint using a spray process or a direct transfer process (i.e. silk screen or pad printing, or thermal film transfer). Alternatively, the front cover may be generally opaque and may include a window overlying the display. The window may be manufactured from a translucent plastic that is configured to provide the appearance of opacity, while allowing light from the display to shine through. In one embodiment, the exposed surface of the window may be covered with a film that is applied using an in-mold film process. In another embodiment, the exposed surface of the window may be covered with a thin layer of paint using a spray process or a direct transfer process (i.e. silk screen or pad printing, or thermal film transfer).

In another aspect, the present invention provides an ATS housing with interchangeable bases. The number and style of bases may vary, but in one embodiment the ATS may include a plurality of bases that provide different structure for receiving the electrical cord and/or different feet for supporting the ATS. With regard to the electrical cord, the ATS may be capable of receiving a base with a structure for manually wrapping an electrical cord or a retractable cord assembly with an automatic take-up reel. With regard to the feet, the base may include fixed feet, casters, wheels and/or a single elongated roller. As an alternative to interchangeable bases, the base may be integrated into the ATS and may include feet and a single elongated roller. The ATS may include a handle at the top rear of the housing. In one embodiment, the handle may extend essentially the full width of the ATS, thereby allowing the ATS to be grabbed in the center by a single hand or grabbed towards opposite sides by two hands.

In another aspect, the present invention provides a filter retainer assembly that provides for easy and secure installation of the filters. In this embodiment, the ATS includes a particular filter and an activated carbon filter. The activated carbon filter is fitted into the filter housing first and the particulate filter is fitted into the filter housing over the carbon filter. The particulate filter is secured to the ATS housing at its periphery by one or more clips that interact with corresponding structure in the ATS. The clip or clips may be configured to perform in a cam-like manner to firmly clamp the particulate filter and carbon filter in place. The ATS may also include a prefilter that is snap-fitted onto the particulate filter. The prefilter may include a coarse filter media that is supported by a grid-like prefilter retainer.

The present invention provides an ATS with an improved control system. The use of a self-contained electronic module allows testing and calibrating of the electronics before installation and assembly of the ATS. It also facilitates replacement of the electronic module, if necessary. For example, the use of an on-board dust sensor with integral ducting eliminates the need to separately install a dust sensor and to wire the dust sensor to the electronics module. The control system includes a "dead front" display with integral capacitive touch sensors. This allows a completely sealed electronics module with no moving parts providing increased reliability. The use of a "dead front" display allow a dynamic display that varies from mode to mode—not only providing improved aesthetics, but also simplifying the display to facilitate easy operation from one mode to another. The use of LEDs with multiple color or brightness options allows the display elements to be illuminated in different configurations depending on use. Wireless connectivity allows control and data exchange with remote devices without requiring light of sight or infrared transmissive plastic, such as smart phones and tablets, including data logging and monitoring of historical trends. RFID tags may provide improved tracking of filter life and product efficacy, and may allow filter life reset without operator intervention. The dust sensor may be used not only to control blower speed, but also to provide more accurate filter life calculations. In another aspect, the ATS includes a front panel that can be easily removed and installed with one hand, without the need to deeply bend or kneel to reach the attachment points. By being at least partially translucent or having a partially translucent window, the front cover can cover the electronics module to provide a "dead-front" display. Further, the side and center inlets allow air to freely enter the ATS. In another aspect, the provision of interchangeable bases allows the ATS to be easily customized for different applications and for customers with different preferences. This provides more flexibility and rapid changeover between models with different features. For example, the type of feet can be varied and the type of cord management feature can be varied. The use of a one-piece handle that extends roughly the width of the ATS provides various benefits. It allows an operator to manipulate the ATS with one or two hands at multiple wrist/hand angles. It can also be formed to provide structural reinforcement underneath a cantilevered feature of the ATS. In one embodiment, the base can include casters or a central roller that allow the ATS to be easily moved with a single hand engaging the center of the handle. In another aspect, the present invention provides a simple and effective clip arrangement for securing the particulate filter to the ATS. By positioning the clip or clips toward the top of the filter and the catch toward the bottom, the filter can be securing or released without deep bending or kneeling. The clip or clips may provide an improved seal by automatically draws the filter into tighter engagement with the sealing surface as they are engaged. The clip or clips also work in only one direction, thereby ensuring that the filter is installed in the correct orientation.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 8 is a perspective view of a portion of the ATS showing the "dead front" display with no elements illuminated.

FIG. 9A is a front view of the display showing the outline of all display elements.

FIG. 9B is a front view of the display showing all display elements illuminated in the "on" state.

FIGS. 17A-B are illustrations showing alternative methods for removing the front cover.

FIGS. 28A-D are various drawings showing various stages of removal of the particulate filter.

FIG. 40 is a perspective view of the alternative ATS showing the "dead front" display with no elements illuminated.

FIG. 41 is a perspective view of the alternative ATS showing the "dead front" display with the outline of all display elements.

FIGS. 45A-B are illustrations showing alternative methods for removing the front cover of the alternative ATS.

FIG. 51B is a front view of the particulate filter.

FIG. 51C is a side elevational view of the particulate filter.

FIG. 51D is a top plan view of the particulate filter.

FIGS. 52A-D are various drawings showing different stages of removal of the particulate filter.

FIGS. 53A-D are a series of drawings representing actuation of an alternative filter latch.

DESCRIPTION OF THE CURRENT EMBODIMENT

A. Overview

Figure 1:
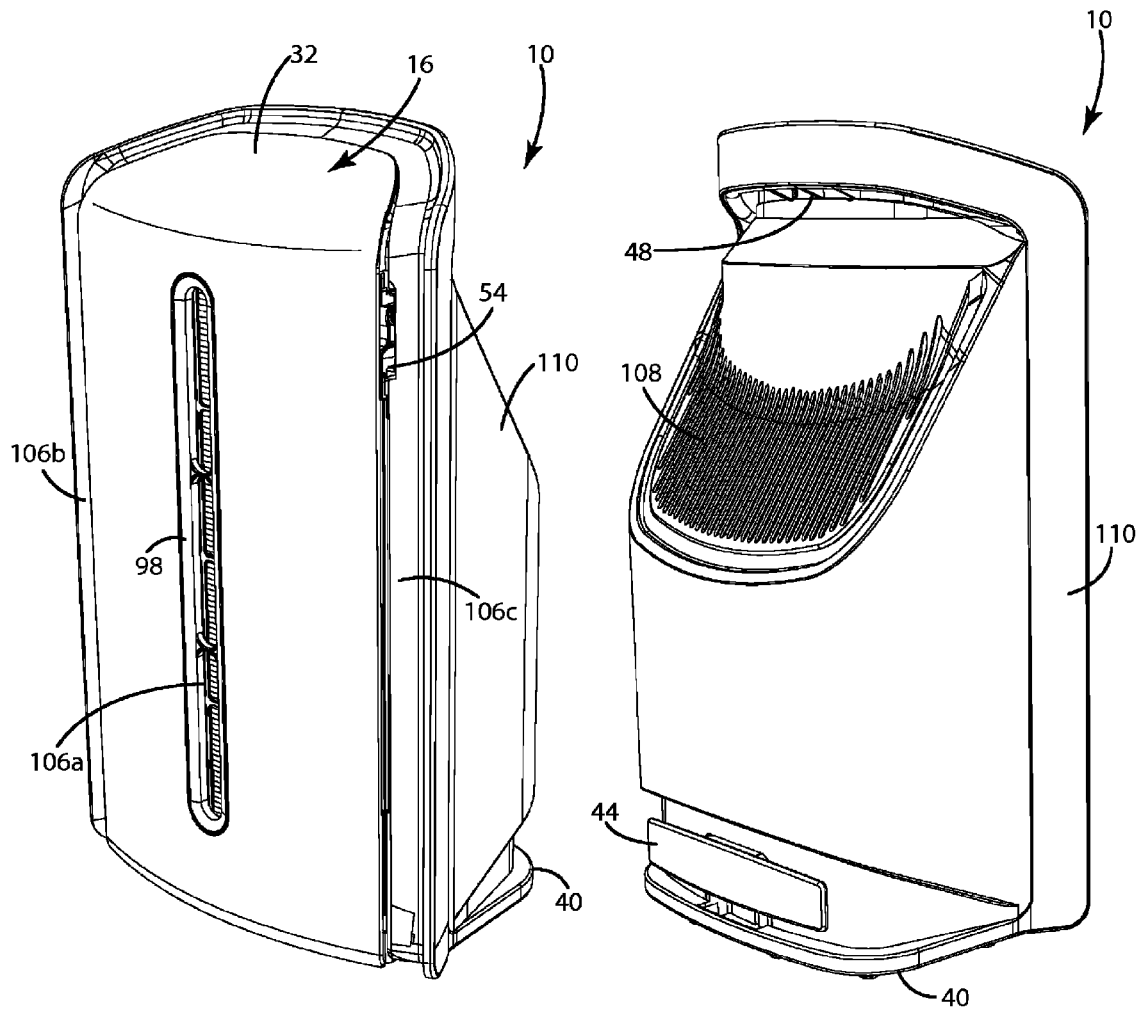
FIG. 1A is a front perspective view of an ATS in accordance with an embodiment of the present invention.
FIG. 1B is a rear perspective view of the ATS.

An air treatment system ("ATS") in accordance with an embodiment of the present invention is shown in FIG. 1. The ATS 10 of the illustrated embodiment generally includes a prefilter 100, a particulate filter 102 and an activated carbon filter 104. The ATS 10 also includes a blower 56 for drawing air from the environment into the ATS 10, moving the air through the filters and returning the filtered air to the environment.

The ATS 10 of the illustrated embodiment includes a control system 12 having an electronics module 14 that provides a "dead front" display 16. The display 16 of this embodiment includes a plurality of display elements 18 that can be selectively illuminated by the control system 12 to provide dynamic content. Some of the display elements 18 may include a touch sensor 20 that allows operator input. In this embodiment, the electronics module 14 includes a plurality of light sources 22, such as LEDs, each being uniquely assigned to a display element 18. Each light source 22 may be covered by a screen 24 having a mask layer 26 and a diffuser layer 28. Each touch sensor 20 may also include a capacitive film 30 positioned over the light source 22. In this embodiment, the "dead front" appearance may be created by a translucent front cover 32 that hides the underlying structure and allows the display elements 18 to be seen only when illuminated.

In another aspect, the front cover 32 is secured to the ATS 10 housing 34 using a combination of mechanical and magnetic attachment points. The mechanical attachment point of the illustrated embodiment includes a lip 36 at the top of the front cover 32 and a pair of magnets 90 at the bottom of the front cover 32. The lip 36 is configured to catch on corresponding structure in the ATS housing 110. In use, the combination of mechanical and magnetic attachment points allows the front cover 32 to be easily removed and installed by an operator in the standing position.

Figure 10:
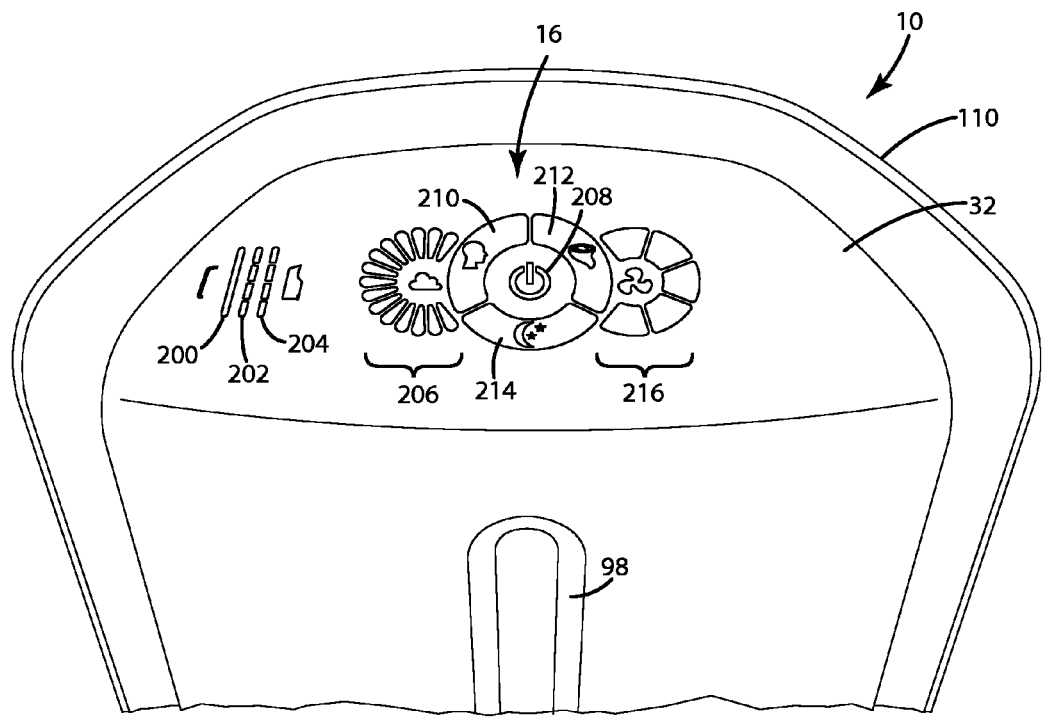
FIG. 10 is a perspective view of a portion of the ATS showing the "dead front" display showing various elements illuminated in different states.
Figure 11:
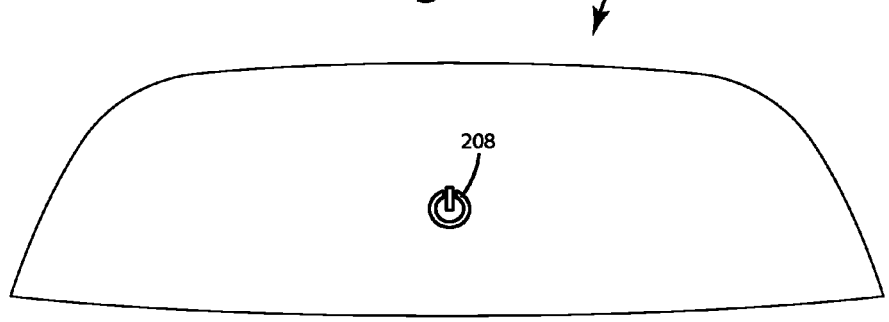
FIG. 11 is a front view of the display when powered off.
Figure 12:
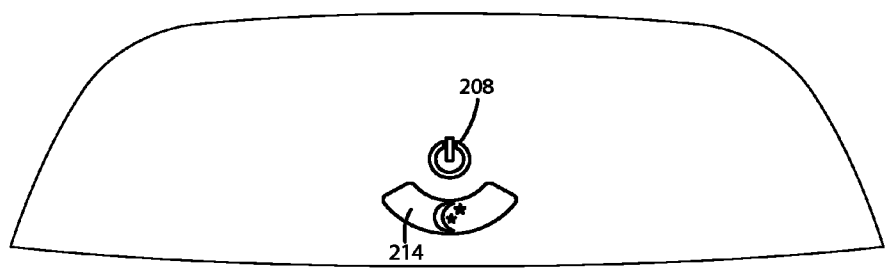
FIG. 12 is a front view of the display when in the night mode.
Figure 25:
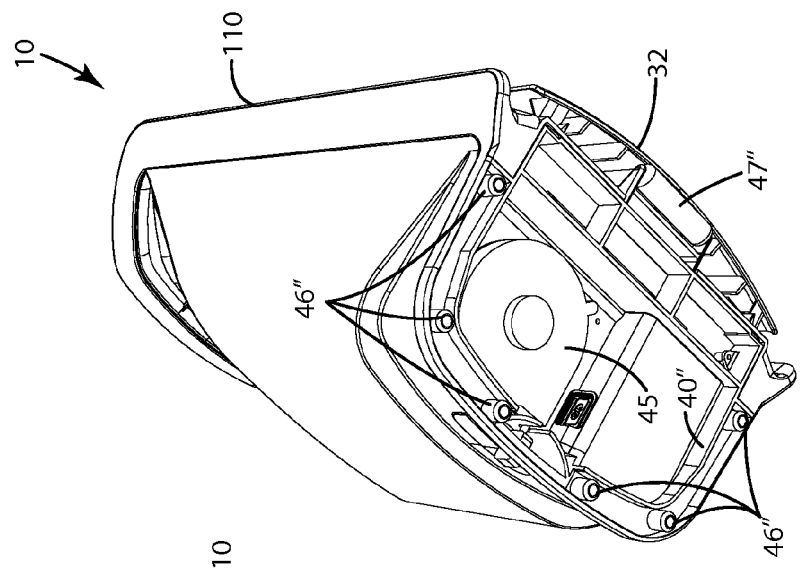
FIG. 25 is a bottom perspective view showing a base with fixed feet and a roller.
Figure 24:
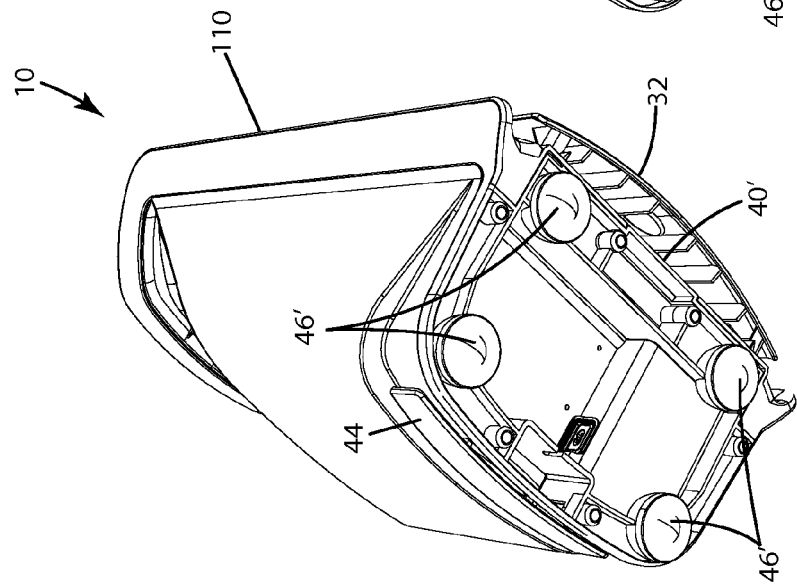
FIG. 24 is a bottom perspective view showing a base with casters.
Figure 23:
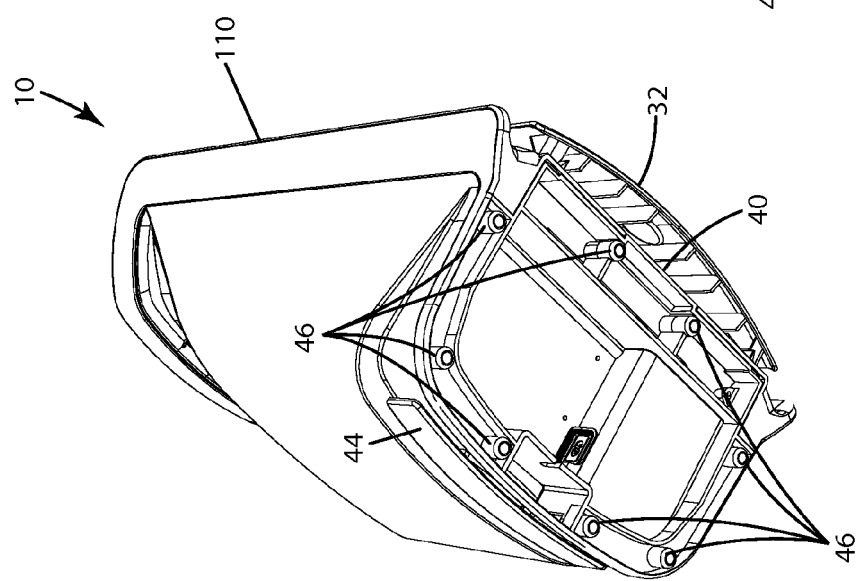
FIG. 23 is a bottom perspective view showing a base with fixed feet.
Figure 26:
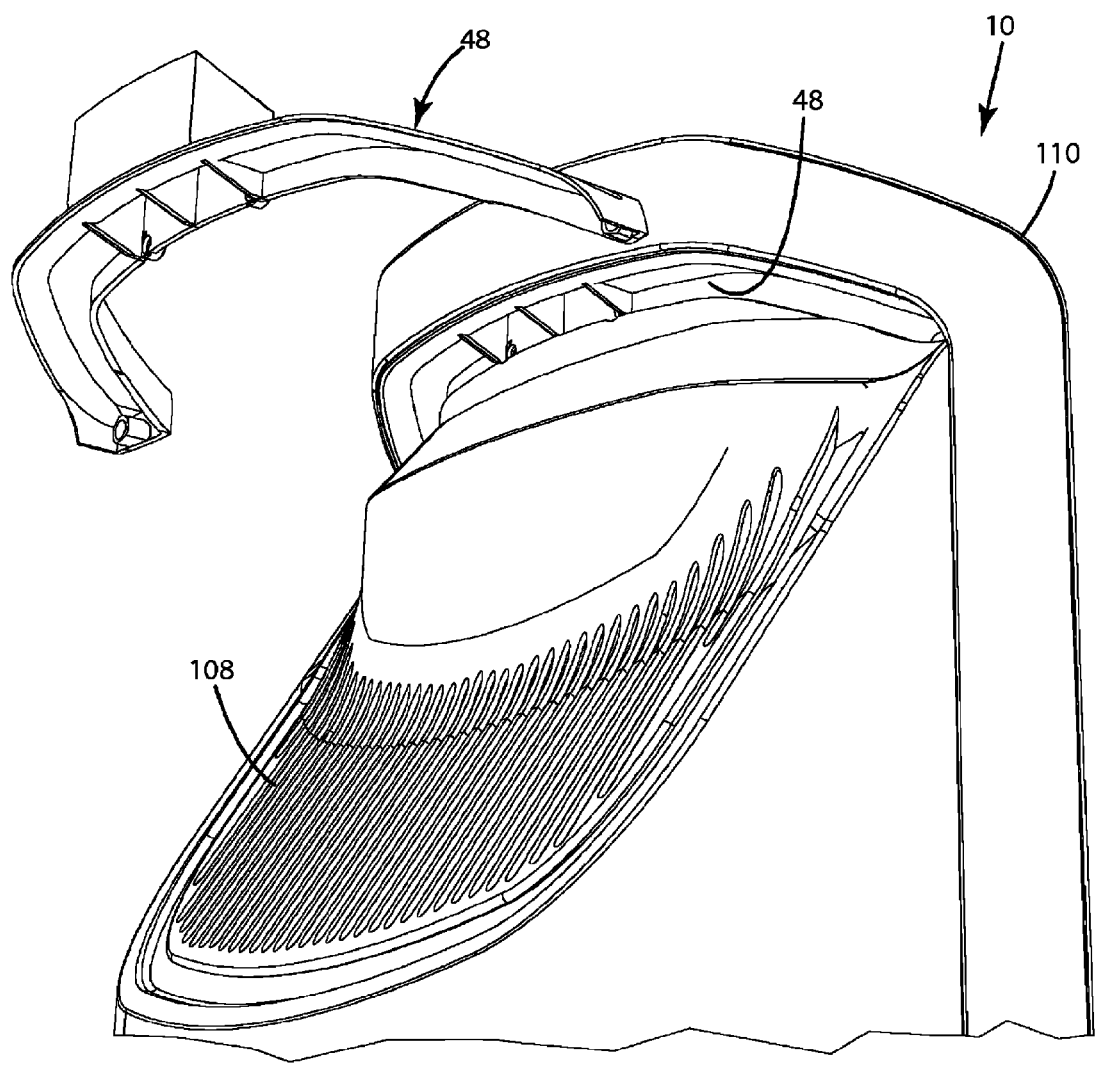
FIG. 26 is a perspective view of a handle and a portion of the ATS including the handle.
Figure 27:
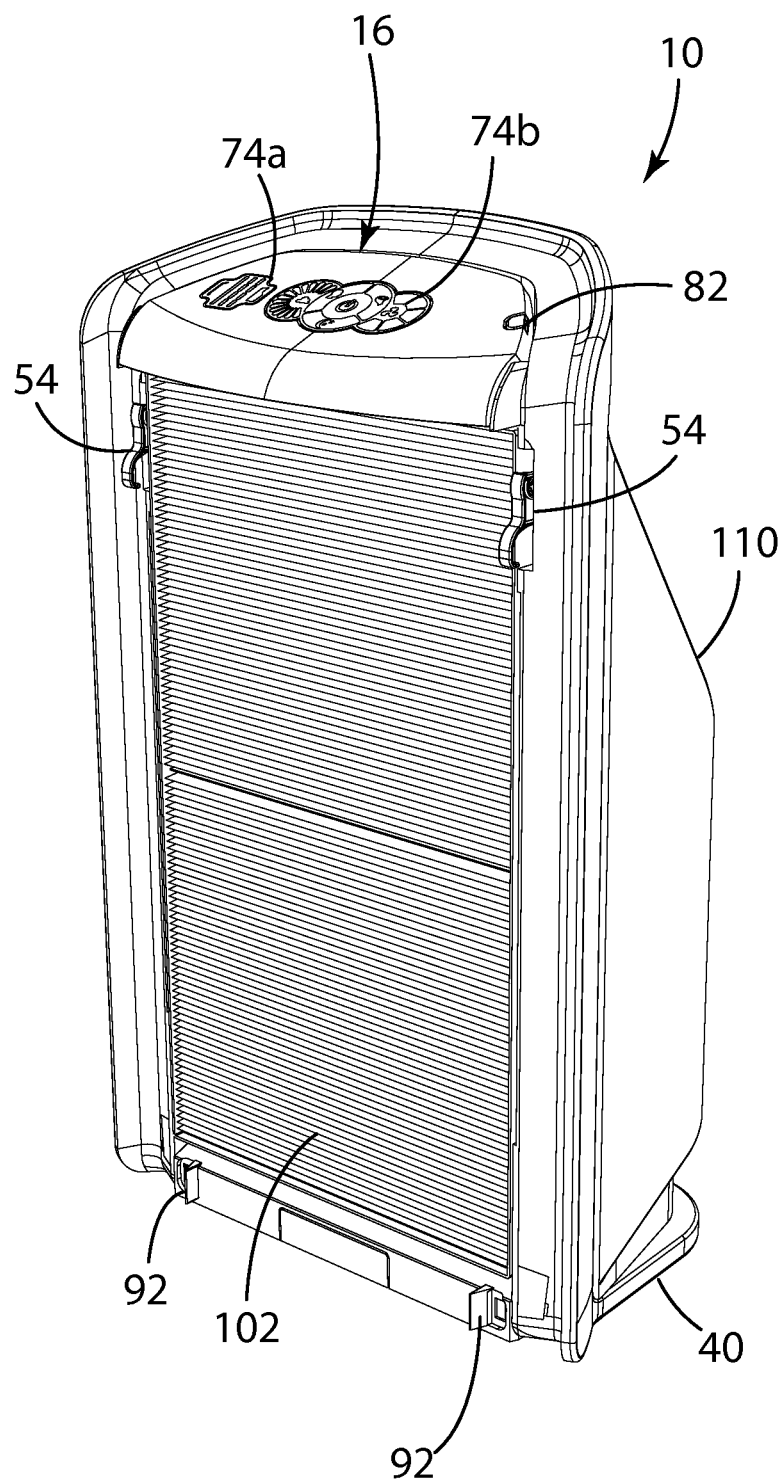
FIG. 27 is a perspective view of the ATS with the front cover and prefilter removed.

In yet another aspect, the ATS 10 is capable of receiving one of a plurality of interchangeable bases 40. Different bases 40 may provide different structure for receiving the power cord 42 and/or different structure for supporting the ATS 10. In FIG. 10, the ATS 10 includes a base 40 having a bobbin 44 for manually winding the power cord 42 and fixed feet 46. Alternative bases 40', 40" may include a cord retraction assembly with an automatic take-up reel and/or wheels, casters or a roller (See e.g. FIG. 25). The ATS 10 may also include a one-piece handle 48 that extends essentially the full width of the ATS 10 to allow the ATS 10 to be grabbed in the center by a single hand or toward opposite sides by two hands. In one alternative embodiment, base 40" includes a cord retraction assembly 45" and a single centrally-located roller 47". With this alternative base, the ATS 10 can be tilted forward onto the roller 47" and rolled from one location to another using the handle 48.

In another aspect, the ATS 10 include a filter retainer assembly 50 that facilitates quick and secure installation and removal of the filter(s). The filter retainer assembly 50 of the illustrated embodiment includes a catch 52 and a plurality of clips 54 that are disposed on the particulate filter and that interact with structure on the ATS housing 110 to secure the particulate filter in place in the filter housing 112. The clips 54 may function in a cam-like manner to draw the particulate filter into the filter housing 112 to facilitate and air tight seal.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

B. General Construction

As noted above, the present invention is described in the context of a room air treatment system that performs its general function by operating a blower 56 to move air through a series of filters 100, 102 and 104. The air treatment system 10 of the illustrated embodiment is configured to treat the air with three stages of filtration. The first stage is a course screen prefilter 100, which is intended to remove large contaminates, such as hairs, lint fibers and large agglomerations of dust (e.g. "dust-bunnies"). The second stage of filtration is a particulate filter 102. Although the particulate filter 102 specifications may vary, the illustrated ATS 10 includes a pleated HEPA filter media, which reduces airborne particles as small as 0.009 microns. The third stage of filtration is an activated carbon filter 104 that includes a bed of granular activated carbon chips that have been coated with various catalysts, which adsorb and convert the molecular contaminants, such as formaldehyde, dioxin, and ozone. The carbon filter 104 may be manufactured in accordance with the teachings of U.S. Pat. No. 7,316,732 for AIR TREATMENT FILTER AND RELATED METHOD, which issued on Jan. 8, 2008, to Taylor, Jr. et al., and which is incorporated herein in its entirety.

In the illustrated embodiment, the various filters 100, 102 and 104 are fitted into a filter housing 112. The filter housing 112 generally includes a carbon filter seat and a particulate filter seat. The two seats are generally rectangular voids configured to receive the carbon filter and particulate filter, respectively. The carbon filter seat is somewhat smaller in height and width than the particulate filter seat. As result, the filter housing 112 is stepped having a shoulder 114 surrounding the carbon filter seat. The carbon filter 104 is first fitted into the filter housing 112. The external dimensions of the carbon filter 104 are slightly smaller than the dimensions of the portion of the filter housing 112 intended to receive the carbon filter 104. As a result, there is a relatively tight fit between the carbon filter 104 and the filter housing 112, which tends to move air through rather than around the carbon filter 104. The particulate filter 102 is next fitted into the filter housing 112. As noted above, the filter housing 112 is stepped and includes a shoulder 114 against which the particulate filter 102 is installed. The particulate filter 102 may include a face seal (not shown) that engages the shoulder 114 to provide a leaktight seal between the particular filter 102 and the filter housing 112. This forces all air moving through the ATS 10 to flow through rather than around the particulate filter 102. Finally, the prefilter 100 is fitted into the filter housing 112 outside the particulate filter 102. In this embodiment, the prefilter 100 includes a frame 116 and a layer of filter media (not shown). The frame 116 is configured to snap directly on to the particulate filter 102. For example, the frame 116 may include fingers 117 that extend inwardly and are capable of engaging the particulate filter frame. Except to the extent described, the prefilter 100, particulate filter 102 and carbon filter 104 are generally conventional and therefore will not be described in detail. Although the illustrated embodiment includes a three-stage filter arrangement, the present invention may be incorporated into ATSs with different filtering/treatment arrangements.

In this embodiment, the ATS 10 includes untreated air inlets 106a-c in the front that allow air to enter the system and an air outlet 108 in the rear to return treated air to the environment. The ATS 10 includes a blower 56 that is housed in the lower rear portion of the housing behind the prefilter 100, particulate filter 102 and the carbon filter 104. In operation, the blower 56 operates to draw untreated air from the environment into the ATS 10 through the inlets 106a-c, move the air successively through the three filters 100, 102 and 104 to treat the air and then discharged the treated air through the outlet 108 to return it to the environment. The sizes, shapes and configurations of the inlet, outlet and internal flow path are designed, among other things, to provide the ATS with a compact footprint while still providing quiet and efficient operation. The size, shape and configuration of the inlet, outlet and internal flow path may vary from application to application as desired.

The illustrated ATS 10 is merely exemplary and the size, shape and configuration of the ATS may vary from application to application.

C. Control System

As noted above, the present invention includes a control system 12 that controls operation of the ATS 10 and provides a user interface for displaying information and receiving input from the operator. The primary function of the control system 12 is to control the speed at which the ATS 10 operates to treat air based on sensed parameters or operator input, to track the usage of filters, to notify the operator of the mode, motor speed setting and filter life and to accept operator commands. In general, the control system 12 varies the rate at which air is filtered by adjusting the speed of the blower 56. More specifically, the control system 12 controls operation of the blower 56 based on automated or manual control schemes as described in more detail below. The control subsystem 60 may be configured to slowly transition between blower speeds, as desired. For example, in the illustrated embodiment, blower speed control is achieved by varying the duty cycle of the power supplied to the blower 56. To provide a slow transition between motor speeds, the control subsystem 60 may transition from one speed to another by slowly incrementing or decrementing the duty cycle to move from the current speed to the desired speed. The timing, number and size of steps may vary from application to application depending on the desired effect.

In the illustrated embodiment, the user interface is implemented as a "dead front" display 16 that is located toward the top of the front cover 32 and includes integrated touch sensors. In use, the display 16 displays information and receives operator input relevant to operation and maintenance of the system. For example, the control system 12 of the illustrated embodiment displays the current environmental dust level and information regarding the remaining life of the various filters. It also provides touch sensitive buttons that allow an operator to control the system. The "dead front" display 16 includes a plurality of display elements 18 that are visible only when illuminated. The control system 12 is configured to selectively illuminate the individual display elements 18 to provide a dynamic display that varies to provide information and to present control options that are available at any given time. In the illustrated embodiment, the display 16 includes informative display elements 18a that are illuminated to provide information regarding the status of the ATS or a monitored characteristic, such as environmental air quality and filter life, and input display elements 18b that incorporate a touch sensor to allow an operator to provide input to the control system 12. In addition to allowing user input, input display elements 18b may also provide information regarding the status of the ATS, such as mode of operation and blower speed.

Figure 4:
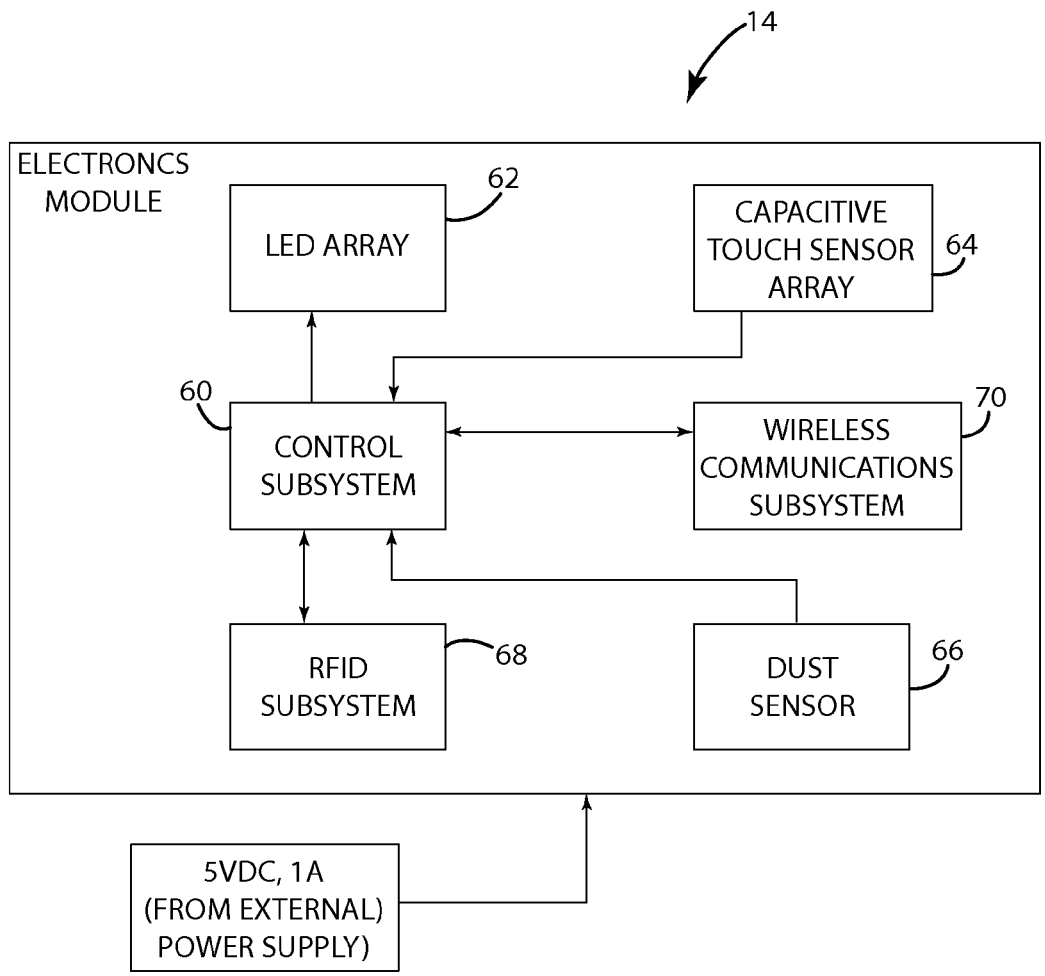
FIG. 4 is a schematic representation of the electronics module.

In the illustrated embodiment, the control system 12 includes an electronics module 14 that is self-contained in the sense that it includes all of the electronic components of the ATS 10, except for the power supply components that convert AC wall power to the DC power required to operate the ATS 10. In this embodiment, the power supply components (not shown) are located in the base 40 of the ATS housing 110. Referring now to the schematic representation of FIG. 4, the electronics module 14 generally includes a control subsystem 60, an LED array 62, a capacitive touch sensor array 64, a dust sensor assembly 66, an RFID subsystem 68 and a wireless communication subsystem 70. The control subsystem 60 includes control circuitry and firmware that is configured to operate the ATS 10 and to coordinate the collection of data from various other subsystems, including the capacitive touch sensor array 64, the dust sensor 66, the RFID subsystem 68 and the wireless communication subsystem 70. The various modes of operation of the system are described in more detail below. The control subsystem 60 also includes non-volatile memory for storage of preprogrammed operational default values as well as historical operational data, such as the life of the filters 100, 102 and 104, time of use, counters and other variables that might be used in connection with operation of the ATS 10.

Figure 5:
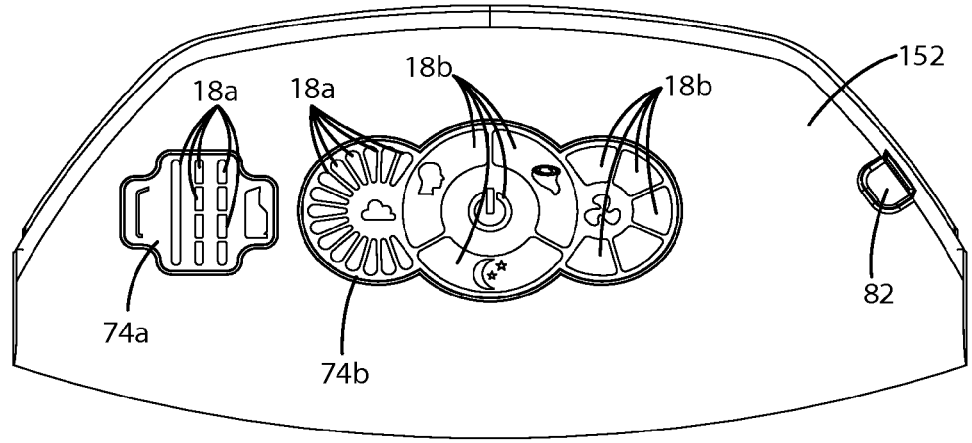
FIG. 5 is a front view of the electronics module.
Figure 6:
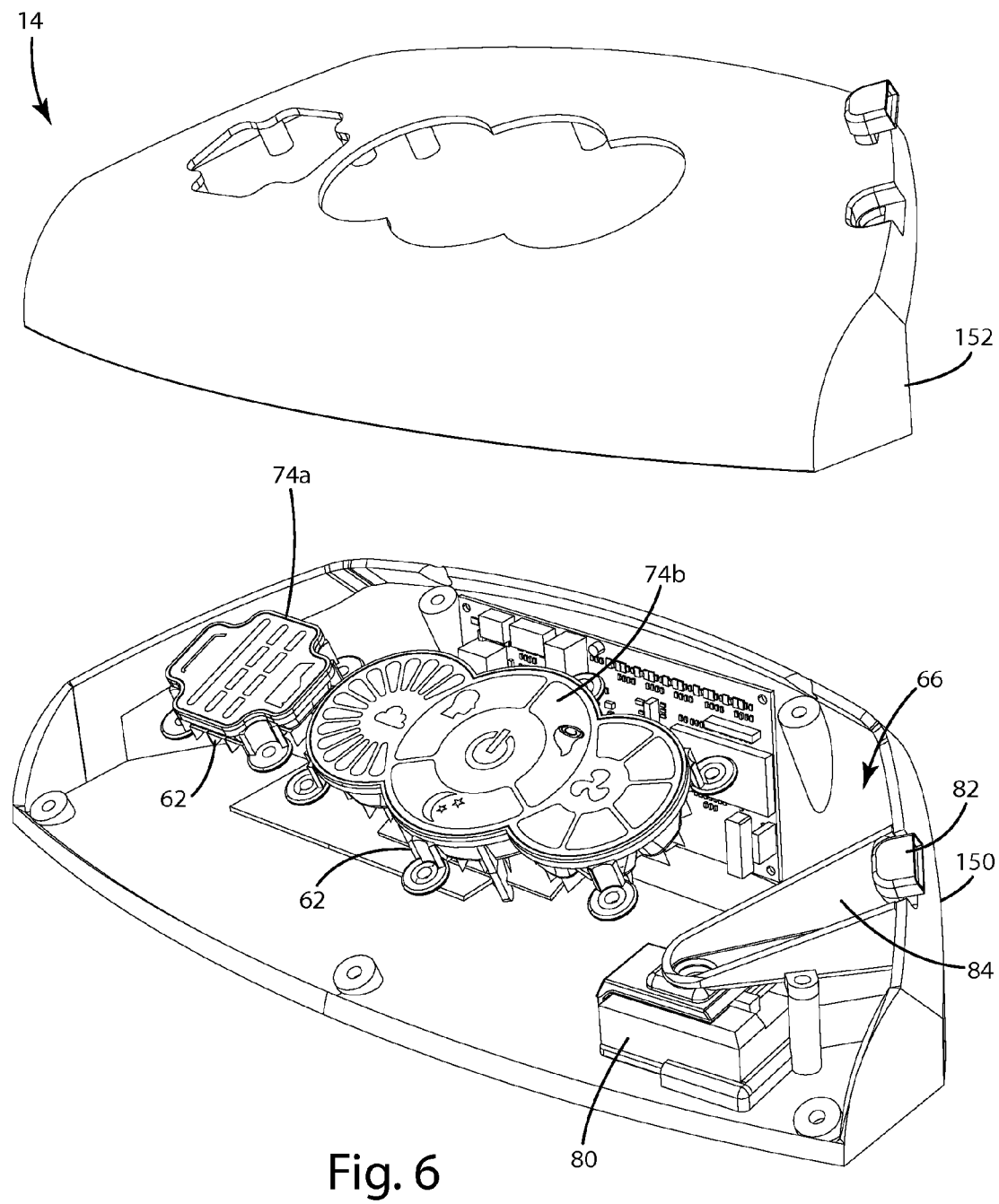
FIG. 6 is a perspective view of the electronics module with the cover removed.
Figure 7:
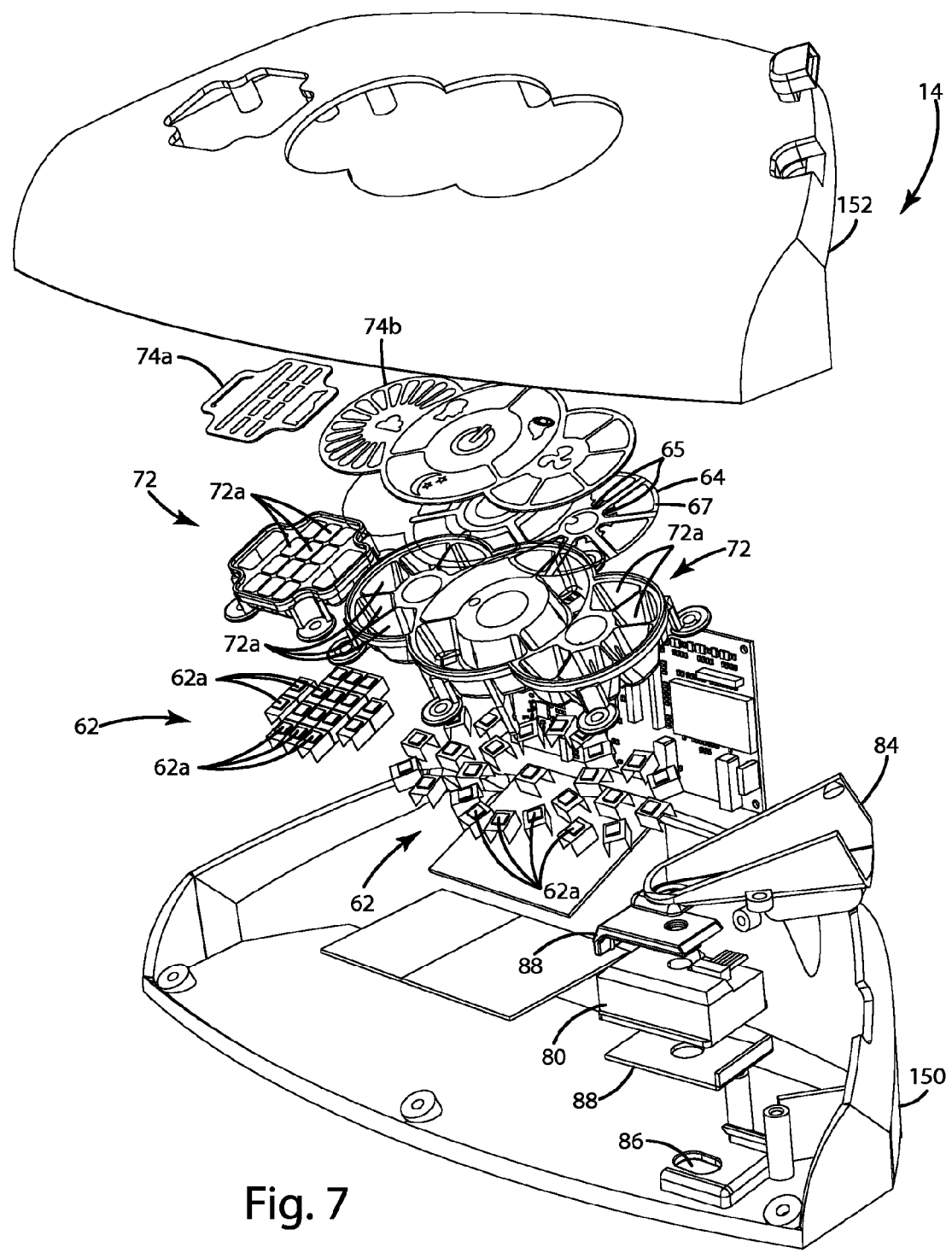
FIG. 7 is an exploded perspective view of the electronics module.

The electronics module 14 of the illustrated embodiment is shown in FIGS. 5-7. As shown, the electronics module 14 includes a housing 148 that contains the circuitry for the control subsystem 60, the RFID subsystem 68 and the wireless communication subsystem 70, as well as the LED array 62, the capacitive touch sensor array 64 and the dust sensor assembly 66. The housing 148 generally includes a base 150 and a cover 152. As noted above, the LED array 62 is configured to provide illumination of the display elements 18. More specifically, one or more LEDs 62a are positioned behind each display element 18, including informative display elements 18a and input display elements 18b. The LEDs 62a can be selectively illuminated by the control subsystem 60 when it is appropriate to show an informative display element 18 or to make an input display element 18b available for input. Each LED 62a may include a single LED or multiple LEDs that provide various illumination options. For example, each LED 62a may include a plurality of LEDs of different brightness to allow the brightness of the display element 18 to be varied. As another example, each LED 62 may include different color LEDs that can be illuminated separately or in combination to create different color illumination. In one embodiment, each LED 62 includes a red LED, a green LED and a blue LED, which can be illuminated in different combinations and at different levels of brightness to provide illumination of essentially any desired color. In another example, each LED 62a may include a plurality of LEDs of different brightness and different colors. Although the illustrated embodiment includes an LED array 62 to provide illumination to the display 16, the LED array 62 may be replaced or supplemented with other types of light sources, such as OLED, laser and EL light sources.

In the illustrated embodiment, the display 16 is a "dead front" display in which non-illuminated display elements 18 are not visible. In this embodiment, the region in which the display 16 is situated appears to be a simple continuation of the ATS housing 110 and, when no display elements 16 are illuminated, the ATS 10 appears to have no user interface. To produce the desired graphic elements, each display element 16 includes a screen 74 that masks and diffuses the light produced by the underlying LED 62. In the illustrated embodiment, the display 16 includes two screens 74a and 74b, each covering a plurality of LEDs and providing masking and diffusing functions for a plurality of display elements 18. Screen 74a provides is associated with informative display elements 18a that provide information relating to the life of the various filters 100, 102 and 104. Screen 74b is associated with informative display elements 18a that provide information relating to environmental air quality (e.g. based on dust sensor readings) and input display elements 18b associated with power, mode and blower speed inputs. In the illustrated embodiment, each screen 74 is a laminated structure generally includes a diffusing layer and a masking layer. The diffusing layer may be essentially any material capable of diffusing light produced by the LEDs. For example, the diffusing layer may include a transparent substrate that is covered with a translucent film or other translucent coating. Alternatively, the diffusing layer may be a transparent material having a "roughed" or otherwise textured surface. In another alternative, the diffusing layer may be a sheet of translucent material. The masking layer may be essentially any material capable of masking the light to create the desired graphic, including various opaque and translucent materials, such as inks, paints, films, and other adhesive layers. For example, the masking layer may be a layer of opaque film that defines an opening(s) in the shape of the desired graphic. It may also include combinations of different materials that provide different visual appearances. For example, the masking layer may include an opaque region where no light transmission is desired, a first translucent material where a background light transmission is desired and a second translucent material where a foreground light transmission is desired. The first and second translucent materials may produce regions that appear different through the use of different color translucent materials or translucent materials with different level of transparency. The masking layer may be applied to the diffusing layer by printing, thermal bonding, adhesive or other suitable means. In the illustrated embodiment, the masking layer is disposed on the outer surface of the diffusing layer opposite the LEDs or other light source, but it may be located elsewhere, if desired. Although the diffusing layer and masking layer are part of a single laminated construction in the illustrated embodiment, they may alternatively be separate components. For example, they may be separately manufactured and positioned adjacent to one another during assembly of the display 16.

Figure 3:
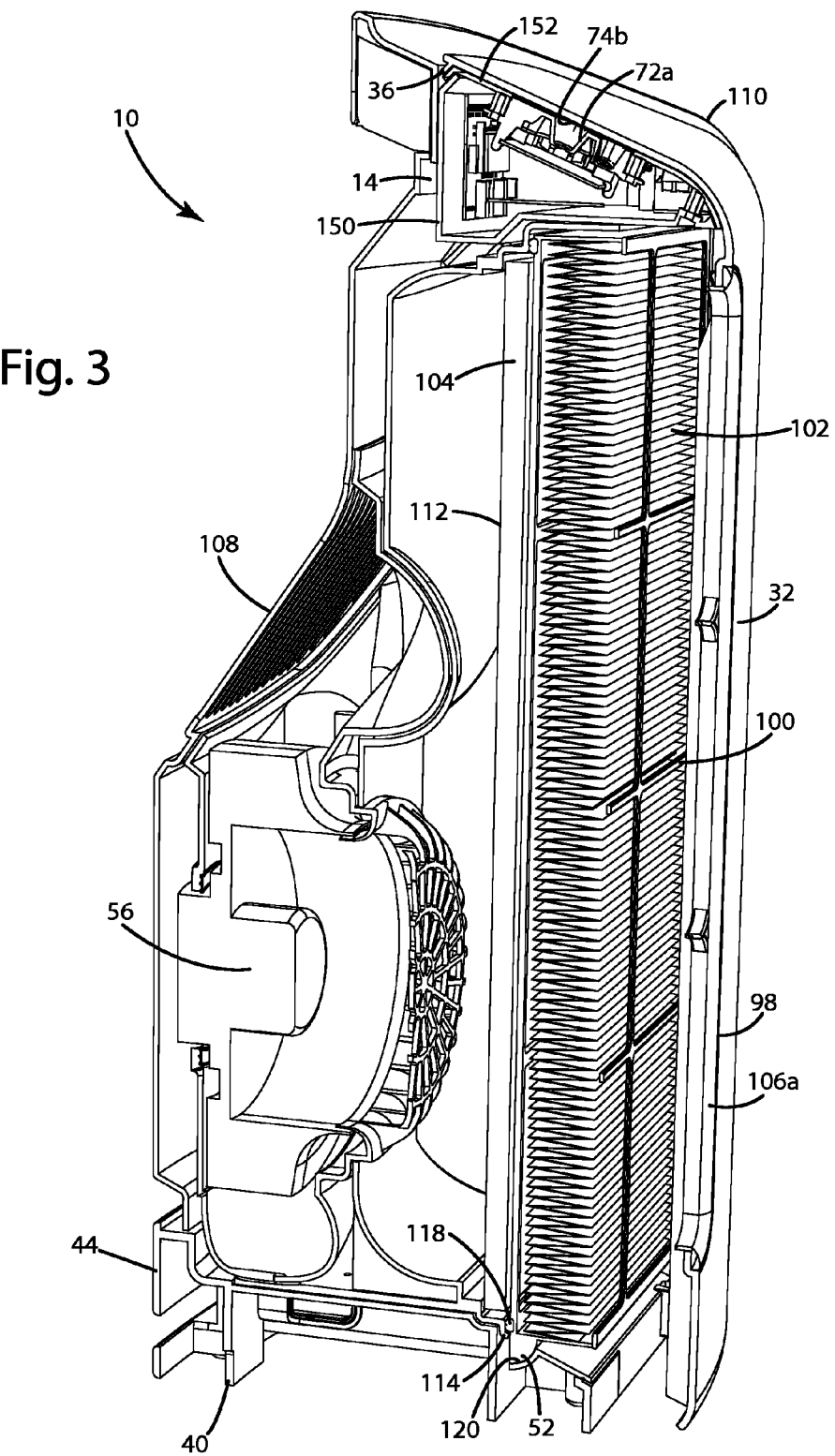
FIG. 3 is a cross-sectional view of the ATS taken along line 3-3 of FIG. 1.

In the illustrated embodiment, the light duct array 72 has a plurality of individual ducts 72a joined side-by-side to contain and guide light from the light sources to the corresponding display elements. Each light duct 72a surrounds the light source and provides a reflective duct that conveys the light from the light source 62a to the appropriate portion of the screen 74a, 74b. For example, as shown in FIG. 3, one end of each light duct 72a may be configured to be closely fitted over the LED 62a and the other end may engage the screen 74b and be sized and shape to follow the periphery of the associated display element 18. The internal surface of each light duct 72a may be reflective, diffuse or have other optical properties that are selected to provide the corresponding display element 18 with the desired visual appearance. In the illustrated embodiment, the electronics module 14 includes two light duct arrays 72—one for the filter life displays and the other for the remaining display elements. In this embodiment, each light duct array 72 is manufactured as a single, integral unit, thereby facilitating manufacture and assembly of the electronics module 14. For example, each light duct array 72 may be injection molded and the internal surfaces may be coated with a reflective or diffusive material depending on the desired appearance.

As noted above, some of the display elements 18 are input display elements 18b that function as touch sensors to allow an operator to provide input to the control subsystem 60. The input display elements 18b may be implemented using essentially any touch sensor technology that can be incorporated into the "dead front" display. In the illustrated embodiment, the input display elements 18b are capacitive touch sensors. In this embodiment, the display 16 includes a capacitive touch sensor array 64 that includes a plurality of separate segments of capacitive film 64. Each segment of film is associated with a single touch sensor. For example, each segment of film may be coextensive with the display element 18b associated with that touch sensor. The capacitive film 64 may be integrated into the screen 74a, 74b, for example, as a separate layer laminated to diffusing layer 76 and/or masking layer 78. Alternatively, the capacitive film 64 may be separate from the screen 74a, 74b. In the illustrated embodiment, each segment of capacitive film 64 includes a tab 65 or other feature for connecting to the electronic module 14, and the underlying substrate 67 provides a common grounding plane. The monitoring, control and operation of the capacitive touch sensors may be generally conventional and therefore will not be described in detail. Suffice it to say that the control subsystem 60 may recognize touches by sequentially taking readings from the separate segments of capacitive film and determining that a touch has occurred when those current readings match predetermined values that are typical of a touch.

As noted above, the electronics module 14 of the illustrated embodiment includes a dust sensor assembly 66 that allows the control system 12 to determine the level of air borne contaminants. In this embodiment the dust sensor assembly 66 includes a dust sensor 80, a sensor inlet 82, a sensor duct 84, a sensor outlet 86 and a pair of sensor gaskets 88. In this embodiment, the dust sensor assembly 66 utilizes the partial vacuum created by the blower 56 to draw environmental air through the dust sensor 80. After passing through the sensor 80, the air is treated and returned to the environment. As shown, the sensor outlet 86 is in communication with the air flow path through the ATS 10 and is positioned upstream from the filters 100, 102 and 104. The sensor 80 is mounted to the electronics module 14 in proper alignment with the sensor outlet 86. The sensor inlet 82 is disposed in the cover 152 of the electronics module 14 to provide a passage for environmental air to enter the sensor duct 84. The sensor inlet 82 may include filter material (not shown) selected to prevent large particles, such as hair, lint and agglomerations of dust, from fouling the dust sensor 80. The filter material may be replaceable or cleanable. The sensor duct 84 is disposed between the sensor 80 and the sensor inlet 82 to provide a flow path to the sensor 80. Sensor gaskets 88 are positioned between the dust sensor 80 and the sensor outlet 86, and between the dust sensor 80 and the sensor duct 84. In operation, the blower 56 draws air from the environment sequentially through the sensor inlet 82, the sensor duct 84, the dust sensor 80 and the sensor outlet 86. As the air passes through the dust sensor 80, the level of dust in the air is measured using known techniques and apparatus.

Although not shown, the ATS 10 may also include a sensor that is capable of providing readings that are indicative of the presence or absence of the front cover 32. For example, in the illustrated embodiment, the ATS 10 includes a hall-effect sensor that is positioned toward the bottom of the ATS 10 near one of the magnetic attachment points. When the front cover 32 is removed, the absence of the magnets will change the readings provided by the hall-effect sensor. Alternatively, a separate interlock magnet (not shown) may be incorporated into the front cover 32 is a location near the electronics module 14 so that a hall-effect sensor, reed switch or other magnetic field sensor installed on the electronics module 14 can be used to determine the presence or absence of the front cover 32. Information about the status of the front cover 32 can be used by the control subsystem 60 to affect operation of the system. For example, in one embodiment, the control subsystem 60 may automatically shut-off the blower 56 or otherwise change function when the front cover 32 is removed. As another example, when the front cover 32 is removed, the control subsystem 60 may change the parameters used in determining whether a touch has occurred. This will allow the touch sensors to work equally well with and without the front cover 32 in place. As a further example, the control subsystem 60 may enter into an alternative mode of operation when the front cover 32 is removed. This may result in the control subsystem 60 changing the display elements 18, including the available input display elements 18b.

The control system 12 may also include an RFID subsystem 68 that is configured to work with corresponding RFID tags in the replaceable filters in the ATS 10 (e.g. particulate filter 102 and/or the activated carbon filter 104). The RFID subsystem 68 is generally conventional and therefore will not be described in detail. Suffice it to say that with the RFID subsystem 68, the control subsystem 60 can collect, accumulate and otherwise store filter life, time of use, elapsed time since installation, total affective consumption (e.g. motor speed multiplied by time of use), and other data in the RFID tags. When a filter is installed, the RFID reader/writer can read any data already stored in the RFID tag, such as filter life, total amount of time filter has been installed in any system, and total affective consumption of filter life. In this way, the system is able to provide proper tracking even when a filter is moved from one ATS to another. The RFID tags embedded in the filter may also include a serial number that can be used to ensure authenticity of the filter. For example, the control system 12 may store a table of valid serial numbers against which to compare the serial number or, if it has network capability, have the ability to compare a serial number against a table of valid numbers stored on the internet. Filter usage information may be used to provide a display of remaining filter life and to provide prompts when filter replacement is required. The RFID subsystem 68 may also be used to determine when a filter has been removed. This information may be useful in controlling or maintaining statistics relating to use of the ATS 10. For example, the control subsystem 60 may be configured to shut-off the blower when the particulate filter 102 and/or the carbon filter 104 are removed. As another example, the control subsystem 60 may enter into a service mode when one or both of the filters are removed. When in the service mode, the control subsystem 60 display information technical information and/or provide control options that are specific to that mode. To help ensure proper alignment between the RFID reader/writer in the ATS 10 and the RFID tag in the carbon filter 104, the carbon filter 104 and filter housing 112 may be keyed so that the carbon filter 104 can only be installed in an orientation that provides alignment. For example, the bottom of the particulate filter 104 may include a keyway (not shown) and the filter housing 112 may include a corresponding key (not shown). When the RFID reader/writer is centrally located in a left/right direction the key may be centrally located because it will not matter which filter surface faces inwardly. When the RFID reader/writer is not centrally located, it may be beneficial to provide a nonsymmetrical key arrangement to ensure the desired filter surface faces inwardly.

As noted above, the control system 12 may include a wireless communication subsystem 70 that allows the control subsystem to wirelessly communication with other electronic devices, such as smart phones, tablets, personal computers, local wireless routers, broadband wireless routers and other communication devices. In the illustrated embodiment, the wireless communication subsystem 70 allows the ATS 10 to exchange information with and receive commands from a remote device, such as a smart phone or tablet device running a dedicated application. For example, an application may be provided that allows an operator to enter ATS commands on an electronic device that are wirelessly communicated to and carried out by the control subsystem 60. As another example, information collected by the ATS 10 can be communicated to the electronic device for display within the application. With the illustrated embodiment, this may include filter life information for each of the filters, mode of operation information, motor speed information and environmental air quality information derived using the dust sensor. The wireless communication subsystem 70 may utilize essentially any wireless communication technology and protocol. For example, in the illustrated embodiment, the wireless communication subsystem 70 may have Bluetooth and/or WiFi capabilities.

The control system 12 may be configured to implement a wide variety of control schemes. In each case, the control system 12 may be configured to provide a dynamic display 16 in which display elements 18 are illuminated and touch sensors are enabled based on changing variables, such as mode of operation and the values of monitored parameters. In the illustrated embodiment, the control system 12 implements a control scheme having four general modes of operation, including a "smart" mode (or automatic mode) in which control is automated based at least in part on dust sensor readings, a "manual" mode in which the operator controls the blower speed, a "turbo" mode in which the blower 56 is temporarily operated at a high speed and a "night" mode in which the display 16 is operated differently to limit night-time illumination. In connection with this control scheme, the display 16 is capable of displaying a variety of informative display elements 18a and input display elements 18b (See FIGS. 5 and 9A). In the illustrated embodiment, each display element 18 includes two LEDs of different colors and/or different intensity. One of the two LEDs is used to illuminate the display element in a "present" state (e.g. a dimmer LED or a first color, such as a softer color). This state of illumination is used to make the display element 18 visible on the display 16, while providing a visual indication that it has not been selected or is not active. The other LED is used to illuminate the display element in the "on" state (e.g. a brighter LED or a second color, such as a more vivid color). The "on" state is used to indicate that the display element is "on" or "active." The number, type, arrangement, configuration and operation of the display elements 18 may vary from application to application depending in large part on the control scheme being implemented by the control system 12.

In the illustrated embodiment, the informative display elements 18a include an informative display element 200 that represents prefilter life, a set of informative display elements 202 that represent particular filter life, a set of informative display elements 204 that represent carbon filter life and a set of informative display elements 206 that represent environmental dust level (See FIG. 9B). The input display elements 18b generally include a power input display element 208, a "smart" mode input display element 210, a "turbo" mode input display element 212, a "night" mode input display element 214 and a plurality of blower speed input display elements 216 (See FIG. 9B).

In the illustrated embodiment, the various filter life displays 200, 202 and 204 are positioned between icon representations of the front cover 32 and the ATS housing 110 (See FIG. 9B). These icons may be helpful in identifying which filter life display is associated with which filter. In the illustrated embodiment, the front cover and ATS housing icons are statically illuminated by a white LED operated at 50% brightness.

In the illustrated embodiment, the filter life display 200 for the prefilter includes an informative display element 200 can be illuminated in the "present" state when the prefilter does not require maintenance and in the "on" state when the prefilter requires maintenance (such as cleaning or replacement). The "present" state may be created by statically illuminating a green LED. The "on" state may be provided by flashing a red LED.

In the illustrated embodiment, the filter life display 202 for the particulate filter 102 includes four informative display elements 18a, each representing a quarter of the filter lifer. When the filter life display is on, all four display elements 18a are illuminated. The number of elements 18a illuminated in the "on" state represents remaining filter life. The remaining elements 18a are illuminated in the "present" state to provide a visual reminder that filter life is represented by quarters. The number of segments may vary from application to application as desired. For example, additional granularity may be provided by increasing the number of informative display elements 18a associated with the filter life display 202. In the illustrated embodiment, the filter life display 202 for the particulate filter incorporates color LEDs to assist in representing filter life as follows:

75-100% life—all four segments illuminated green at 100% brightness
50-75% life—bottom three segments green at 100% brightness, top segment white at 50% brightness
25-50% life—bottom segment amber at 100% brightness, top three segments white at 50% brightness
1-10% life—bottom segment red at 100% brightness, top three segments white at 50% brightness
0% life—bottom segment flashing red at 100% brightness, top three segments white at 50% brightness In the illustrated embodiment, the filter life display 204 for the carbon filter 104 is essentially identical to the filter life display 202 for the particulate filter 102 including four display elements 18a that may be illuminated in "present" or "on" states using the same methodology described above.

In the illustrated embodiment, the dust level display 206 includes a plurality of separate informative display elements 18a that can be illuminated in "present" or "on" states. When the dust level display 206 is being displayed, the number of informative display elements 18a that are illuminated in the "on" state represents the measured dust level and the other informative display elements 18a are illuminated in the "present" state. This allows the operator to better understand the dust level by comparing the ratio of "on" segments to total number of segments. In the illustrated embodiment, the dust level segments are grouped into sets of three with a single set of LEDs being associated with each set of three segments. As a result, the dust level display 206 of the illustrated embodiment has 15 segments, but only six different settings (i.e. 0 segments, 3 segments, 6 segments, 9 segments, 12 segments or 15 segments). In the illustrated embodiment, the dust level display 206 incorporates color LEDs to assist in recognizing as follows:

Level 1—first segment illuminated green at 100% brightness, remaining segments white at 50% brightness
Level 2—first two segments illuminated amber at 100% brightness, remaining segments white at 50% brightness
Level 3—first three segments illuminated amber at 100% brightness, remaining segments white at 50% brightness
Level 4—first four segments illuminated red at 100% brightness, remaining segment white at 50% brightness
Level 5—all five segments illuminated red at 100% brightness In this embodiment, the blower speed display element 18b perform the dual function of displaying the current blower speed and receiving touch sensor input to allow the operator to manually set blower speed. As with the dust level display, the blower speed display includes a plurality of separate display elements 18 that have two LEDs that can be selectively illuminated to represent a "present" state or an "on" state. Unlike the dust level display, the blower speed display is also a touch sensor array that can be used by the operator to manually select a blower speed. When the blower speed is displayed, the number of blower speed input display elements that are illuminated in the "on" state is selected to represent the blower speed and the other blower speed input display elements are illuminated in the "present" state so that the operator can see the available blower speed options and compare the ratio of "on" segments to "present" segments to understand the current blower speed. In the illustrated embodiment, the "present" state may be created by statically illuminating a white LED at 50% brightness. The "on" state may be provided by statically illuminated a blue LED at 100% brightness. To provide touch sensors, each blower speed display element 18b includes an associate segment of capacitive film. As noted above, the control subsystem 60 monitors the capacitive film segments to determine when a touch has taken place. When a touch occurs, the control subsystem 60 may adjust the blower speed to match the selected setting.

In the illustrated embodiment, the power input display element 208 is illuminated red at 100% brightness when in the "present" state and illuminated white at 100% brightness when in the "on" state. The "smart" mode input display element 210 is illuminated white at 50% brightness when in the "present" state and illuminated blue at 100% brightness when in the "on" state. The "turbo" mode input display element 212 is illuminated white at 50% brightness when in the "present" state and illuminated blue at 100% brightness when in the "on" state. The "night" mode input display element 214 is illuminated white at 50% brightness when in the "present" state and illuminated red at 50% brightness when in the "on" state.

Figure 13:
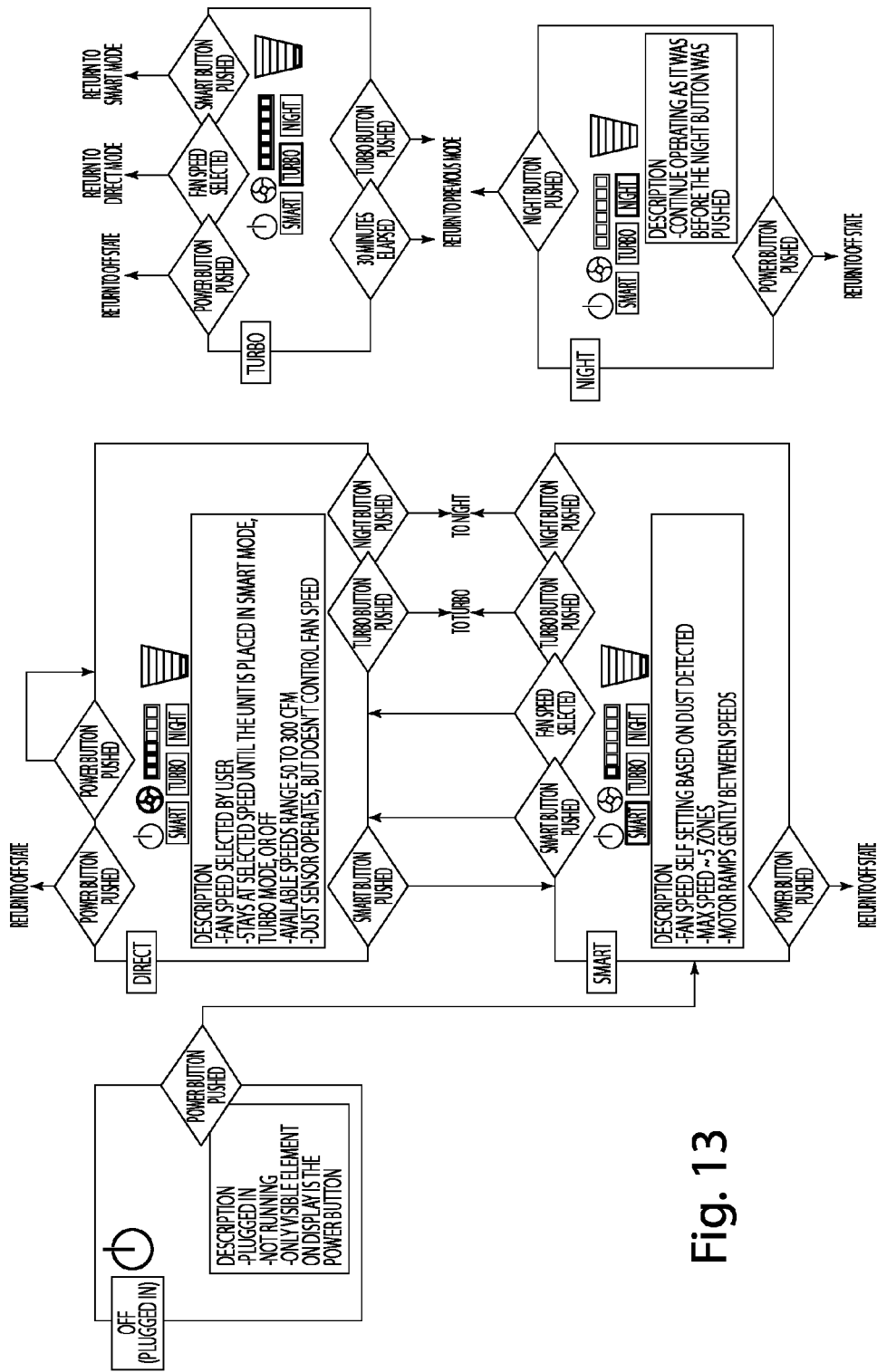
FIG. 13 is a schematic representation of a control scheme in accordance with an embodiment of the present invention.

As noted above, the control system 12 of the illustrated embodiment implements a control scheme with four different modes of operation: "smart" mode (or automatic mode), "manual" mode, "turbo" mode and "night" mode. This control scheme will be described with reference to FIG. 13. During the "smart" mode of operation, the control subsystem 60 evaluates the dust sensor readings and determines a blower speed based on those readings. This allows the ATS 10 to adapt to changing levels of air borne dust in the environment. In this mode, the operator has the options of entering turbo mode, night mode, manual mode or powering off the ATS. As such, the turbo mode input display element, the night mode input display element, the various blower-speed input display elements and the power input display element are illuminated. The turbo mode input display element and the night mode input display element are illuminated in the "present" state. The smart mode input display element and the power input display element are illuminated in the "on" state. If the smart mode input display element is touched when the system is already operating in smart mode, the system will transition to the manual mode of operation. The blower speed input display elements are illuminated to show the current blower speed and available manual adjustment options in accordance with illumination methodology set forth above. Additionally, in the smart mode, the dust level informative display elements are illuminated to show the real-time dust level in accordance with the illumination methodology set forth above. In the smart mode, the filter life displays are illuminated for a specific period of time each time that user interacts with the ATS 10. For example, the control subsystem 60 may illuminated the filter life displays for a period of 15 seconds each time that an operator interacts with a touch sensor in the display 16. Additionally, the filter life displays may be illuminated whenever and for so long as a filter needs attention (e.g. any one of the filters needs to be cleaned or replaced).

The control subsystem enters the manual mode (or direct mode) when the operator touches a blower speed input display element 18*b*. Once in the manual mode, the control subsystem 60 operates the blower 56 at the speed selected by the operator. In this mode, the operator has the options of entering turbo mode, night mode, smart mode, adjusting blower speed or powering off the ATS. As such, the turbo mode input display element, the night mode input display element, the smart mode input display element, the various blower-speed input display elements and the power input display element are illuminated. The smart mode input display element, turbo mode input display element and night mode input display element are illuminated in the "present" state. The power input display element is illuminated in the "on" state. The blower speed input display elements are illuminated to show the current blower speed and available manual adjustment options in accordance with illumination methodology set forth above. Additionally, the dust level informative display elements are illuminated to show the real-time dust level in accordance with the illumination methodology set forth above. In this mode, the filter life displays are illuminated for a specific period of time each time that user interacts with the ATS 10. For example, the control subsystem 60 may illuminated the filter life displays for a period of 15 seconds each time that an operator interacts with a touch sensor in the display 16. Additionally, the filter life displays may be illuminated whenever and for so long as a filter needs attention (e.g. any one of the filters needs to be cleaned or replaced).

The turbo mode is entered when the operator touches the turbo mode input display element. Once in the turbo mode, the control subsystem 60 operates the blower 56 at the highest speed setting (or some other predetermined speed setting) for a preset period of time (e.g. 30 minutes) and then returns automatically to the previous mode of operation. The turbo mode may be interrupted by a button touch, in which case the system may transition out of the turbo mode prior to expiration of preset period of time. In this mode, the operator has the options of touching the smart mode input display element to enter smart mode, touching a blower speed input display element to adjust blower speed and enter the manual mode or touching the power input display element to power off the ATS. Further, the operator has the option of touching the turbo mode input display element to cause the system to immediately return to the previous setting. As such, the turbo mode input display element, the smart mode input display element, the various blower-speed input display elements and the power input display element are illuminated. The turbo mode input display element and power input display element are illuminated in the "on" state while the smart mode input display element is illuminated in the "present" state. The blower speed input display elements are illuminated to show the current blower speed and available manual adjustment options in accordance with illumination methodology set forth above. Additionally, the dust level informative display elements are illuminated to show the real-time dust level in accordance with the illumination methodology set forth above. In this mode, the filter life displays are illuminated for a specific period of time each time that user interacts with the ATS 10. For example, the control subsystem 60 may illuminated the filter life displays for a period of 15 seconds each time that an operator interacts with a touch sensor in the display 16. Additionally, the filter life displays may be illuminated whenever and for so long as a filter needs attention.

The night mode is entered when the operator touches the night mode input display element. Once in the night mode, the control subsystem 60 continues to operate the ATS 10 in the same mode, but the content of the display is reduced to minimize light emissions. In this mode, the operator has the options of disabling night mode (i.e. re-enabling the display in accordance with the current mode of operation) by touch the night mode input display element or powering off the ATS by touching the power input display element. In the night mode, only the night mode input display element and power input display element are illuminated, and they are both illuminated in the "on" state. In an alternative embodiment, the control subsystem 60 may be configured to re-enable the display 16 (in whole or in part) when the operator comes within close proximity to the display 16. For example, control subsystem 60 may use the capacitive touch sensor array 64 to sense proximity of the operator and use that as a trigger to illuminate all of the input display elements 18*b* so that the operator has a full set of controls. If the operator does not enter a command within a specific period of time (e.g. 15 seconds) after the display 16 has been re-enabled, the control subsystem 60 may return to the display 16 to the night mode.

When the ATS 10 is plugged in, but not powered on, the control subsystem 60 illuminate the power input display element in the "present" state. This allows the operator to see the power control element. Once the power button is touched, the control subsystem 60 may start the system in smart mode or in manual mode. When started in smart mode, the control subsystem 60 takes dust sensor readings, determines the appropriate blower speed based on the dust sensor readings and then engages the blower at the determined speed. All of these steps are taken automatically without the need for operator input. When started in manual mode, the control subsystem 60 does not start the blower 56 until directed to do so by operator input, for example, by the operator touch one of the blower speed input display elements 18b.

Figure 14:
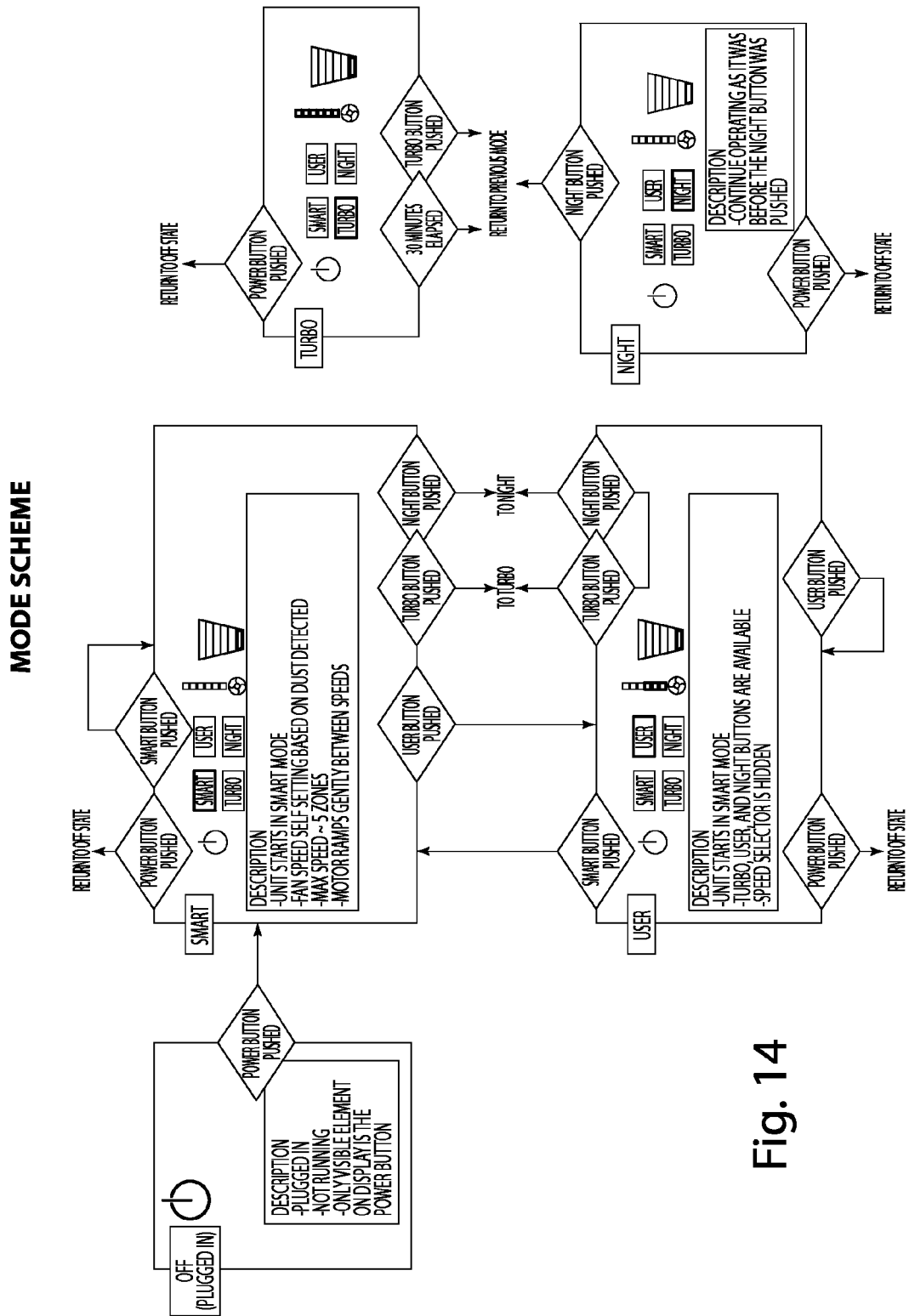
FIG. 14 is a schematic representation of an alternative control scheme.

The control scheme described above is merely exemplary. The control system 12 may implement a variety of alternative control schemes. For example, one alternative control scheme is shown in FIG. 14. This alternative control scheme is essentially identical to the control scheme discussed above, except as described here. To implement this control scheme, the display may include an additional mode control button associated with the "manual" mode (labelled "user" in FIG. 14). With this control scheme, the operator is required to use the mode control buttons to transition between different modes of operation. For example, the operator is required to touch the "user" mode input display element to enter the manual mode of operation (rather than simply touching a blower speed input display element). Once in manual mode, the operator can control the blower speed by touching the desired blower speed input display element. As another example of this control scheme, the operator can only leave the turbo mode by touching the turbo mode input display element or allowing the preset time to pass. Similarly, the operator can only leave the night mode by touching the night mode input display element.

Figure 15:
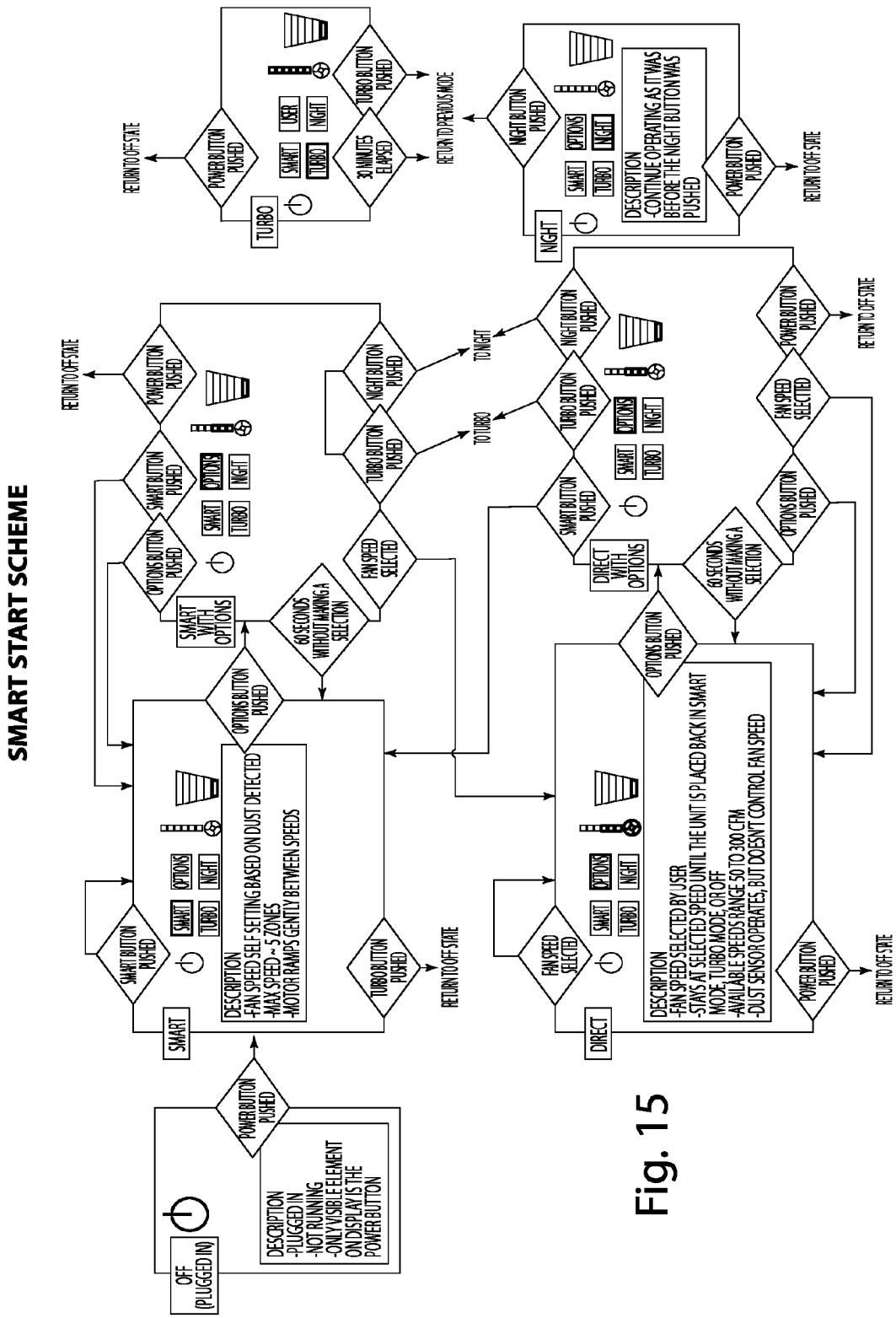
FIG. 15 is a schematic representation of a second alternative control scheme.
Figure 16:
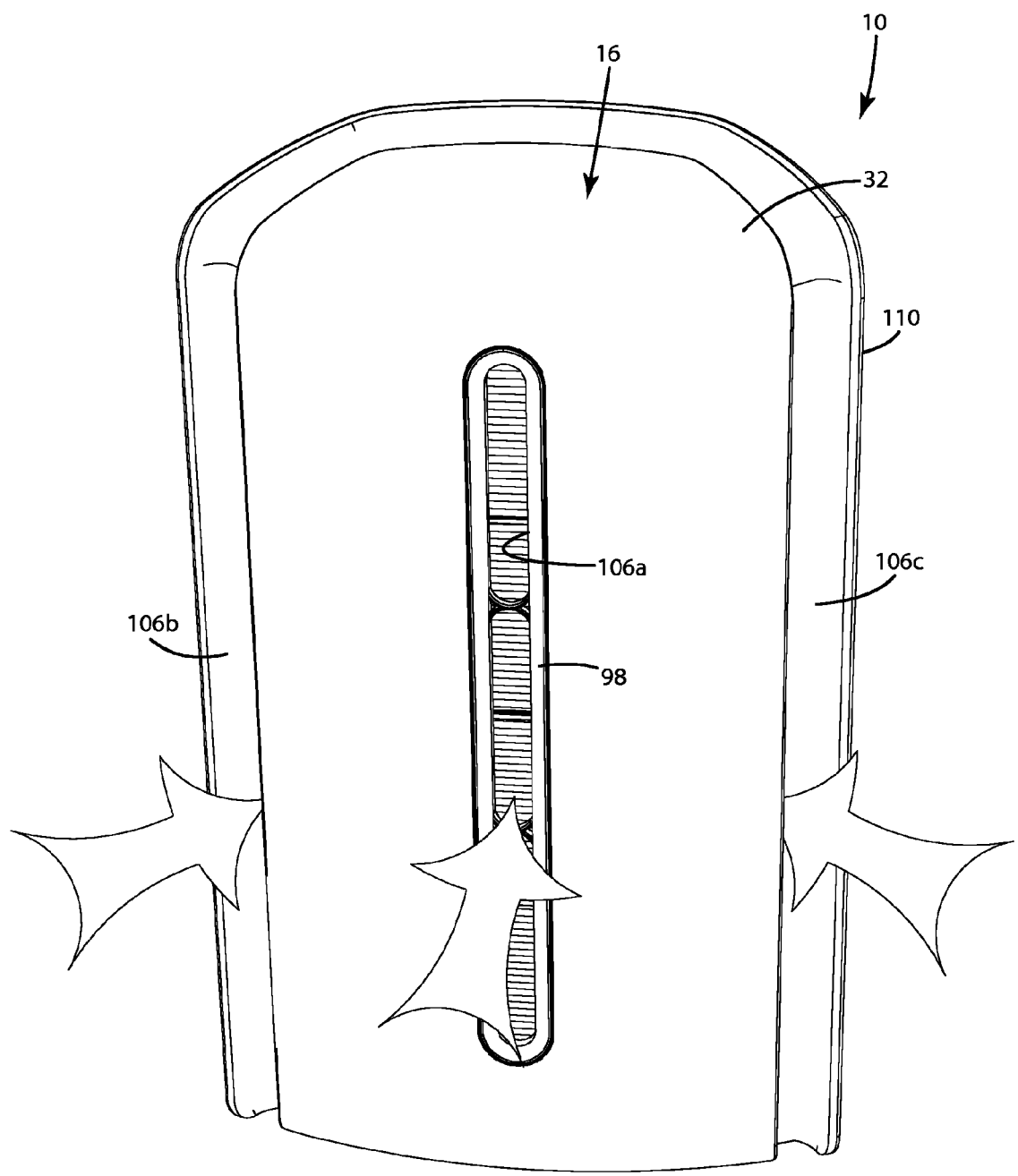
FIG. 16 is a front perspective view of the ATS showing the air inlets.
Figure 18:
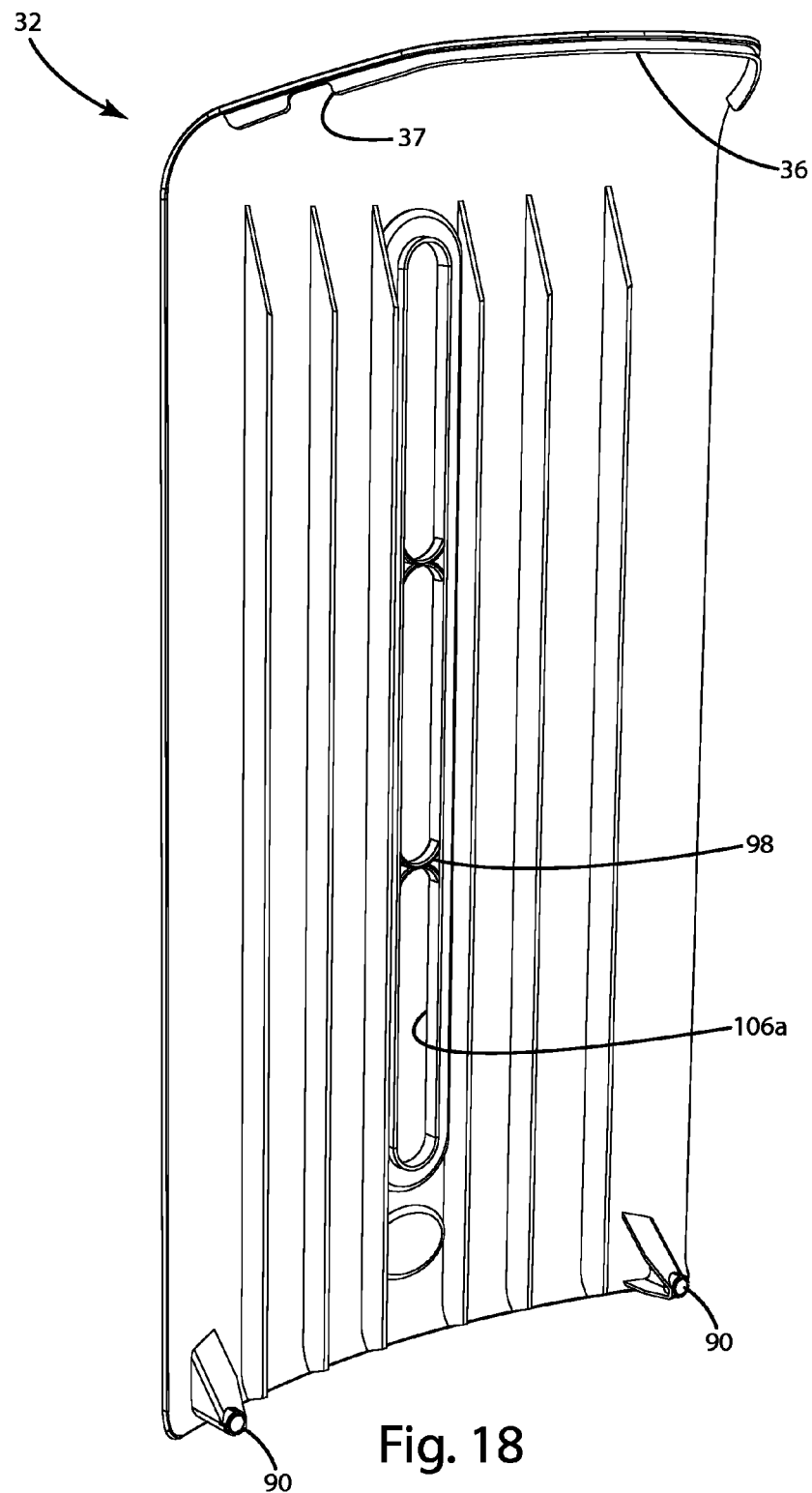
FIG. 18 is a rear perspective view of the front cover.

Another alternative control scheme is shown in FIG. 15. In this embodiment, the control scheme is essentially identical to the first control scheme discussed above, except as described here. To implement this control scheme, the display includes an additional mode control button associated with the "options" mode (labelled "options" in FIG. 15). When the system is powered on, it starts in the "smart" mode and the blower speed is set automatically based on input from the dust sensor. To provide additional control options, the "options" mode button must be touched. In the "smart" mode, the power input display element is illuminated in the "on" state, the smart mode input display element is illuminated in the "on" state, the options mode input display element is illuminated in the "present" state and the dust level display is illuminated. The turbo mode input display element, the night mode input display element and the blower speed display are off. In the smart mode, the operator can touch the power input display element to power off the system or touch the options mode input display element to transition into the options mode.

Once in the "options" mode, the power input display element is illuminated in the "on" state, the smart mode input display element is illuminated in the "on" state, the options mode input display element is illuminated in the "on" state, the dust level display is illuminated and the blower speed display is illuminated. Additionally, the turbo mode input display element and the night mode input display element are illuminated in the "present" state. In the options mode, the operator can touch the power input display element to power off the system, touch the smart mode input display element to return to the smart mode, touch the options mode input display element to return to the smart mode, touch the turbo mode input display element to enter turbo mode, touch the night mode input display element to enter night mode or touch a blower speed input display element to select a blower speed and enter manual mode. If no button is touched within a specified period of time (e.g. 60 seconds), the system may automatically revert to the smart mode.

Once in the "manual" mode, the power input display element is illuminated in the "on" state, the options mode input display element is illuminated in the "present" state, the dust level display is illuminated and the blower speed display is illuminated. Additionally, the smart mode input display element, the turbo mode input display element and the night mode input display element are off. In the manual mode, the operator can touch the power input display element to power off the system, touch the options mode input display element to enter a "manual options" mode or touch a blower speed input display element to select a blower speed. While the system remains in manual mode, it will continue to operate the blower at the speed selected by the operator.

Once in the "manual options" mode, the power input display element and the options mode input display element are illuminated in the "on" state, and the dust level display and blower speed display are illuminated. Additionally, the smart mode input display element, the turbo mode input display element and the night mode input display element are illuminated in the "present" state. In the manual options mode, the operator can touch the power input display element to power off the system, touch the smart mode input display element to return to the smart mode, touch the options mode input display element to return to the manual mode, touch the turbo mode input display element to enter turbo mode, touch the night mode input display element to enter night mode or touch a blower speed input display element to select a blower speed and return to the manual mode. If no button is touched within a specified period of time (e.g. 60 seconds), the system may automatically revert to the smart mode. If no button is touched within a specified period of time (e.g. 60 seconds), the system may automatically revert to the manual mode.

Once in the "turbo" mode, the control subsystem operates the blower at the highest speed setting (or some other predetermined speed setting) for a preset period of time (e.g. 30 minutes) and then returns automatically to the previous mode of operation. The turbo mode may also be interrupted by a button touch, in which case the system may transition out of the turbo mode prior to expiration of preset period of time. The turbo mode input display element and power input display element are illuminated in the "on" state. The blower speed display and dust level display are also illuminated. Additionally, the smart mode input display element, the options mode input display element and the night mode input display element are off. In this mode, the operator has the options of touching the turbo mode input display element to return to the previous mode of operation or touching the power input display element to power off the ATS.

Once in the "night" mode, the control subsystem continues to operate the ATS in the same mode of operation, but the content of the display is reduced to minimize light emissions. In the night mode, the night mode input display element is illuminated in the "present" state and power input display element is illuminated in the "on" state. The remaining display elements are off. In this mode, the operator has the options of disabling night mode (i.e. re-enabling the display in accordance with the current mode of operation) by touch the night mode input display element or powering off the ATS by touching the power input display element.

D. Front Cover

As noted above, the ATS 10 includes a removable front cover 32 that closes the front of the ATS 10 covering the filters 100, 102 and 104, as well as the electronics module 14 and blower 56. The front cover 32 of the illustrated embodiment defines a central inlet 106a and is offset from the ATS housing 110 so that they cooperatively define a side inlets 106b-c. An inlet trim piece 98 may be fitted into the central inlet 106a. In the illustrated embodiment, the front cover 32 is convex creating a relatively large head space between the rear surface of the front cover 32 and the installed filters. This may allow air to enter more freely into the ATS 10 through the central inlet 106a.

In this embodiment, the front cover 32 also forms the interface surface of the "dead front" display 16. As such, the front cover 32 of this embodiment is translucent (e.g. not entirely transparent or entirely opaque with respect to visible light) at least in the region of the electronics module 14 overlying the LED array 62, light duct array 72 and screens 74a and 74b. The front cover 32 may be manufactured from a translucent polymer (e.g. a molded thermoplastic) having a paint coating or film coating that provides the desired translucency. In one embodiment, the front cover 32 is covered by an in-mold film process. To facilitate proper appearance of the "dead front" display, it may be necessary to carefully control the paint or film coating applied to the front cover 32. Alternatively, the front cover 32 may be manufactured from a translucent material, such as a molded translucent thermoplastic.

In the illustrated embodiment, the front cover 32 is configured to allow one-handed removal and installation. The front cover 32 includes a mechanical attachment point at the top and a pair of magnetic attachment points at the bottom. In the illustrated embodiment, the mechanical attachment point registers on the electronics module 14. This helps to ensure proper alignment between the front cover 32 and the underlying components of the display 16, which may help to ensure proper appearance and operation of the "dead front" display. Although the mechanical attachment point registers off the electronics module 14 in the illustrated embodiment, it may register off other structures in alternative embodiments.

Figure 2:
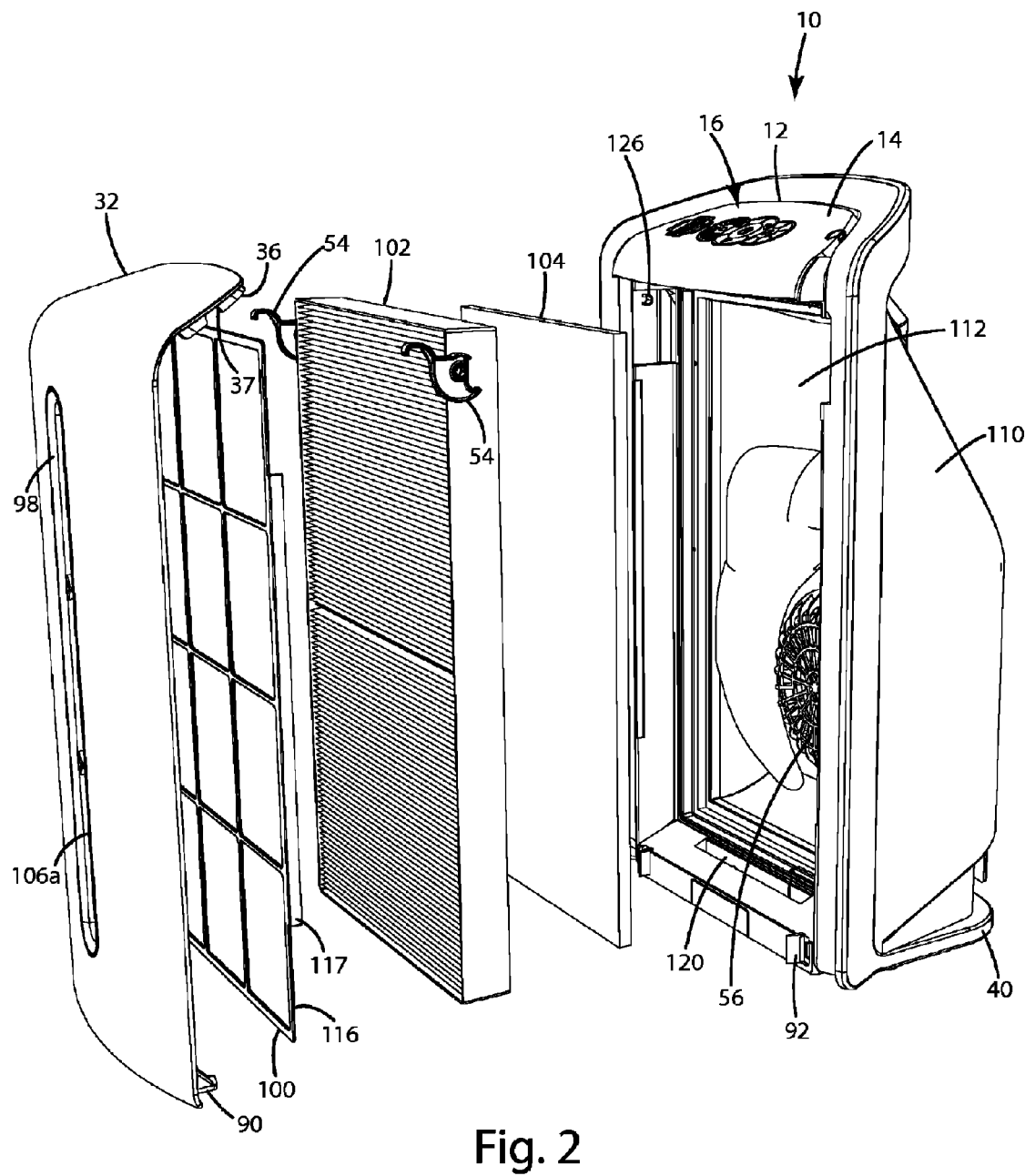
FIG. 2 is an exploded perspective view of the ATS showing the front cover and filters removed from the ATS.
Figure 19A:
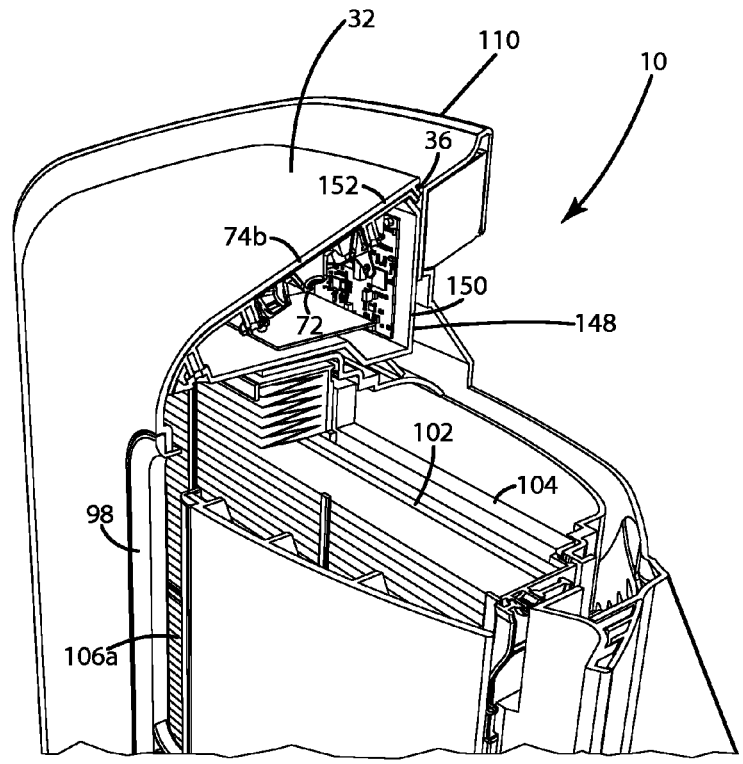
FIGS. 19A-B are sectional views showing the top attachment point between the front cover and the ATS.
Figure 19B:
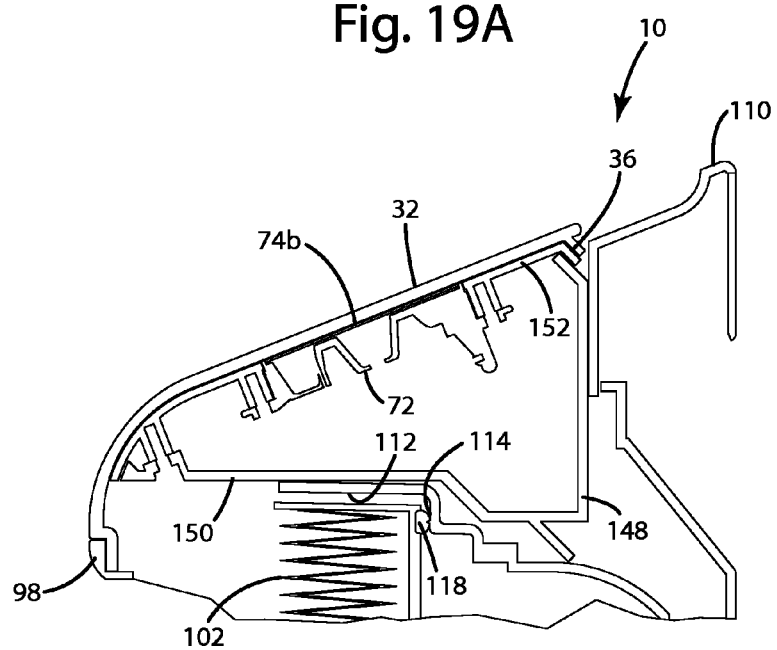

Referring now to FIGS. 19A and 19B, the mechanical attachment point of the illustrated embodiment includes a lip 36 that extends from the front cover 32 and is configured to catch on the electronics module 14. In the illustrated embodiment, the lip 36 extends approximately the full width of the electronics module 14, except that it may include a gap 37 (See FIG. 2) aligned with the dust sensor inlet 82. The lip 36 of this embodiment is oriented at an angle that allows the lip 36 to catch on the electronics module 14 as the front cover 32 is lowered into place. It allows the front cover 32 to be disengaged from the ATS housing 110 by sliding it upwardly with respect to the ATS housing 110. This upward sliding motion not only disengage the lip 36 from the electronics module 14, but may also simultaneously disengage the magnets 90 from the attachment plates 92 in the ATS housing 110 (as discussed below), thereby facilitating removal. The size, shape and configuration of the lip 36 may vary from application to application. In alternative embodiments, the lip may be replaced by essentially any other male or female structure capable of engaging with the electronics module 14.

Figure 20A:
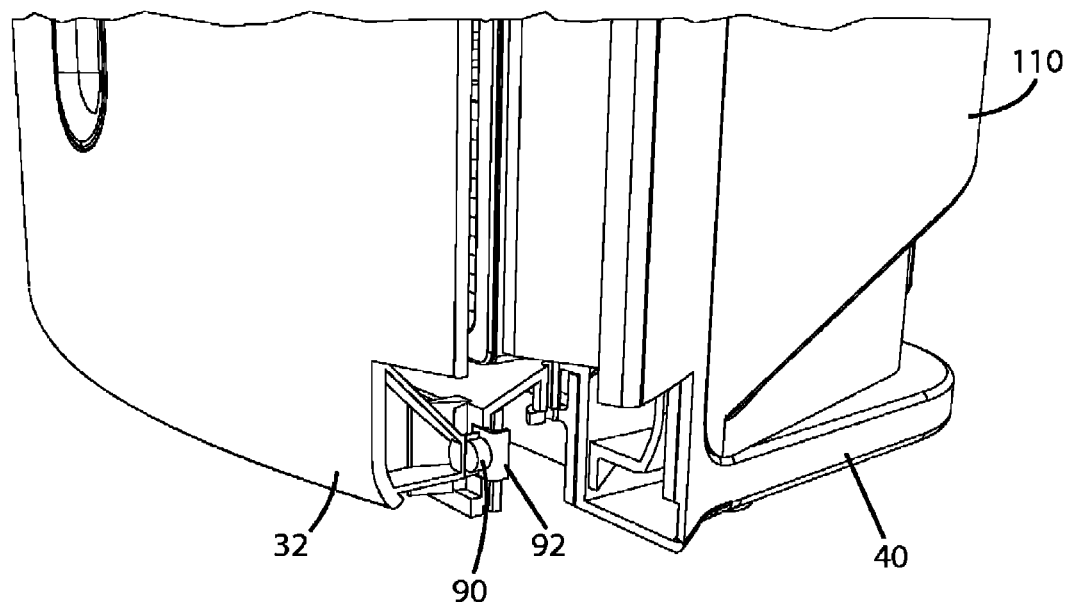
FIGS. 20A-B are sectional views showing a bottom attachment point between the front cover and the ATS.
Figure 20B:
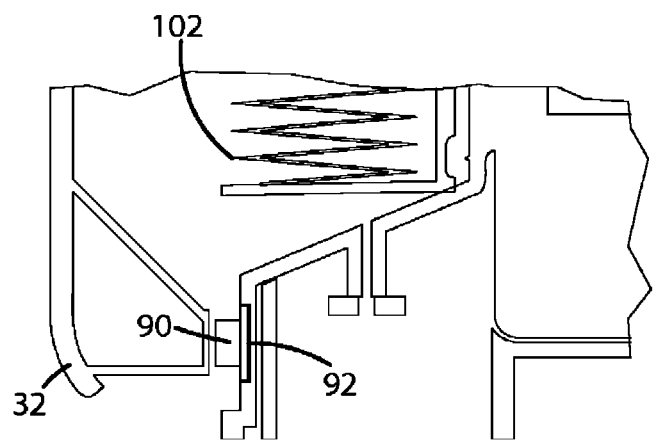

In this embodiment, the front cover 32 includes two magnetic attachment points position toward opposite sides of the bottom of the front cover 32. Each magnetic attachment point includes a magnet 90 carried by the front cover 32 and a magnetically attractive plate 92 mounted the ATS housing 110 (See FIGS. 20A and 20B). The magnets 90 may be disc-shaped rare-earth magnets that are mounted in corresponding sockets 94 protruding from the rear of the front cover 32. The plates 92 may be sized and shaped so that the magnets 90 substantially disengage from the plates 92 when the front cover 32 is slid upward a sufficient distance for the lip 36 to clear the electronics module 14. The number, size, shape and configuration of the magnets and plates may vary from application to application as desired. For example, stronger magnets or more magnetic attachment points may be used to increase the force required to remove the front cover 32.

In use, the front cover 32 may be removed and installed in various ways. One option for removing the front cover 32 is shown in FIG. 17A. With this option, the front cover 32 is slid upward with respect to the ATS housing 110 a sufficient distance for the lip 36 to clear the electronic module 14, and then the top of the front cover 32 is tilted away from the ATS housing 110 to overcome any remaining magnetic attraction at the magnetic attachment points. The front cover may be installed using essentially the reverse process. Another option for removing the filter is shown in FIG. 17B. With this option, the operator reaches down and pulls the bottom of the front cover 32 away from the ATS housing 110 until the magnets 90 disengage from the plates 92. The operator then lift the front cover 32 a sufficient distance for the lip 36 to clear the electronics module 14. The front cover 32 may be installed by draping the top of the front cover 32 over the electronics module 14 and then swinging the bottom of the front cover 32 toward the ATS housing 110 until the magnets 90 engage the plates 92.

The front cover 32 may include an interlock magnet (not shown) that allows the control subsystem 60 to recognize when the front cover 32 in installed and when it is removed. The interlock magnet may be located toward the top of the front cover 32 where it can be sensed by a hall-effect or other magnetic field sensor that is incorporated into the electronics module 14. As an alternative to using a separate interlock magnet, the ATS 10 may include a hall-effect sensor (or other magnetic field sensor) that is positioned to allow it to recognize the presence or absence of the front cover 32 based on one of the magnets 90 used to attach the front cover 32 to the ATS housing 110.

If desired, the electronic module 14 may include LEDs or other light sources that can be engage to provide illumination that is visible through the central inlet opening 106a and/or at the side of front cover 32. This illumination may be provided as accent lighting or may have a functional purpose. For example, the control system 12 may provide blue illumination or no illumination when the ATS 10 is operating properly and does not require maintenance, and it may provide red illumination when operator intervention is required. This may occur when it is necessary to change or clean a filter, or when there has been a system error. The red illumination may flash when a particular urgent issue exists.

As noted above, the front cover 32 incorporates an appropriate level of translucency to produce a "dead front" display 16. As an alternative, the "dead front" display may be produced by a translucent component disposed below the front cover 32, such as a separate panel disposed over the electronics module 14. In such embodiments, the front cover 32 may be transparent or sufficiently translucent to allow the underlying "dead front" display to be seen through the front cover 32.

E. Mobility Features

In the illustrated embodiment, the ATS 10 may be configured to interface with one of a plurality of interchangeable bases 40. In the illustrated embodiment, the bases 40, 40' and 40" are secured to the ATS housing 110 using screws or other fasteners. The number and location of fasteners may vary from application to application. As an alternate or in addition to fasteners, the ATS housing 110 and bases 40, 40' and 40" may be provided with snap features that allow the desired base to be snap-fitted to the ATS 10.

Figure 21:
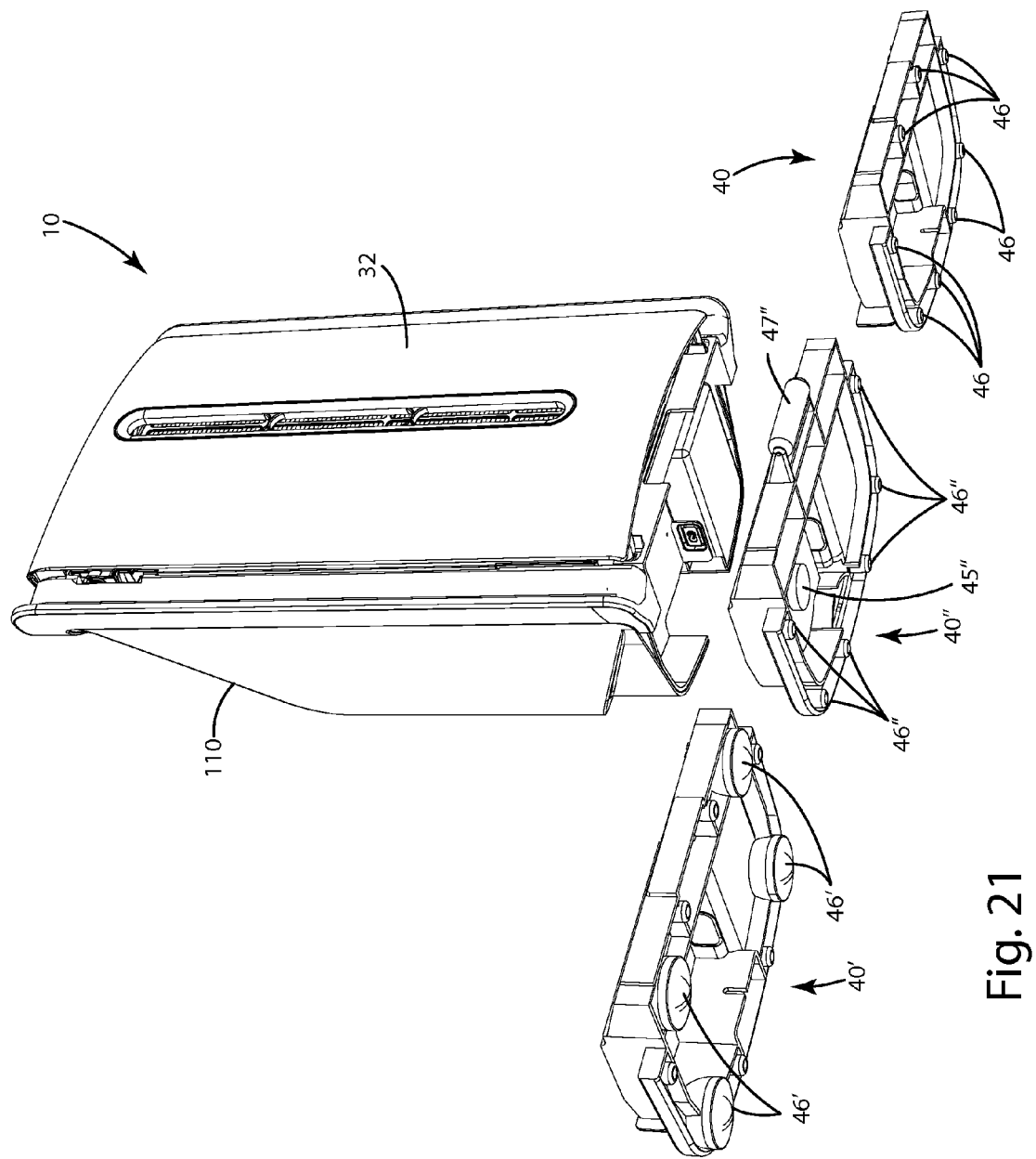
FIG. 21 is a partially exploded front perspective view showing the ATS and three interchangeable bases.
Figure 22:
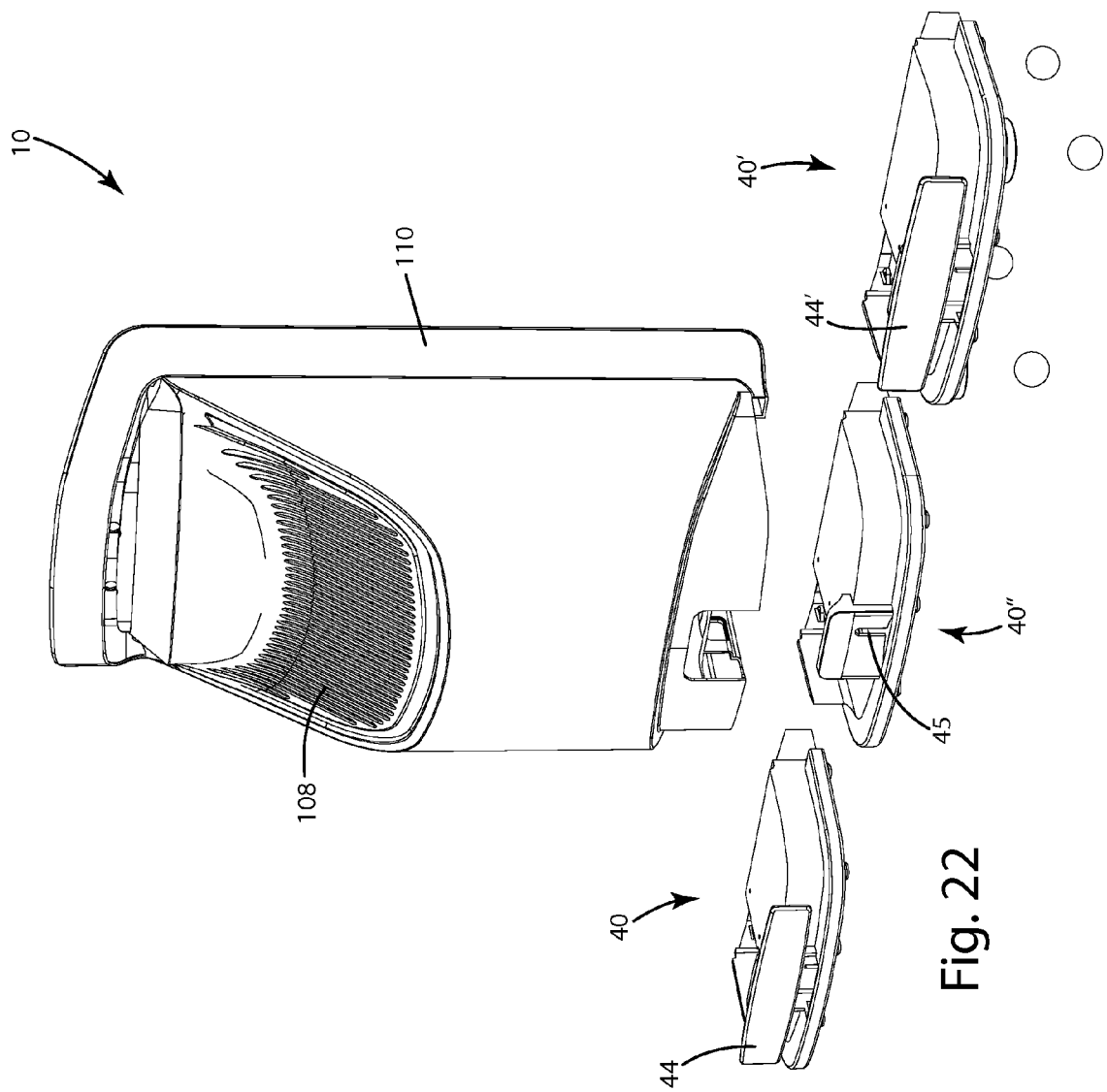
FIG. 22 is a partially exploded rear perspective view showing the ATS and three interchangeable bases.

Different bases 40 may provide different structure for receiving the power cord 42 and/or different structure for supporting the ATS 10. An ATS 10 with three alternative bases 40, 40' and 40" are shown in FIGS. 21 and 22. In general, base 40 has a bobbin 44 for manually winding the power cord 42 and a plurality of fixed feet 46; base 40' has a bobbin 44' for manually winding the power cord 42' and a plurality of caster 46'; and base 40" include a cord retraction assembly 45 with an automatic take-up reel (not shown) and a combination of fixed feet 46" and a roller 47". Although the illustrations show an embodiment of a bobbin that extends laterally across a portion of the ATS housing 110, the term "bobbin" is intended to include any individual feature or combination of features provided as a structure around which the power cord 42 may be wrapped.

In the illustrated embodiment, the ATS 10 also includes a handle 48 disposed on the top rear of the ATS housing 110. The handle 48 of this embodiment extends essentially the full width of the ATS 10 to allow the ATS 10 to be grabbed in the center by a single hand or toward opposite sides by two hands. In this embodiment, the handle 48 may include a relatively deep central pocket of sufficient depth to receive an operators fingers up to approximately two knuckles and relatively shallow side pockets of sufficient depth to receive an operator's fingers up to approximately the first knuckle. The handle 48 may be a one-piece component that is secured to the ATS housing 110, for example, by fastener, or it may be integrally formed with other parts of the ATS housing 110.

With regard to base 40, the handle 48 may be used to lift the ATS 10 when moving it from one location to another. With regard to base 40', handle may be used to grasp the ATS when rolling it from location to location on casters 46'. With regard to base 40", the handle 48" can be used to tilt the ATS 10 forward onto the roller 47" and to roll the ATS 10 from one location to another.

F. Filter Retainer Assembly

As noted above, the ATS 10 includes a prefilter 100, a particulate filter 102 and a carbon filter 104 that are removably fitted into a filter housing 112. The system includes a filter retainer assembly 50 that facilitates quick and secure installation and removal of the filters. In the illustrated embodiment, the filter retainer assembly 50 includes a catch 52 and a pair of clips 54 integrated into the frame of the particulate filter 102, as well as a locking protrusion 126 integrated into the ATS housing 110. Because the prefilter is secured to the particulate filter 102 and the particulate filter 102 covers the carbon filter 104, the filter retainer assembly 50 effectively secures all three filters 100, 102 and 104. In the illustrated embodiment, the clips 54 are configured so that they draw the particulate filter 102 tightly into the filter housing 112 as they are closed. This helps to compress a face seal 118 on the particulate filter 102 against shoulder 114 to facilitate an airtight seal.

Figure 29A:
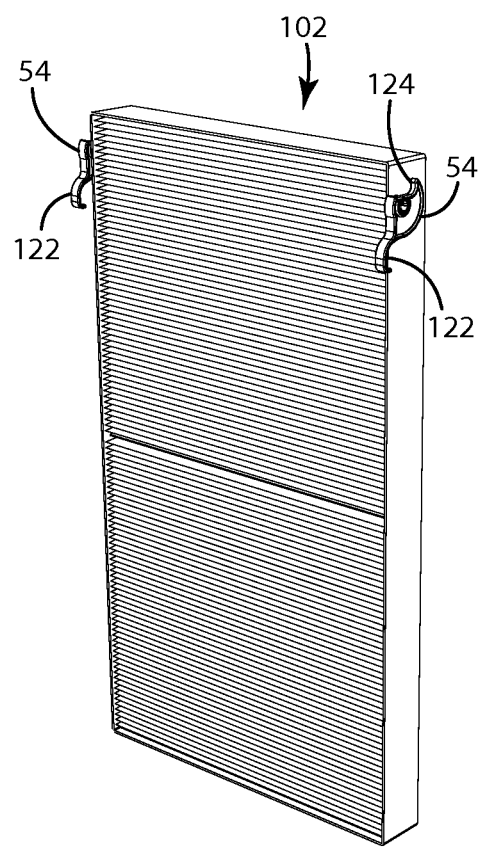
FIG. 29A is a perspective view of the particulate filter.
Figure 29B:
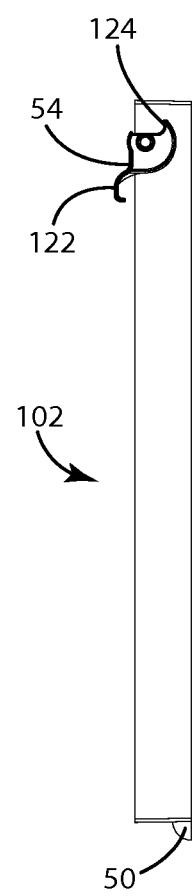
FIG. 29B is a side elevational view of the particulate filter.

Referring now to FIG. 29B, the catch 52 is disposed at the bottom center of the frame of the particulate filter 102. The catch 52 of this embodiment is molded integrally with the frame of the particulate filter 102, but it may alternatively be formed separately and affixed to the frame. The catch 52 of the illustrated embodiment has a quarter-round cross-section that may facilitate installation and removal from a corresponding void 120 in the filter housing 112. The number, size, shape and configuration of the catch 52 and void 120 may vary from application to application as desired. For example, the positions of the catch 52 and void 120 can be reversed with the catch extend from the filter housing 112 and the void being defined in the particulate filter 102.

Figures 30A, 30B, 30C, 30D:
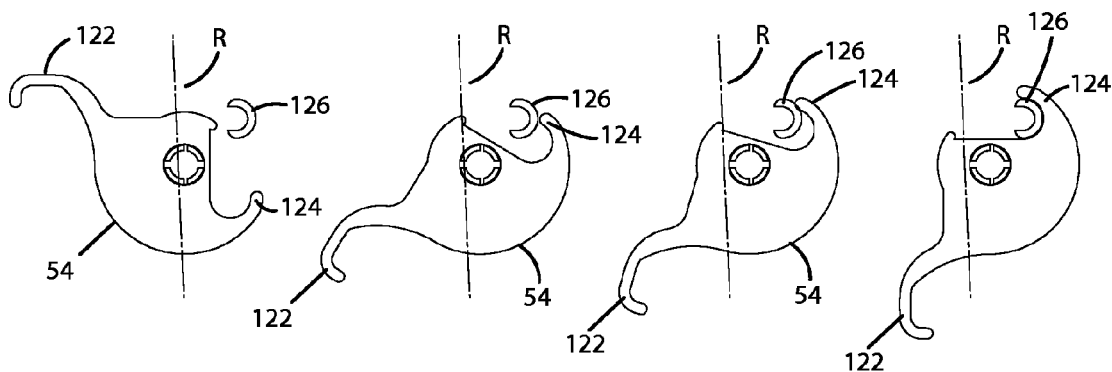
FIGS. 30A-D are a series of drawings representing actuation of a filter latch in accordance with an embodiment of the present invention.

As perhaps best shown in FIGS. 29A and 29B, the clips 54 are rotatably mounted to opposite sides of the frame of the particulate filter 102. Each clip 54 may include a handle 122 and a hook 124. The handle 122 is configured to provide structure that can be used by an operator to rotate the clips 54. The hook 124 is configured to engage the locking protrusion 126 as the clip 54 is rotated into the closed position. The hook 124 and locking protrusion 126 are configured such that there is interference between the two for a short distance as the clip 54 approaches the closed position. This creates a snap-fit that helps to secure clip 54 in the closed position. Further movement toward the closed position cause the hook 124 to flex creating resistance to further movement toward the closed position. As the clip 54 continues toward the closed position, the hook 124 clears the region of interference and begins to return to its original un-flexed condition. This pushes the clip 54 the remaining way into the closed position. In the illustrated embodiment, the location and configuration of the hook 124 with respect to the pivot location is selected so that the clips 54 provide a cam-like function that pulls the particulate filter 102 into the filter housing 112 as the clips 54 are closed. Operation of the clip 54 is shown in FIGS. 30A-D. In FIG. 30A, the clip 54 is shown in the open position. In this position, the hook 124 is disengaged from the locking protrusion 126. FIG. 30B shows the clip 54 in a partially closed position. As can be seen, the hook 124 has moved into engagement with the locking protrusion 126. In this position, the particulate filter 102 has been draw partially into the filter housing 112 as can be seen by comparison with reference line R. FIG. 30C shows the clip 54 moved farther toward the closed position. In this view, the hook 124 has engaged the locking protrusion 126 and has begun to flex outwardly away from the locking protrusion 126 due to interference between the two. As can be seen, the particulate filter 102 has been drawn farther into the filter housing 112. In FIG. 30D, the clip 54 is in the closed position. In this position, the hook 124 has moved past the region of interference and is fully engaged with the locking protrusion 126. The particulate filter 102 has been drawn fully into the filter housing 112.

Removal of the particulate filter 102 is described in connection with FIGS. 28A-D. In the first illustration, the front cover 32 and prefilter 100 are removed to provide access to the particulate filter 102 (See FIG. 28A). In the illustrated embodiment, it is not necessary to remove the prefilter 100 from the particulate filter 102. In the next illustration, each of the clips 54 has been rotated from the closed to open position (See FIG. 28B). This disengages the hooks 124 from the locking protrusions 126 in the filter housing 112. The next illustration shows the top of the particulate filter 102 being tilted away from the filter housing 112 (See FIG. 28C). The final illustration shows the filter 102 being lifted from the filter housing 112 to disengage catch 52 from void 120 (See FIG. 28D). The particulate filter 102 can be installed using essentially the reverse process.

Figures 31A, 31B, 31C, 31D:
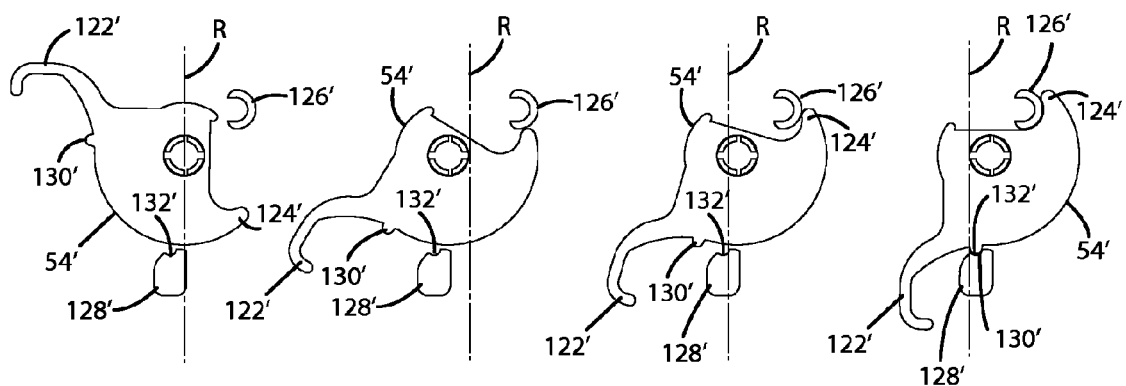
FIGS. 31A-D are a series of drawings representing actuation of a filter latch in accordance with an alternative embodiment.

The design and configuration of the clips may vary from application to application. Alternative clips 54' and 54" are shown in FIGS. 31A-D and 32A-D. In both of these alternative embodiment, the filter retainer assembly further includes locking pins 128', 128" that secure the clips 54', 54" in the closed position. The locking pins 128', 128" protrude from the particulate filter 102, but could alternatively protrude from the filter housing 112, if desired. Alternative clip 54' includes a tooth 130' protruding from the outside edge of the clip 54'. The tooth 130' is configured to engage a corresponding recess 132' in locking pin 128' when the clip 54' is in the closed position. Together, the tooth 130' and locking pin 128' snap-lock the clip 54' in the closed position. Operation of the clips 54' is shown with reference to FIGS. 31A-D. In FIG. 31A, the clip 54' is shown in the open position. In this position, the hook 124' is disengaged from the locking protrusion 126'. FIG. 31B shows the clip 54' in a partially closed position. As can be seen, the hook 124' has moved into engagement with the locking protrusion 126'. In this position, the particulate filter 102 has been draw partially into the filter housing 112 as can be seen by comparison with reference line R. FIG. 31C shows the clip 54' moved farther toward the closed position. In this view, the hook 124' has further engaged the locking protrusion 126' and drawn the filter 102 farther into the filter housing 112. In FIG. 31D, the clip 54' is in the closed position. In this position, tooth 130' has become seated in recess 132' and the particulate filter 102 has been drawn fully into the filter housing 112. The interrelationship between the tooth 130' and the locking pin 128' helps to secure the clip 54' in the closed position.

Figures 32A, 32B, 32C, 32D:
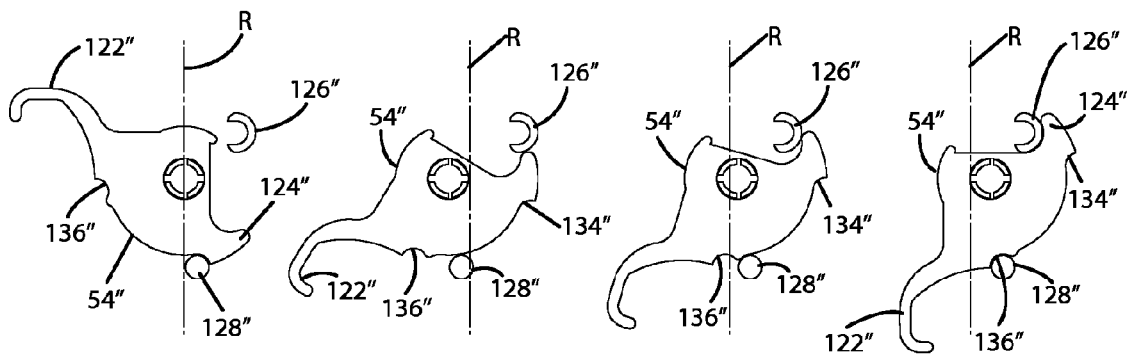
FIGS. 32A-D are a series of drawings representing actuation of a filter latch in accordance with a second alternative embodiment.

Alternative clip 54" is similar to clip 54'. In this embodiment, the clip 54" includes a series of contours that interact with the locking pin 128" to control movement and feel of the clip 54". More specifically, the clip 54" includes a stop 134" and a seat 136" that are configured to engage with the locking pin 128" when the clip 54" is in the opened or closed positions. The stop 134" is configured to engage the locking pin 128" when the clip 54" is in the fully open position. The stop 134" helps to limit the range of motion of the clip 54". The seat 136" is configured to interlock with the locking pin 128" when the clip 54" is in the fully closed position. The leading edge of the seat 136" may be raised to create a snap-fitting interaction as the clip 54" is closed or opened. Operation of clips 54" is now described with reference to FIGS. 32A-D. In FIG. 32A, the clip 54" is shown in the open position. In this position, the hook 124" is disengaged from the locking protrusion 126" and the stop 134" is engaged with the locking pin 128". FIG. 32B shows the clip 54" in a partially closed position. The hook 124" has moved into engagement with the locking protrusion 126". In this position, the particulate filter 102 has been draw partially into the filter housing 112 as can be seen by comparison with reference line R. FIG. 32C shows the clip 54" moved farther toward the closed position. In this view, the hook 124" has further engaged the locking protrusion 126" and drawn the filter 102 farther into the filter housing 112. Also, the leading edge of the seat 136" has begun to engage the locking pin 128". In FIG. 32D, the clip 54" is in the closed position. In this position, the locking pin 128" and seat 136" are fully engaged and the particulate filter 102 has been drawn fully into the filter housing 112. The relationship between the locking pin 128" and the seat 136" helps to secure the clip 54' in the closed position.

G. Alternative Embodiment

The present invention is capable of implementation in a wide variety of alternative embodiments. For example, one alternative embodiment is shown in FIG. 33A-53D. Except to the extent described below or shown in the accompanying drawings, this alternative embodiment is generally identical to the embodiment shown above in FIGS. 1A-20B. To facilitate disclosure, this alternative embodiment will be described with reference numerals that are identical to the reference numerals used in connection with ATS 10, except preceded by the number "4." For example, the alternative ATS is designated by reference numeral 410 (analogous to ATS 10) and the ATS housing of the alternative ATS is designated by reference numeral 4110 (analogous to ATS housing 110).

Figure 33A:
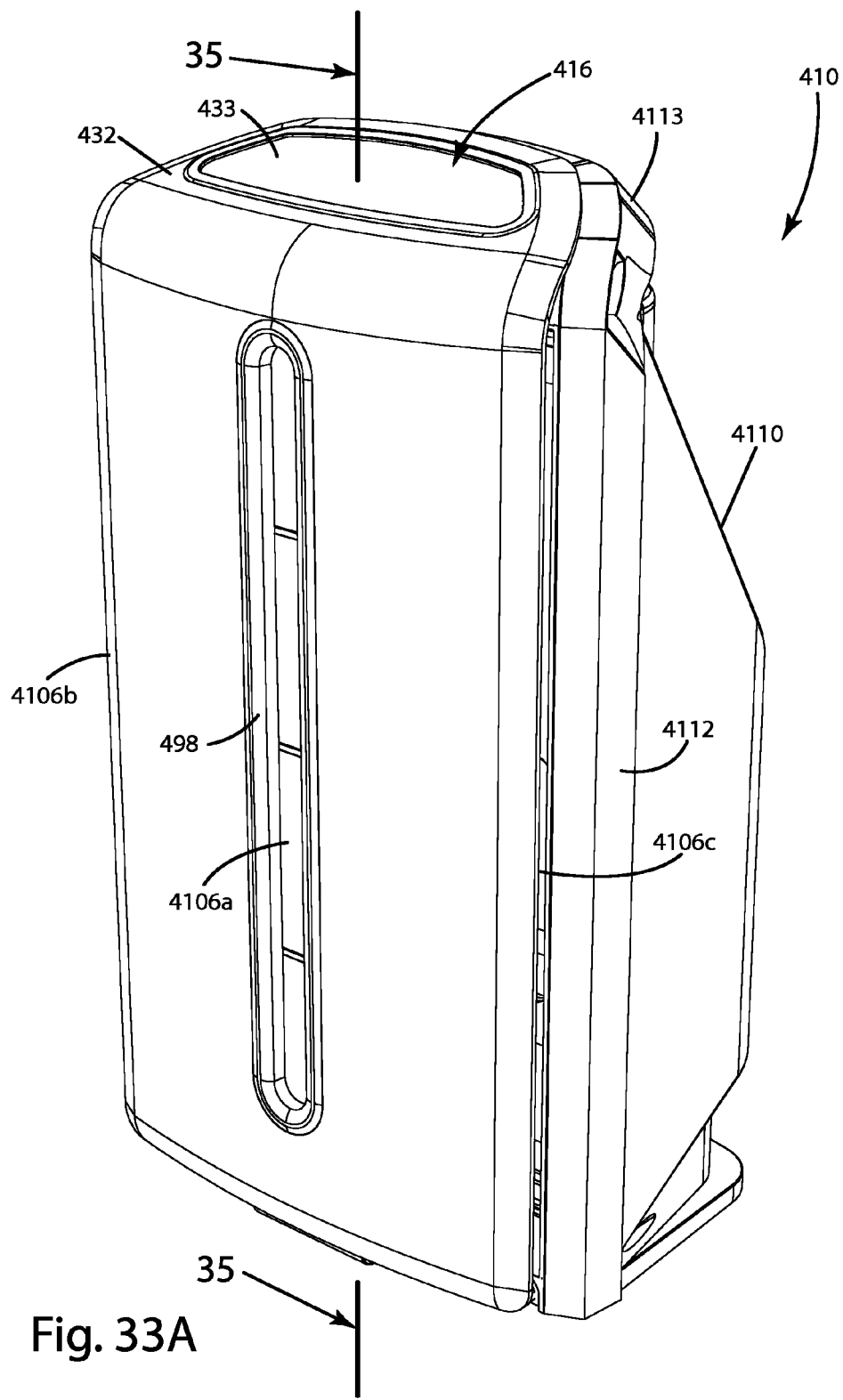
FIG. 33A is a front perspective view of an ATS in accordance with an alternative embodiment of the present invention.
Figure 33B:
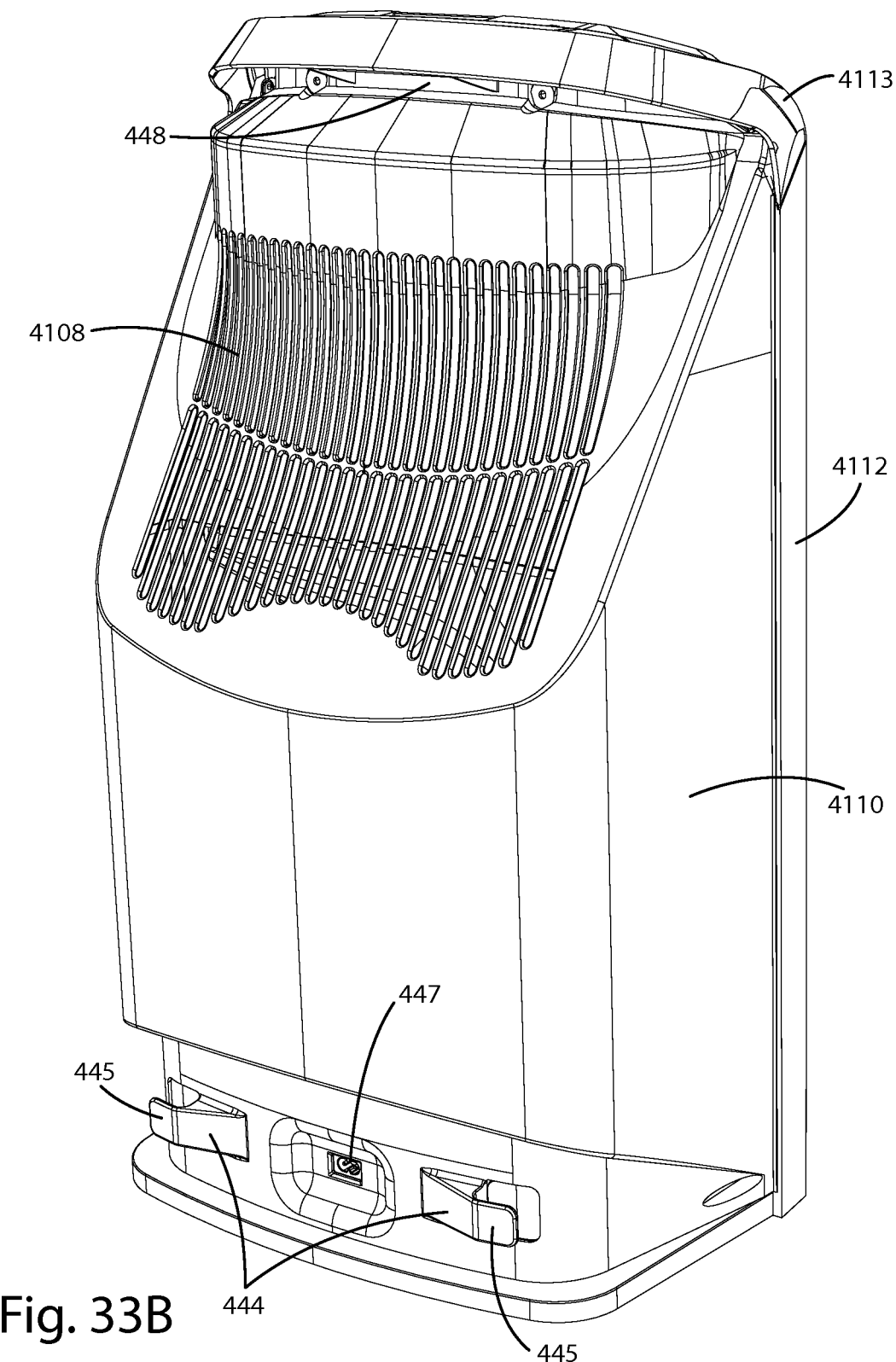
FIG. 33B is a rear perspective view of the alternative ATS.
Figure 34:
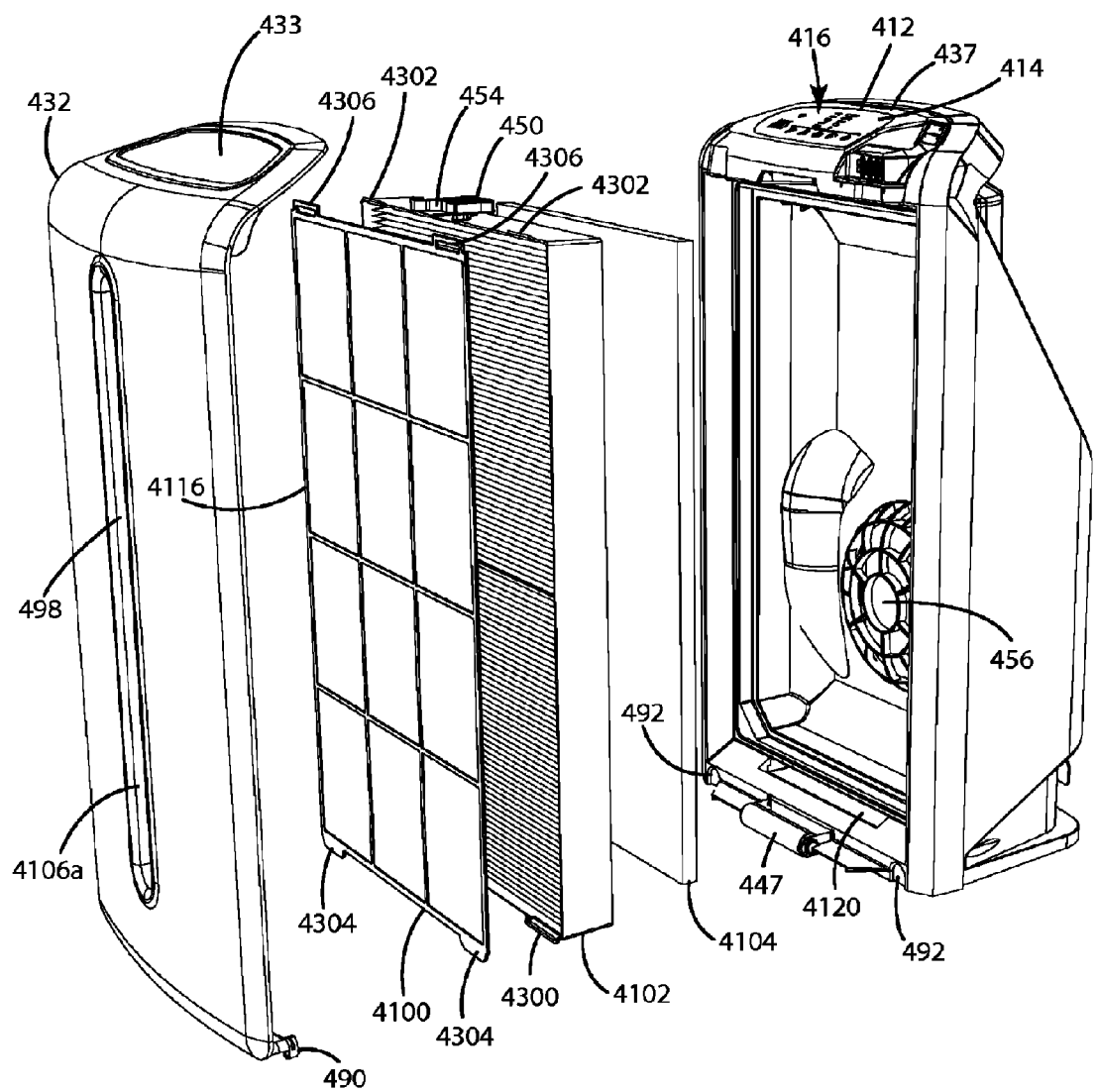
FIG. 34 is an exploded perspective view of the alternative ATS showing the front cover and filters removed.
Figure 35:
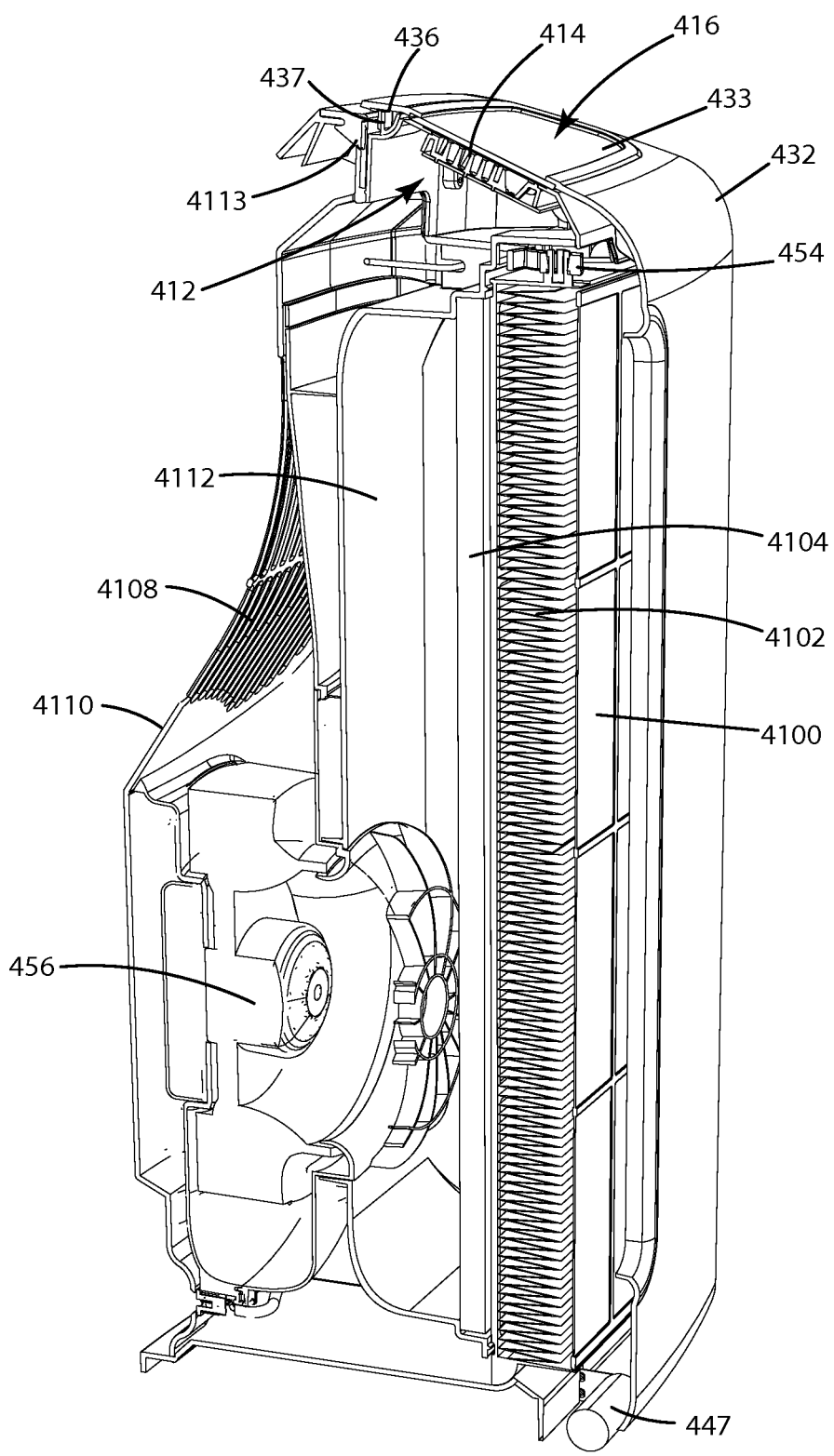
FIG. 35 is a cross-sectional view of the alternative ATS taken along line 35-35 of FIG. 33A.
Figure 36:
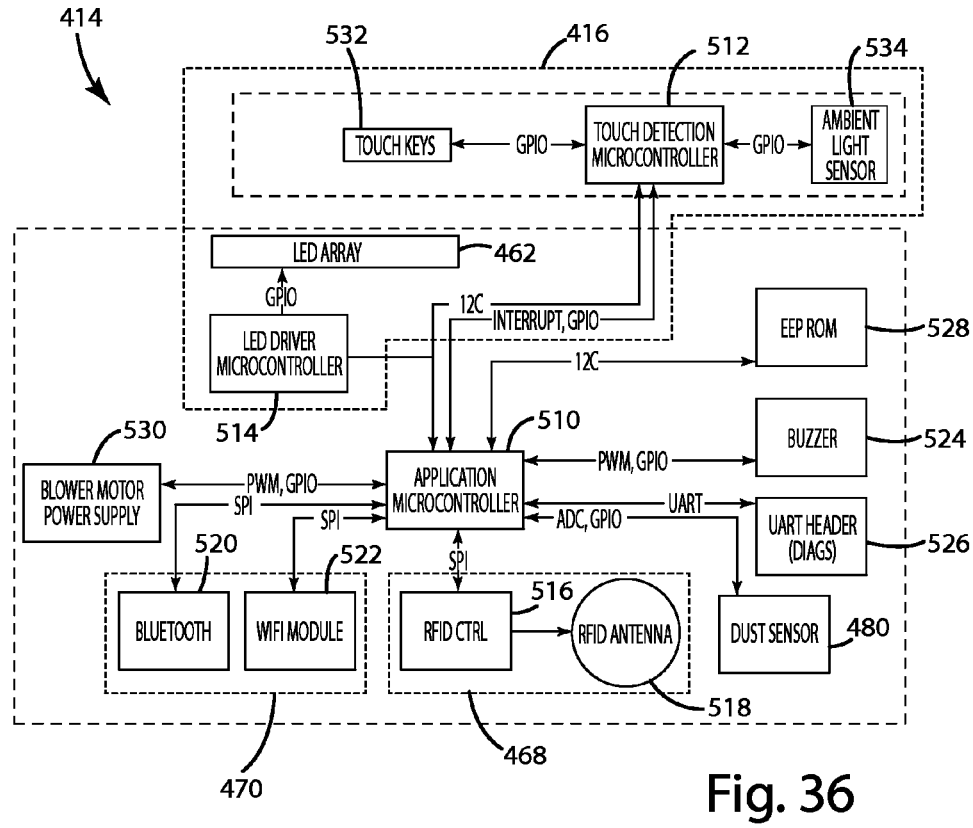
FIG. 36 is a schematic representation of the electronics module of the alternative ATS.

Referring now to FIGS. 33A, 33B and 34, ATS 410 generally includes a housing assembly that houses a control system 412, a blower 456, a prefilter 4100, a particulate filter 4102 and an activated carbon filter 4104. The ATS 410 includes untreated air inlets 4106a-c in the front through which untreated air can be drawn into the system and an air outlet 4108 in the rear through which treated air can be returned to the environment (See FIG. 44). In operation, the control system 412 operates the blower 456 to draw untreated air into the ATS 410 through the inlets 4106a-c, move the untreated air successively through the three filters 4100, 4102 and 4104 and then discharge the treated air through the outlet 4108. The size, shape and configuration of the inlet, outlet and internal flow path may vary from application to application as desired.

Referring again to FIG. 34, the housing assembly generally includes a main housing 4110, a filter housing 4112 and a top housing 4113. The main housing 4110 primarily forms the rear, sides and bottom of the ATS 410. As with ATS 10, the filter housing 4112 is affixed to the main housing 4110 to close the front of the ATS 410 and provides seats for the particulate filter 4102 and the carbon filter 4104. As perhaps best shown in FIG. 49, the top housing 4113 is attached to the back side of the filter housing 4112, for example, by screws (not shown). The top housing 4113 includes an integral handle 448. In this embodiment, the handle 448 includes a central section that can be gripped by a single hand and a pair of side sections that can be gripped with both hands. In the illustrated embodiment, the main housing 4110 includes a cord wrap 444 (or bobbin) for manually winding the power cord (not shown) (See FIG. 33B). In this embodiment, the cord wrap 444 includes a pair of fingers 445 spaced apart on opposite sides of power cord input port 447. The size, shape and configuration of the fingers 445 may vary depending, for example, on the characteristics of the power cord. As shown, the cord wrap 444 may be positioned in a recess in the main housing 4110 so that it does not protrude and therefore does not increase the profile of the ATS 410.

ATS 410 includes a removable front cover 432 that closes the front of the ATS 410 covering the display 416 and the filters 4100, 4102 and 4104. As can be seen in various FIGS., such as FIGS. 33a, 44 and 46, the front cover 432 defines a central inlet 4106a and is spaced from the filter housing 4112 so that the front cover 432 and filter housing 4112 cooperatively define side inlets 410b-c. The front cover 432 of the illustrated is manufactured from an opaque plastic material, for example, by injection molding. The front cover 432 may alternative be manufactured from a wide range of alternative materials. In this embodiment, the front cover 432 includes a window 433 that covers the display 416. The window 433 is fitted into a corresponding opening 435 defined in the front cover 432. To conceal display elements that are not illuminated, the window 433 of this embodiment is translucent at least in the region or regions overlying the display elements 418. The window 433 may be manufactured from a translucent polymer (e.g. a molded thermoplastic) having a paint coating or film coating that provides the desired translucency. In one embodiment, the window 433 is covered by an in-mold film process. To facilitate proper appearance of the "dead front" display, it may be necessary to carefully control the paint or film coating applied to the window 433. Alternatively, the window 433 may be manufactured from a translucent material, such as a molded translucent thermoplastic.

Figure 46A:
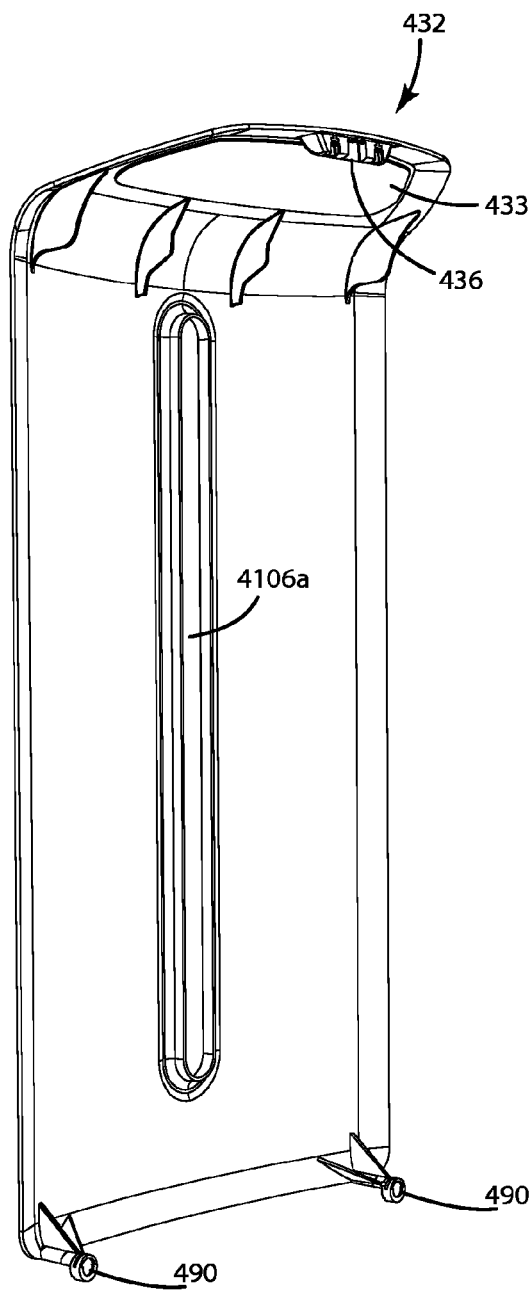
FIG. 46A is a rear perspective view of the front cover.
Figure 46B:
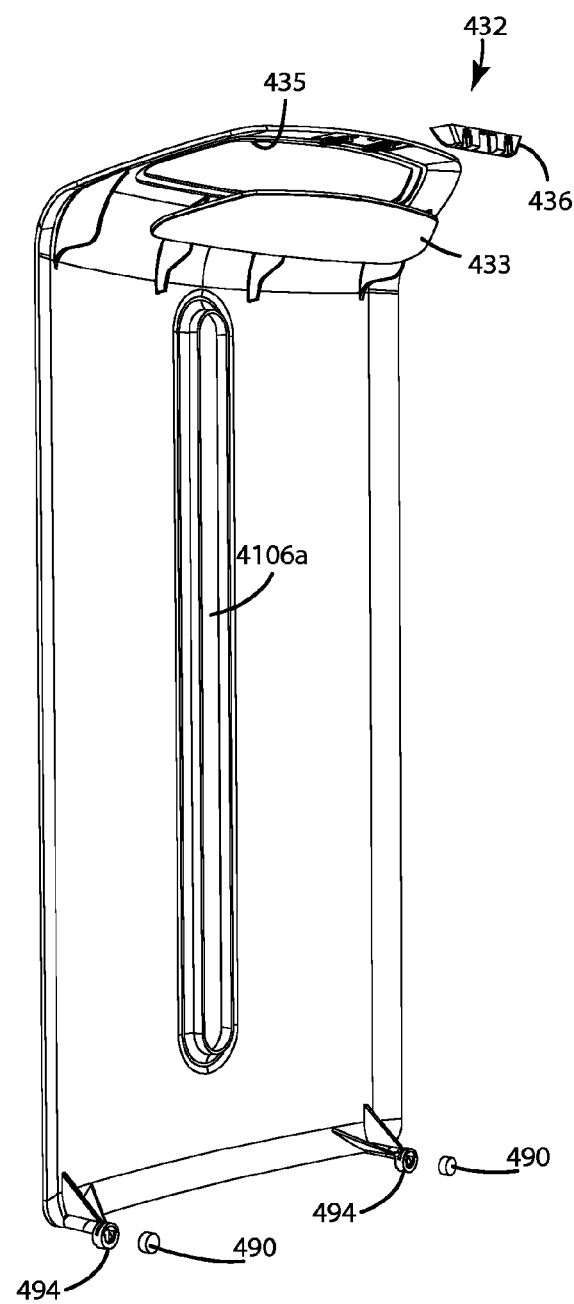
FIG. 46B is an exploded perspective view of the front cover.
Figure 47:
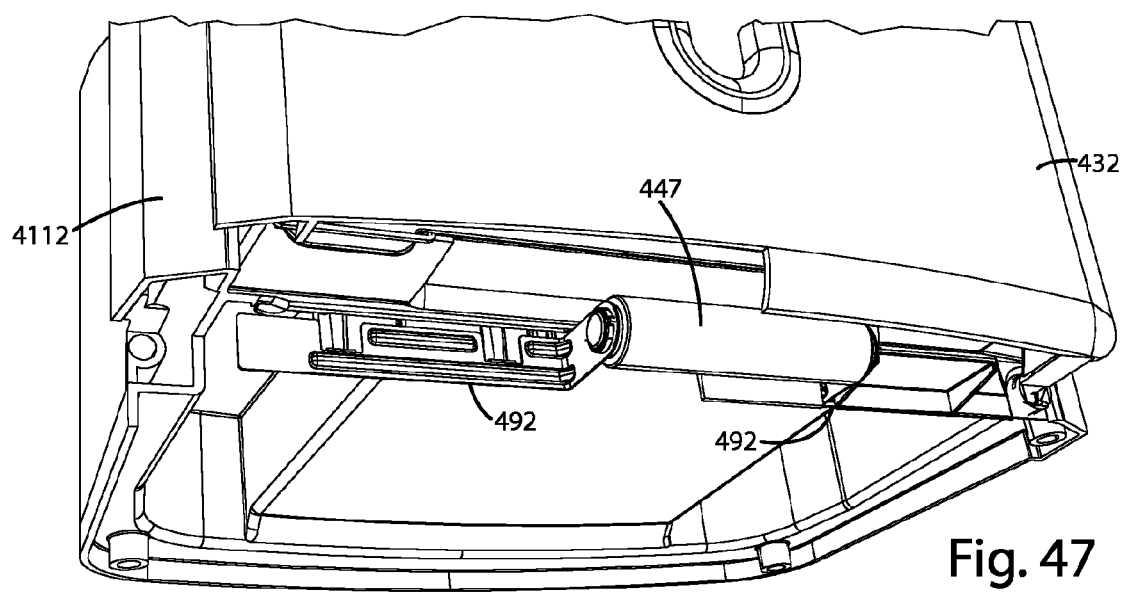
FIG. 47 is a partially sectional view of a bottom portion of the alternative ATS.
Figure 48A:
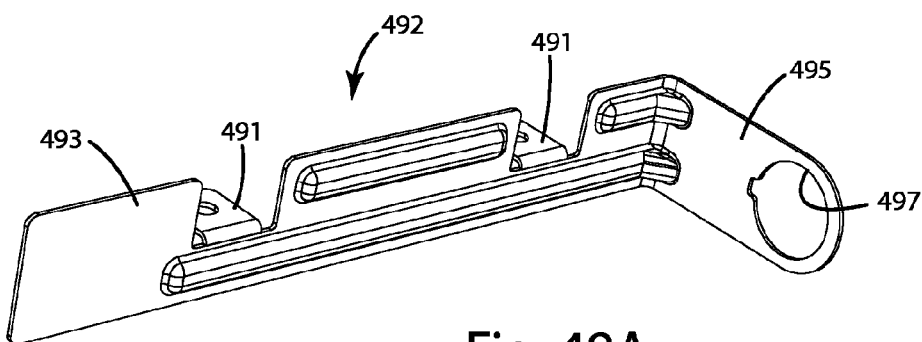
FIG. 48A is a perspective view of an attachment plate.
Figure 48B:
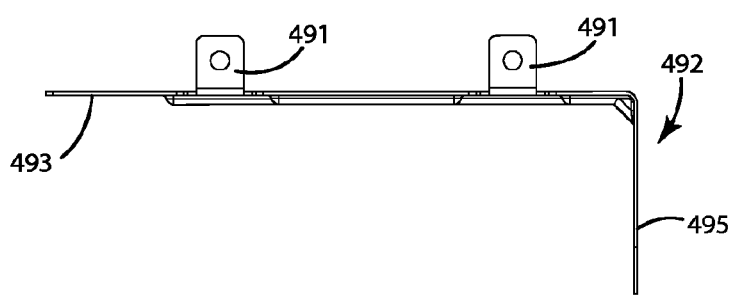
FIG. 48B is a top plan view of the attachment plate.
Figure 49:
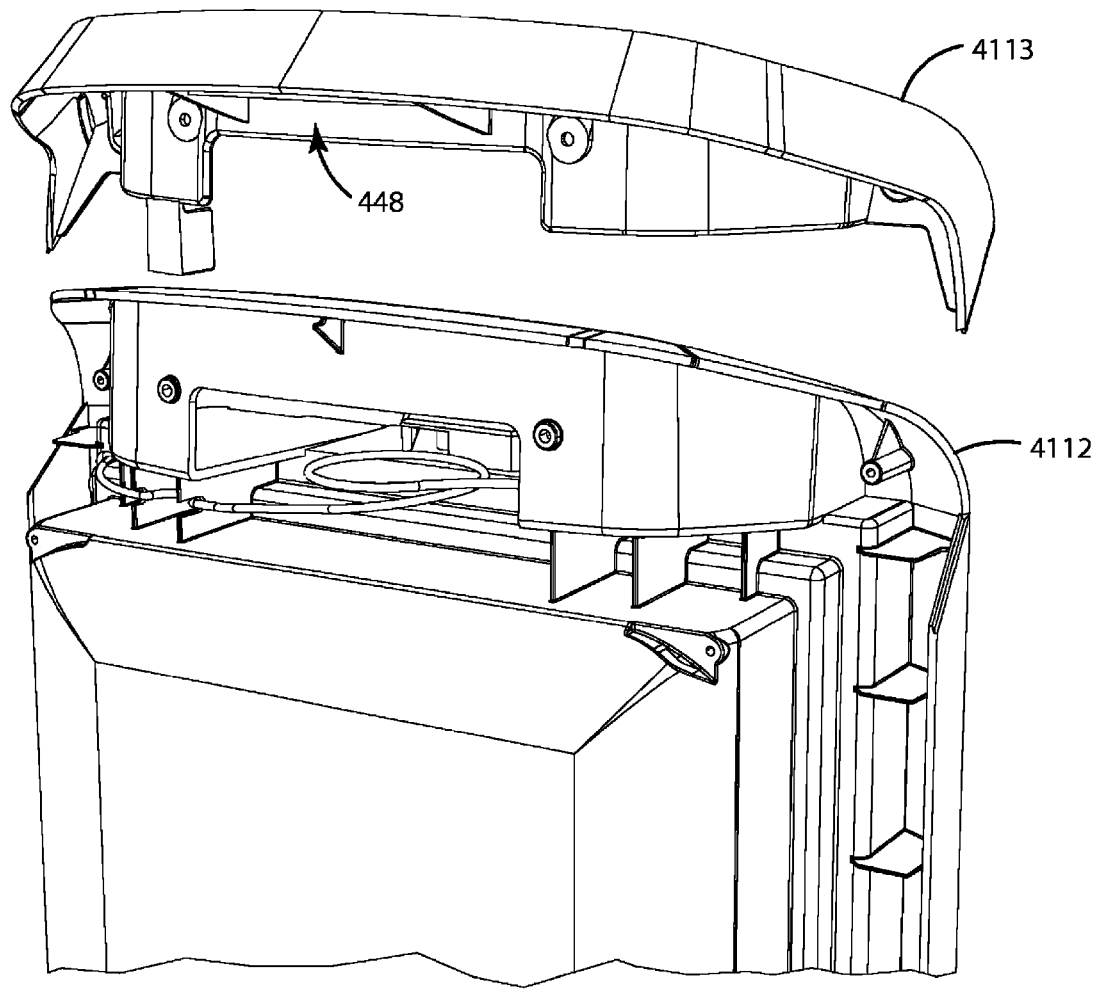
FIG. 49 is an exploded perspective view of a portion of the filter housing and a portion of the top housing.
Figure 50:
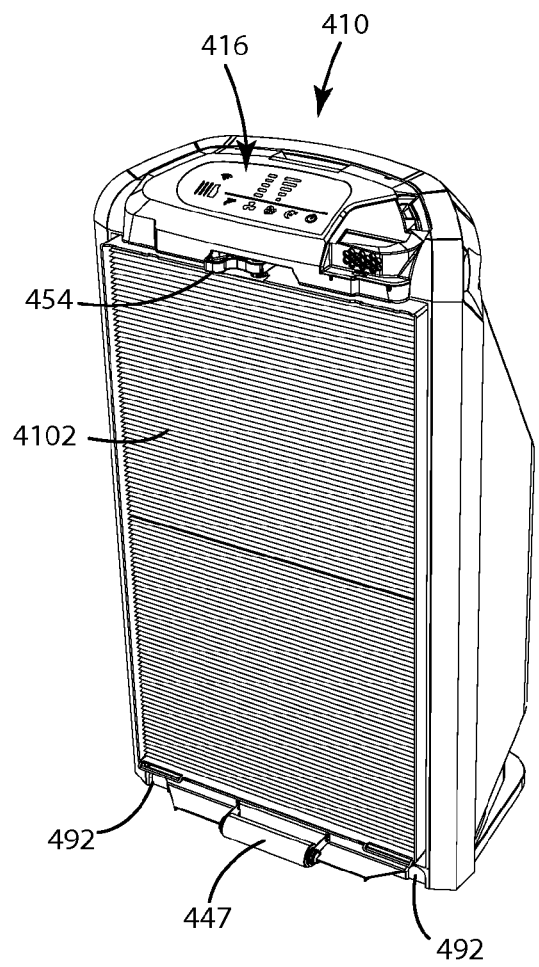
FIG. 50 is a perspective view of the ATS with the front cover and prefilter removed.

In the illustrated embodiment, the front cover 432 is configured to allow one-handed removal and installation. The front cover 432 includes a mechanical attachment point at the top and a pair of magnetic attachment points at the bottom. Referring now to FIGS. 45A, 45B and 46, the mechanical attachment point of the illustrated embodiment includes a catch 436 (or lip) that extends from the front cover 432 and is configured to fit in a seat 437 in the electronics module 414 or in the structure surrounding the electronics module 414. The catch 436 may be separately manufactured and affixed to the front cover 432 (See FIG. 46) or it may be integrally formed with the front cover 432 (not shown). The catch 436 of this embodiment is oriented at an angle that allows the catch 436 to be retained in the seat 437 as the front cover 32 is closed. It allows the front cover 432 to be disengaged from the ATS housing 4110 by sliding it upwardly with respect to the ATS housing 4110. This upward sliding motion not only disengage the catch 436 from the seat 437, but may also simultaneously disengage the magnets 490 from the attachment plates 492 in the ATS housing 4110 (as discussed below), thereby facilitating removal. The size, shape and configuration of the catch 436 may vary from application to application. In alternative embodiments, the catch 436 may be replaced by essentially any other male or female structure capable of engaging with the seat 437 or other similar structure in or around the electronics module 414.

The front cover 432 of this embodiment includes two magnetic attachment points position toward opposite sides of the bottom of the front cover 432. Each magnetic attachment point includes a magnet 490 carried by the front cover 432 and a magnetically attractive plate 492 mounted the ATS housing 4110 (See FIG. 48). The magnets 490 may be disc-shaped rare-earth magnets that are mounted in corresponding sockets 494 protruding from the rear of the front cover 432. In this embodiment, the plates 492 are configured to perform two functions—(i) provide a magnetically attractive structure for the magnets 490 and (ii) rotatably support a roller 447. In this embodiment, each plate 492 is generally L-shaped having a first leg 493 that is positioned to receive the magnet 490 and a second leg 495 that rotatably supports the roller 447. The first leg 493 and the second leg 495 are generally planar, but may include ribs or other contours to enhance strength or to interfit with adjacent components of the ATS 410. The first leg 493 includes a pair of mounting tabs 491 that extend rearwardly and allow the plate 492 be affixed to the housing 4110, for example, by screws (not shown). The second leg 495 defines a circular opening 497 configured to rotatably receive the axle (or shaft) of the roller 447. In use, the two plates 492 trap opposite end of the shaft or axle of the roller 447. In this embodiment, the plate 492 is stamped from sheet stock and is configured to be ambidextrous so that the same plate 492 can be used on opposite sides of the ATS 410 simply by flipping the plate 180 degrees. For example, the mounting tabs 491 may be centered vertically and each tab 491 may be spaced the same distance from the corresponding end of the first leg 493. Also, the circular opening 497 may be vertically on the second leg 495.

In this embodiment, the control system 412 includes a capacitive sensor_ that allows the system to recognize when the front cover 432 in installed and when it is removed (discussed in more detail below). This eliminates the need for any interlock magnet or magnetic field sensor used to determine presence of the front cover as discussed above in connection with ATS 10.

As noted above, ATS 410 includes prefilter 4100, particulate filter 4102 and carbon filter 4104. Like ATS 10, the filters are secured in ATS 410 by a filter retainer assembly 450 incorporated into the particulate filter 4102. More specifically, the filters are installed by fitting the carbon filter 4104 into carbon filter seat in the filter housing 4112, fitting the particulate filter 4102 into the particulate filter seat in the filter housing 4112 over the carbon filter 4104, securing the particulate filter 4102 using the filter retainer assembly 450 and affixing the prefilter 4100 to the particulate filter 4102. In this embodiment, the filter retainer assembly 450 differs somewhat from the filter retainer assembly 50 discussed above in connection with ATS 10. In this embodiment, the bottom of the particulate filter 4102 is held by a catch 452 that is fitted into a void 4120 in the filter housing 4112, and the top is held by a clip 454 (or latch) that interlocks with a locking protrusion 4126 extending from the filter housing 4112. FIGS. 52A-D illustrate the process of removing the particulate filter 4102 from the ATS 410. FIG. 52A shows the particulate filter 4102 installed with the clip 454 in the closed position. FIG. 52B shows the particular filter 4102 installed with the clip 454 rotated into the open position. FIG. 52C shows the top of the particulate filter 4102 tilted away from the ATS 410. The tilting movement of the filter 4102 also disengages (or largely disengages) the catch 452 from the void 4120. FIG. 52D shows the particulate filter 4102 removed from the ATS 410. In the illustrated embodiment, the clip 454 is configured to draw the particulate filter 4102 tightly into the filter housing 4112 as it is closed. This helps to compress a face seal (not shown) on the particulate filter 4102 against shoulder 4114 to facilitate an airtight seal.

Figure 51A:
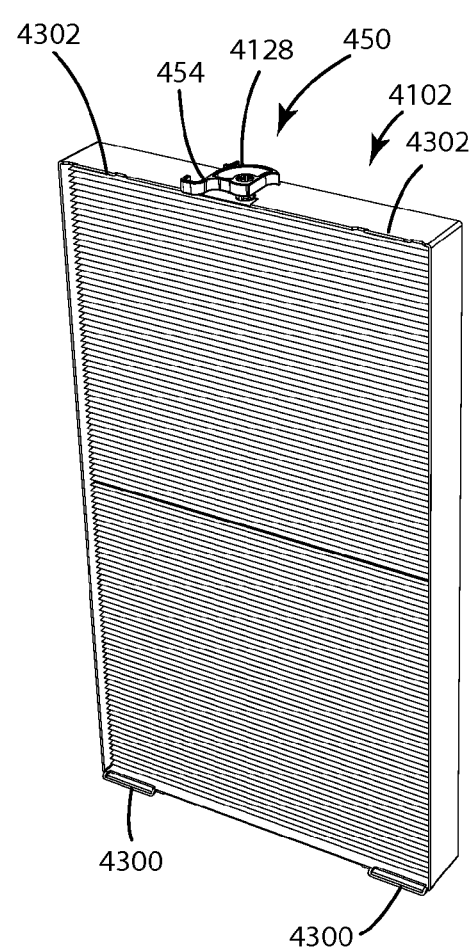
FIG. 51A is a perspective view of the particulate filter.

Referring now to FIGS. 51A-C, the catch 452 is disposed at the bottom center of the frame of the particulate filter 4102. The catch 452 of this embodiment is molded integrally with the frame of the particulate filter 4102, but it may alternatively be formed separately and affixed to the frame. The catch 452 of the illustrated embodiment has a quarter-round cross-section that may facilitate installation and removal from a corresponding void 4120 in the filter housing 4112. The number, size, shape and configuration of the catch 452 and void 4120 may vary from application to application as desired.

In this embodiment, the clip 454 is rotatably mounted near the top center of the frame of the particulate filter 4102. The clip 454 includes a handle 4122, a tooth 4130 and a hook 4124. The tooth 4130 is configured to engage the locking pin 4128 as the clip 454 is rotated into the closed position. More specifically, interference between the tooth 4130 and the locking pin 4128 causes the clip 454 to snap lock into the closed position. Further, the hook 4124 is configured to engage the locking protrusion 4126 as the clip 454 is rotated into the closed position. In the illustrated embodiment, the location and configuration of the hook 4124 and the locking protrusion 4126 are selected so that the clip 454 provides a cam-like function that pulls the particulate filter 4102 into the filter housing 4112 as the clip 454 is closed. Operation of the clip 454 is shown in FIGS. 53A-D. In FIG. 53A, the clip 454 is shown in the open position with the hook 4124 disengaged from the locking protrusion 4126. FIG. 53B shows the clip 454 rotated clockwise into a partially closed position. FIG. 53C shows the clip 454 rotated further clockwise into a position in which the tooth 4130 is about to engage the locking pin 4128. Finally, FIG. 53D shows the clip 454 in the closed position. As can be seen, the tooth 4130 has moved past the locking pin 4128 and now resists movement of the clip 454 out of the closed/locked position. Also, the hook 4124 has moved into engagement with the locking protrusion 4126. Interaction between the hook 4124 and the locking protrusion 4126 pulls the particulate filter 4102 fully into the filter housing 4112.

In this embodiment, the prefilter 4100 is secured to the particulate filter 4102 using a somewhat different configuration than incorporated into ATS 10. As shown in FIG. 34, the prefilter frame 4116 includes a pair of tabs 4304 on the bottom and a pair of slotted tabs 4306 on the top. As shown in FIGS. 51A-C, the particulate filter 4102 includes a pair of slotted feet 4300 on the bottom and a pair of fingers 4302 on the top. The fingers 4302 may be configured to snap-lock into engagement with the slotted tabs 4306. For example, the fingers 4302 may be angled upwardly from the particulate filter frame. In use, the prefilter 4100 is secured to the particular filter 4102 by first inserting the tabs 4304 on the bottom of the prefilter frame 4116 into the slots in feet 4300 on the bottom of the particulate filter 4102 and then tilting the top of the prefilter 4100 inwardly toward the top of the particulate filter 4102 to snap fit the slotted tabs 4306 over the fingers 4302 on the top of the particulate filter 4102.

Control System

ATS 410 includes a control system 412 that controls operation of the ATS 410 and provides a user interface for displaying information and receiving input from the operator. The primary functions of the control system 412 are to control the speed at which the ATS 410 operates to treat air based on sensed parameters or operator input, to track the usage of filters, to notify the operator of the mode, motor speed setting and filter life and to accept operator commands. The control system 412 includes a user interface that is implemented as a "dead front" display 416 that displays information and receives operator input relevant to operation and maintenance of the system. The display 416 includes a plurality of display elements 418 that are visible only when illuminated to provide a dynamic display that varies to provide information and to present control options that are available at any given time (Compare FIGS. 40 and 41). As with display 16 discussed above, the display 416 of ATS 410 includes informative display elements 418$a$ that are illuminated to provide information regarding the status of the ATS or a monitored characteristic, and input display elements 418$b$ that incorporate a touch sensor to allow an operator to provide input to the control system 412 (See FIG. 41). In addition to allowing user input, input display elements 418$b$ may also provide information regarding the status of the ATS, such as mode of operation and blower speed. Display 416 includes essentially the same display elements 418 as display 16 discussed above, except that the display elements 418 are positioned differently and display 416 include one additional display element to show when the display 416 is using an integrated WiFi transceiver to communication with an external network.

The control subsystem 460 includes control circuitry and firmware that is configured to operate the ATS 410 and to coordinate the collection of data from various other subsystems, including the capacitive touch sensor array 464, the dust sensor 480, the RFID subsystem 468 and the wireless communication subsystem 470. The various modes of operation of the system are described in more detail below. Referring now to the schematic representation of FIG. 36, the electronics module 414 generally includes a distributed control arrangement with a primary application controller 510, a touch detection controller 512, an LED driver controller 514 and an RFID controller 516. The primary controller 510 is connected to the dust sensor 480, the RFID subsystem 468 (including the RFID controller 516 and an RFID antenna 518), the wireless communication subsystem 470 (including a Bluetooth module 520 and a WiFi module 522) and the electrical components that make up the display 416 (including the LED driver controller 514 and the touch detection controller 512). The primary controller 510 is also coupled to the blower motor power supply 530 to allow the primary controller 510 to control blower speed and in some application to receive feedback from the blower motor power supply 530. The primary application controller 510 is also coupled to a buzzer 524 for providing audible output, a UART header 526 for diagnostics and non-volatile memory, such as EEPROM 528, for storage of preprogrammed operational default values as well as historical operational data, such as the life of the filters, time of use, counters and other variables that might be used in connection with operation of the ATS 410. The touch detection controller 512 is electrically connected to the capacitive touch keys, which are defined by a plurality of capacitive traces 532, and to an ambient light sensor 534. In use, the touch detection controller 512 may monitor the capacitive traces and the ambient light sensor 534, and provide touch/proximity information and ambient light information to the primary application controller 510. The LED driver controller 514 is coupled to the LED array 462. In operation, the LED driver controller 514 may illuminate the individual LEDs in the LED array 462 in accordance with commands received from the primary application controller 510.

Figure 37:
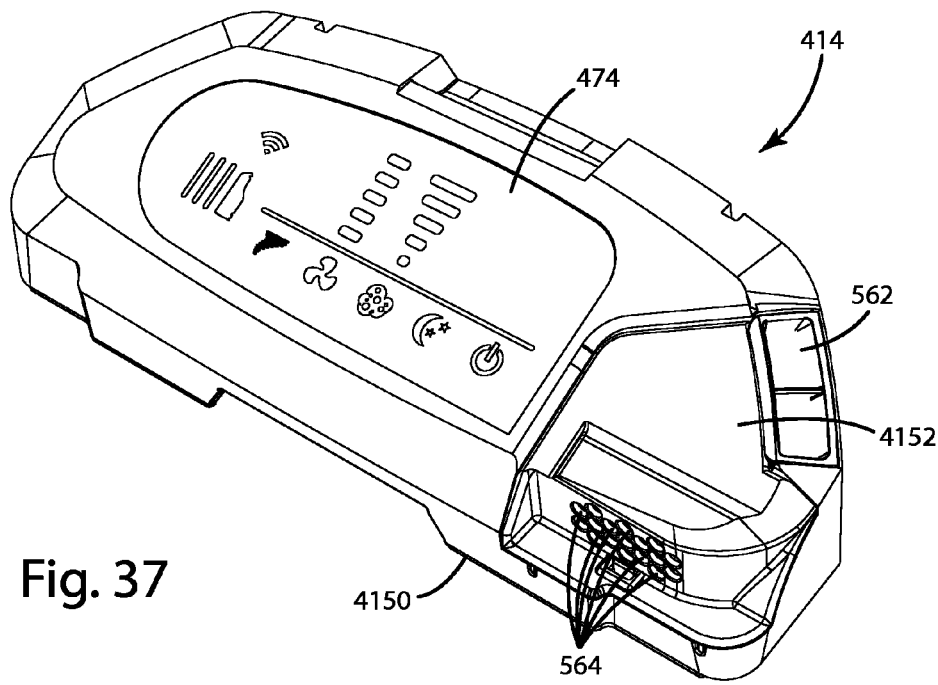
FIG. 37 is a perspective view of the display assembly of the alternative ATS.
Figure 38:
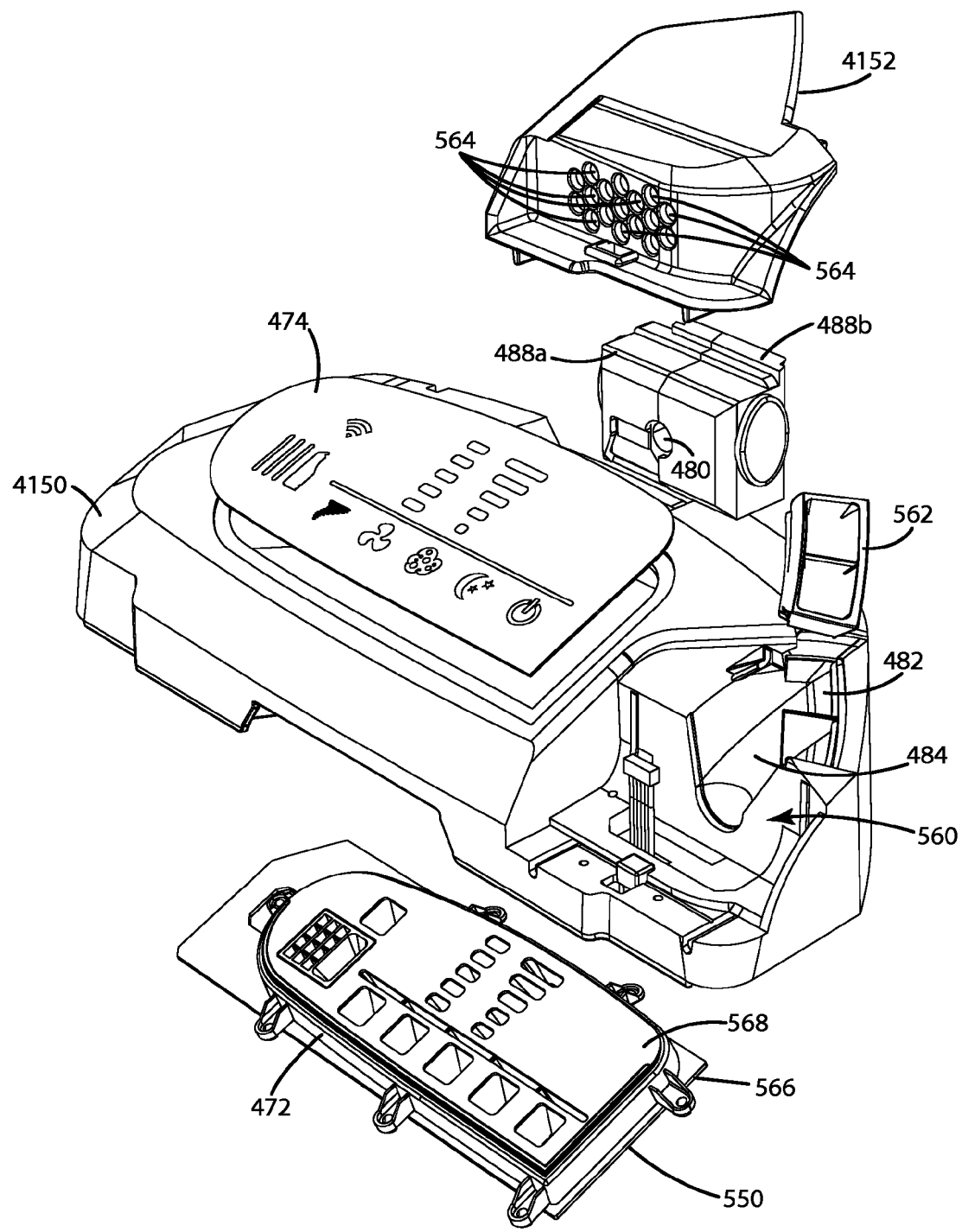
FIG. 38 is a partially exploded perspective view of the display assembly of the alternative ATS.
Figure 39:
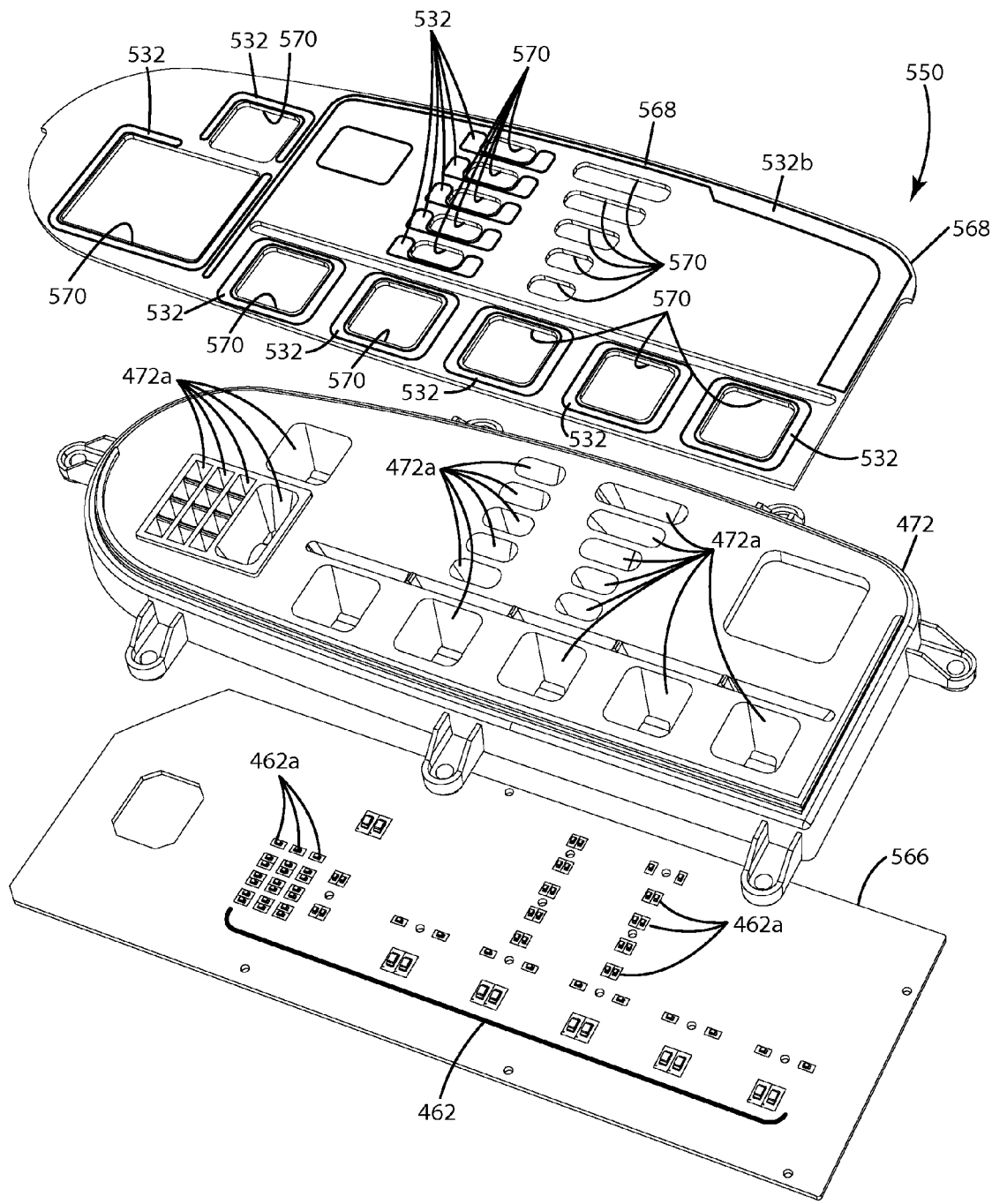
FIG. 39 is an exploded perspective view of the electronics module.

The control system 412 is incorporated into a self-contained electronics module 414. Referring now to FIGS. 37-39, the electronics module 414 for ATS 410 generally includes a base 4150, a dust sensor cover 4152, an electronics assembly 550 and a screen 474. In this embodiment, the base 4150 mounts to the filter housing 4112 and provides a structure on which the various components of the electronics module 414 are mounted. The base 4150 includes an electronics assembly seat (not shown) that allows the electronics assembly 550 to be mounted to the underside of the base 4150, for example, by screws (not shown) that extend through mounting tabs 552. The base 4150 also includes a dust sensor compartment 560 that seats the dust sensor 480 and provides a flow path to direct air over the dust sensor 480. The flow path generally includes a sensor inlet 482, a sensor tunnel 484 and a sensor outlet 486. The sensor inlet 482 may be closed by a dust sensor screen 562 to prevent large particles for fouling the dust sensor 480. The dust sensor 480 may be enclosed within a pair of rubber shell halves 488$a$ and 488$b$ that create a leaktight seal around the dust sensor 480. The dust sensor cover 4152 may define a plurality of air flow apertures 564 that allow air to flow out of the dust sensor compartment 560 to a position upstream from the particulate filter 4102. It should be noted that the dust sensor flow path is described for a system in which the partial vacuum created by the blower 456 draws air into the ATS 410 along the dust sensor flow path. Alternatively, air may flow through the dust sensor flow path in reverse if the air discharged through the air outlet 4108 by the ATS 410 creates a greater partial vacuum at the sensor inlet 482 than the blower creates at the air flow apertures 564 in the dust sensor cover 4152.

The electronics assembly 550 for ATS 410 generally includes a bottom PCB 566, a light guide 472 and a top PCB 568 (See FIG. 39). The bottom PCB 566 may support the bulk of the circuitry and circuit components, including the various controllers and the LED array 462. The LED array may include a plurality of individual LEDs 462a that can be selectively illuminated when appropriate. Each LED 462a may include a single LED or multiple LEDs that provide various illumination options. In this embodiment, each LED associated with the filter life display elements may include a red LED and a green LED; each LED associated with the ATS display element, the power display element and the line display elements may include a white LED; each LED associated with the blower speed display elements, the turbo mode display element, the WiFi display element and the dust sensor cloud sensor element may include a blue LED and a white LED; the LED associated with the first dust level display may include a red LED, a green LED and a yellow LED; each LED associated with the second and third dust levels may include a red LED and a yellow LED; each LED associated with the fourth and fifth dust levels may include a red LED and each LED associated with the night mode display element may include a red LED and a white LED. As with ATS 10, the LED array 462 may be replaced or supplemented with other types of light sources, such as OLED, laser and EL light sources.

The light guide 472 provides a mounting structure for the PCBs 566 and 568 and includes a plurality of light ducts 472a that convey light from the LED array 462 on the bottom PCB 566 through openings in the top PCB 568 to illuminate the display elements 418 on the screen 474. The light ducts 472a are configured to create light flow paths from the LEDs 462a to the corresponding display elements 418. The light ducts 472a may be isolated from one another to prevent bleeding of light from one LED 462a to an adjacent display element 418. The surfaces of the light ducts 472a may be coated or textured to create diffuse light.

The top PCB 568 is mounted atop the light guide 472. The top PCB 568 defines a plurality of light openings 570 and a plurality of traces 532 that are function as capacitive touch sensors. In this embodiment, the top PCB 568 includes a separate light opening 570 for each display element 418 (See FIGS. 38 and 39). The size, shape and configuration of the light openings 570 may vary from application to application depending, for example, on the desired lighting effect. As noted above, the control system 410 includes a plurality of capacitive touch sensors 464. The design and configuration of the capacitive touch sensors may vary from application to application. For example, each capacitive touch sensors may include a pair of electrodes and touches may be recognized by monitoring mutual capacitance between the electrode pair. As another example, each capacitive touch sensor may include a single electrode and touches may be recognized by monitoring the self-capacitance of the electrode. Referring now to FIG. 39, a trace 532 (or pair of traces) extends around each light opening 570 that is associated with an input display element 418b. More specifically, a conductive trace 532 (or pair of traces), such as a copper conductive element is provided about the periphery of each light opening 570 associated with an input display element 418b. The size, shape, extent and other aspects of the configuration of each conductive trace 532 may vary from application to application to provide the desired touch senor characteristics. Additionally, the top PCB 568 may include an additional conductive trace 532b intended to sense proximity of a user. As shown in FIG. 39, the proximity sensor trace 532b may be a relatively large trace that extends along a significant portion of the top PCB 568. In use, the touch detection controller 512 may monitor the various conductive traces 532 to determine when a touch or proximity event occurs.

In this embodiment, the control system 412 includes a single screen 474 that covers all of the display elements 418. The screen 474 is a laminated structure that generally includes a diffusing layer and a masking layer. The diffusing layer diffuses light produced by the LEDs. The masking layer masks the light to create the desired graphic, including various opaque and translucent materials, such as inks, paints, films, and other adhesive layers. In the illustrated embodiment, the masking layer is disposed on the outer surface of the diffusing layer opposite the LEDs or other light source, but it may be located elsewhere, if desired. Although the diffusing layer and masking layer are part of a single laminated construction in the illustrated embodiment, they may alternatively be separate components. For example, they may be separately manufactured and positioned adjacent to one another during assembly of the display 416.

Figure 42:
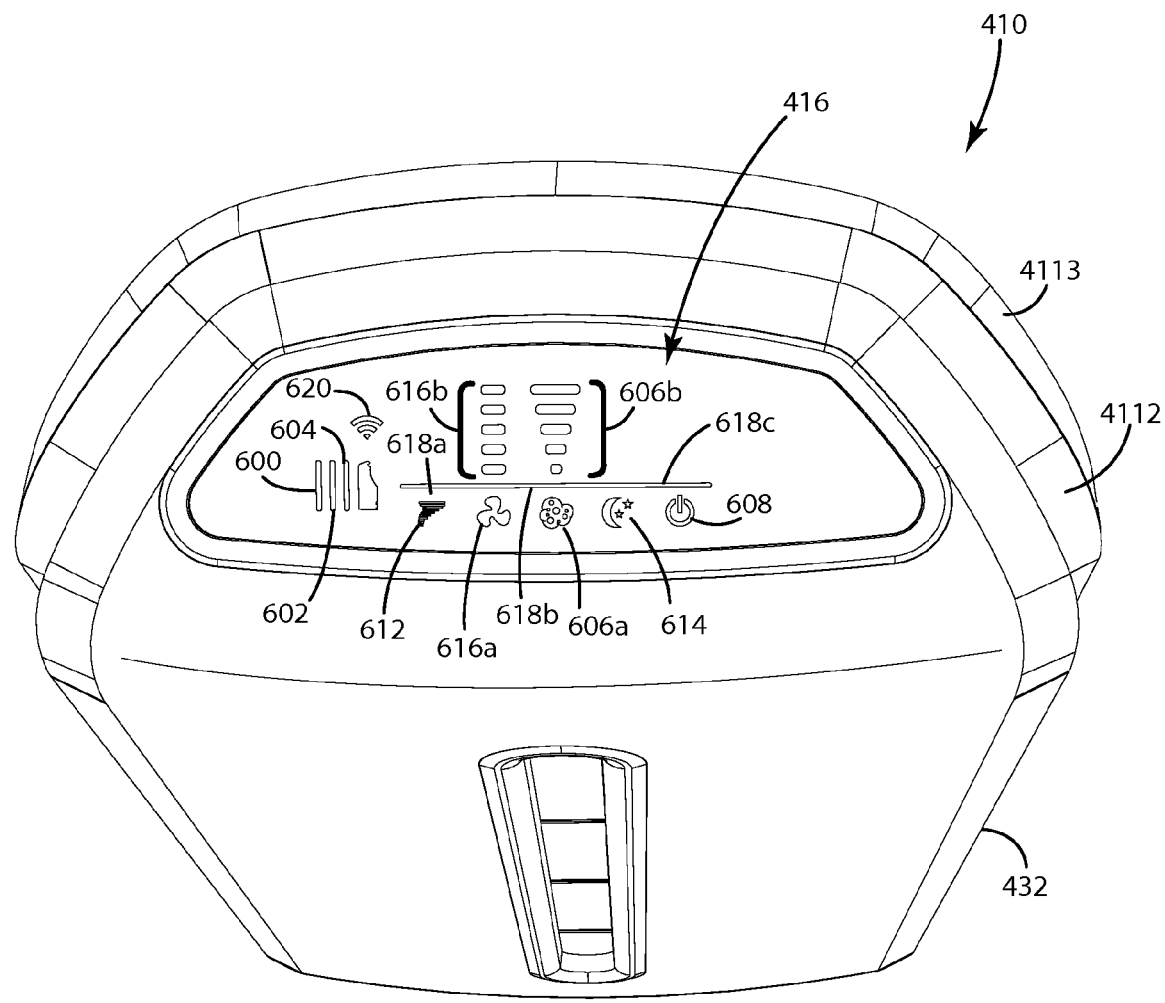
FIG. 42 is a top perspective view of the alternative ATS showing the "dead front" display with the outline of all display elements.
Figure 43:
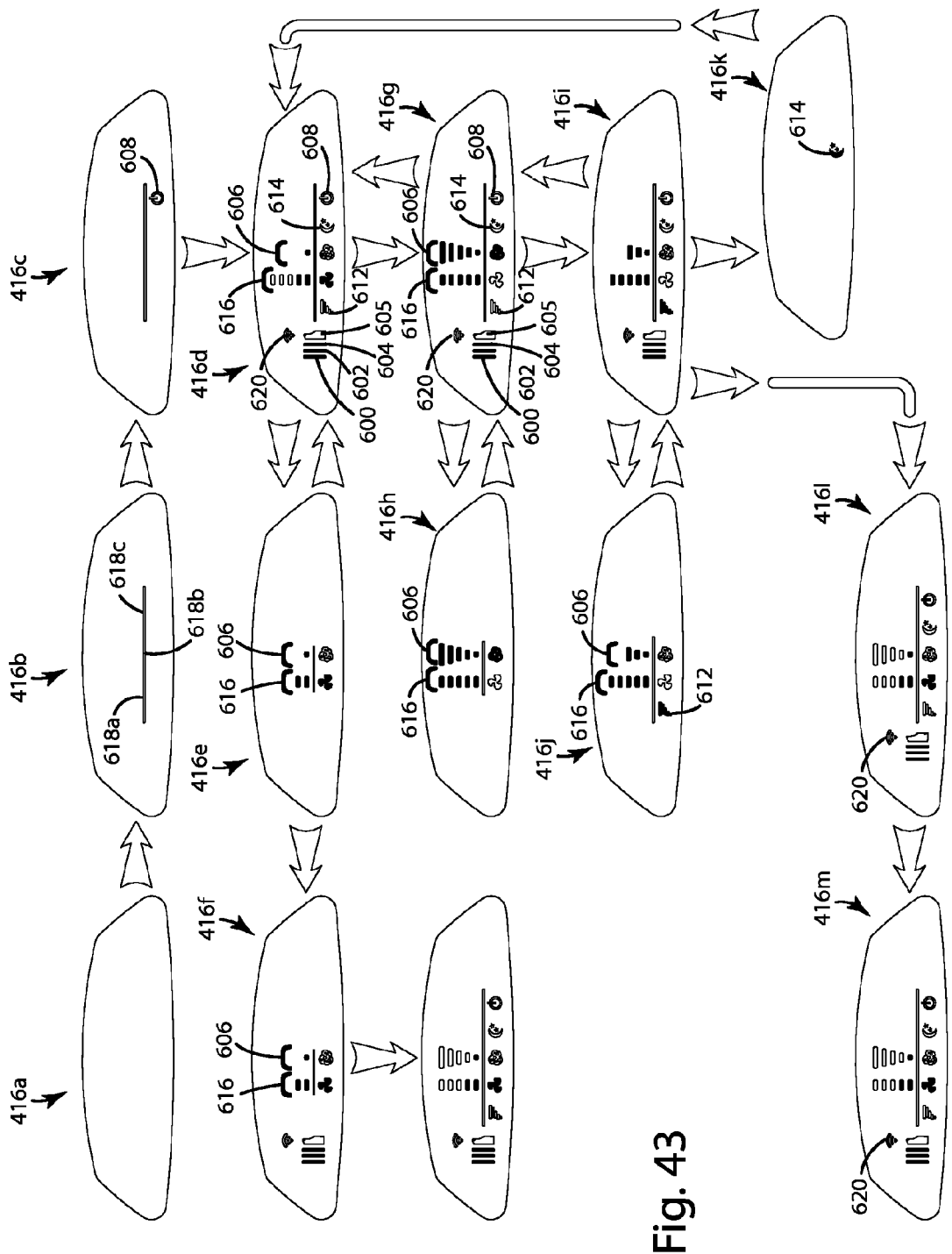
FIG. 43 is a schematic representation of a control scheme in accordance with an alternative embodiment.
Figure 44:
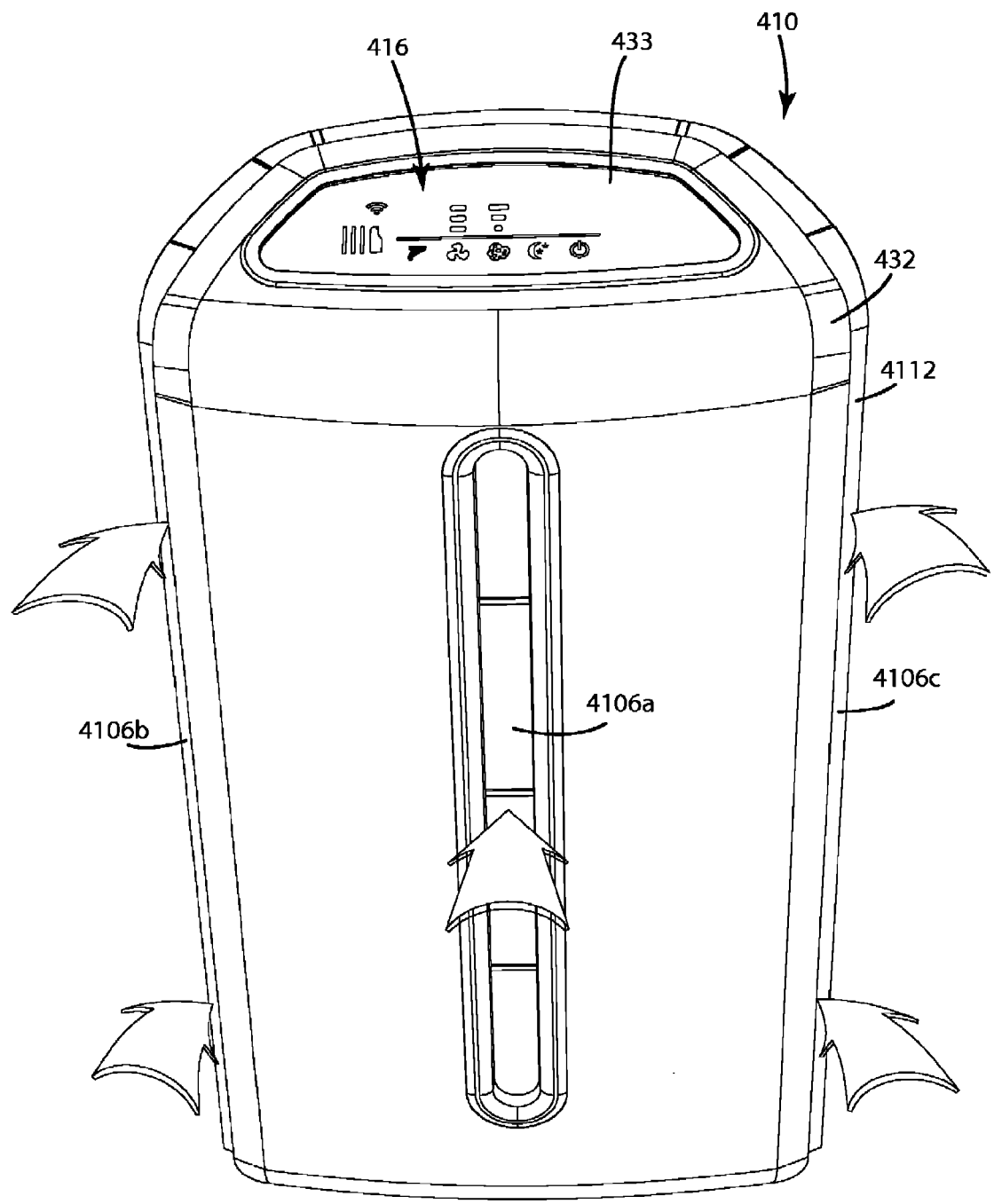
FIG. 44 is a front perspective view of the alternative ATS showing the air inlets.

Operation of the ATS 410 will now be described with reference to FIGS. 42 and 43. FIG. 42 is an illustration of the display 416 showing the outline of all display elements 418, including informative display elements 418a and input display elements 418b. FIG. 43 shows a series of illustrations of the display 416a-m in different modes of operation. In the illustrated embodiment, the display 416 can be in three different states when powered off. When the ATS 410 is unplugged or is otherwise not receiving power, the display is entirely blank as shown by display 416a. When the ATS 410 is plugged in, but not powered and no user is proximate, display elements 618a-c are illuminated to display a line across the display 416, as shown by display 416b. When the ATS 410 is plugged in, but not powered and a user is proximate, display elements 618a-c and 608 are illuminated to display a line and a power icon, as shown by display 416c.

The control system 412 may determine a user is proximate by monitoring capacitive trace 532b. The control system 412 and proximity trace 532b may be configured to determine when a user is proximate using a variety of alternative approaches. In the illustrated embodiment, the control system 412 and proximity trace 532b are configured to determine that a user is in proximity when the user comes within approximately twelve inches of the trace 532b, for example, by waving the user's hand over the display 416 within about twelve inches of the window 433. The size, shape and configuration of the trace 532b and/or the sensitivity of the control system 412 to changes sensed in the trace 532b may be varied to increase or decrease how close a user must be for the system to conclude that a user is proximate. The control system 412 may determine that a user is not proximate based on the passage of time after the display 416 has received user input. For example, the control system 412 may reset a countdown timer each time that user input event occurs. A user input event may occur each time that a user touches a touch key trace 532 or each time that a user comes within sufficient proximity of the proximity trace 532b. If the countdown timer reaches zero, the control system 412 will conclude that no user is proximate and adjust the display 416 accordingly. The control system 412 may then begin continue to monitor the proximity trace 532b to determine when a user comes back within sufficient proximity to the display 416. In addition, the control system 412 may also conclude that a user is in proximity if a touch key trace 532 is touched by a user.

Once powered on, the display 416 is capable of operating in a variety of alternative states. When the ATS 410 is in the manual mode and a user is proximate, all of the display elements are illuminated as appropriate, as shown by display 416d. Display elements 618a-c are illuminated to show the line. Display element 608 is illuminated to show the power icon. Display element 614 is illuminated to show the night mode icon. Because the ATS 410 is not in night mode, display element 614 is illuminated white. Display element 606, including the dust icon 606a and appropriate dust level indicators 606b are illuminated. Because the ATS 410 is not in auto mode, the dust icon 606a is illuminated white. Also, because the dust level is sufficiently low, only a single dust level indicator 606b is illuminated, and it is illuminated green. Display element 616, including the blower icon 616a and appropriate blower speed indicators 616b are illuminated. Because the ATS 410 is in manual mode, the blower icon 616a is illuminated blue. All of the blower speed indicators 616b are illuminated with the indicators representing actual blower speed illuminated blue and available higher blower speeds illuminated white. Display element 612 is illuminated white to indicate that the ATS 410 is not in turbo mode. The filter life display elements 600, 602, 604, including the ATS icon 605, are illuminated. In this example, all of the filters have remaining life and are therefore illuminated green. The ATS icon 605 is illuminated white. Finally, the display element 620 is illuminated to display the WiFi icon. In this example, no WiFi transfer is occurring so the WiFi icon is illuminated white. When the operator is no longer in proximity, the display 416 transitions to a diminished state, showing significantly fewer display elements. Referring now to display 416e, display element 618b is illuminated to show a central portion of the line. Display element 606, including the dust icon 606a and appropriate dust level indicators 606b are illuminated. Display element 616, including the blower icon 616a and appropriate blower speed indicators 616b are illuminated. In this state, only the blower speed indicators representing actual blower speed are illuminated blue. The available higher blower speeds are not illuminated. If any of the filters are expired, the display will also show the filter life display elements 600, 602, 604, including the ATS icon 605. In the example shown in display 416f, the prefilter icon 600 is illuminated green to indicate it has remaining life, the particulate filter icon 602 and carbon filter icon 604 are illuminated red to indicate they are expired and the ATS icon is illuminated white.

An operator can place the ATS 410 in auto mode by touching the dust sensor icon 606a. When the ATS 410 is in auto mode and a user is proximate, all of the display elements are illuminated as appropriate, as shown by display 416g. Display elements 618a-c are illuminated to show the line. Display element 608 is illuminated to show the power icon. Display element 614 is illuminated white to show the night mode icon. Display element 606, including the dust icon 606a and appropriate dust level indicators 606b are illuminated. Because the ATS 410 is in auto mode, the dust icon 606a is illuminated blue. Also, because the dust level is at the highest display level, all of the dust level indicators 606b are illuminated red. Display element 616, including the blower icon 616a and appropriate blower speed indicators 616b are illuminated. Because the ATS 410 is in auto mode, the blower icon 616a is illuminated white. The blower speed indicators 616b representing actual blower speed are illuminated blue. In this example, the blower is operating at maximum speed so all indicators are illuminated blue. Display element 612 is illuminated white to indicate that the ATS 410 is not in turbo mode. The filter life display elements 600, 602, 604, including the ATS icon, are illuminated. In this example, all of the filters have remaining life and are therefore illuminated green. The ATS icon is illuminated white. Finally, the display element 620 is illuminated to display the WiFi icon. In this example, no WiFi transfer is occurring so the WiFi icon is illuminated white. When the operator is no longer in proximity, the display 416 transitions to a diminished state, showing significantly fewer display elements. Referring now to display 416h, display element 618b is illuminated to show a central portion of the line. Display element 606, including the dust icon 606a (blue) and appropriate dust level indicators 606b (red) are illuminated. Display element 616, including the blower icon 616a (white) and appropriate blower speed indicators 616b (blue) are illuminated. If any of the filters are expired, the display 416 will also show the filter life display elements 600, 602, 604, including the ATS icon 605 (See, for example, FIG. 416f).

An operator can activate turbo mode by touching the turbo icon. When the ATS 410 is in the turbo mode and a user is proximate, all of the display elements are illuminated as appropriate, as shown by display 416i. Display elements 618a-c are illuminated to show the line. Display element 608 is illuminated white to show the power icon. Display element 614 is illuminated white to show the night mode icon. Display element 606, including the dust icon 606a (white) and appropriate dust level indicators 606b are illuminated. Because the dust level is moderate, three dust level indicators are illuminated yellow. Display element 616, including the blower icon 616a (white) and appropriate blower speed indicators 616b are illuminated. Because the ATS 410 is in turbo mode, the blower is operating at maximum speed and all indicators 616b are illuminated blue. Display element 612 is illuminated blue to indicate that the ATS 410 is in turbo mode. The filter life display elements 600, 602, 604, including the ATS icon 605, are illuminated. In this example, all of the filters have remaining life and are therefore illuminated green. The ATS icon is illuminated white. Finally, the display element 620 is illuminated to display the WiFi icon. In this example, no WiFi transfer is occurring so the WiFi icon is illuminated white. When the operator is no longer in proximity, the display 416 transitions to a diminished state, showing significantly fewer display elements. Referring now to display 416j, display elements 618a and 618b are illuminated to show the left and central portions of the line. Display element 606, including the dust icon 606a (white) and appropriate dust level indicators 606b (yellow) are illuminated. Display element 616, including the blower icon 616a (white) and appropriate blower speed indicators 616b (blue) are illuminated. Display element 612 is illuminated blue to indicate that the ATS 410 is in turbo mode. If any of the filters are expired, the display 416 will also show the filter life display elements 600, 602 and 604, including the ATS icon 605 (See, for example, display 416l.

The ATS 410 can be placed in night mode by touching the night mode icon. When in night mode, the display 416 shows only the night icon 614 illuminated red as illustrated in display 416k. When in night mode, the control system 412 limits the maximum speed of the blower 456 and slows down the rate at which the blower 456 transitions from one speed to another. The control system 412 may be configured to implement other features when in the night mode. In this embodiment, the control system 412 may operate in the manual or auto modes when in night mode. For example, the user may touch the night mode icon 614 while the control system 412 is in either manual mode or auto mode, and the control system 412 will transition to the night mode while otherwise continuing to operate the blower 456 in accordance with the existing mode. When transitioning to night mode from manual mode, the control system 412 will continue to operate the blower 456 at the manually specified speed, unless the manually set speed is above the maximum speed threshold. If so, the control system 412 reduces blower speed to match the maximum speed threshold for night mode. When transitioning to night mode from auto mode, the control system 412 allows the automatic speed control algorithms to control blower speed, except that the control system 412 does not allow the blower speed to exceed the maximum speed threshold and changes from one blower speed to another occur at a slower transition rate.

The ATS 410 may also have the ability to connect to an external application using WiFi or other wireless communications systems. To enter wireless communication mode, the operator may touch the WiFi icon (display element 620). While the ATS 410 attempts to establish a wireless connection, display element 620 may be illuminated blue in a flashing pattern, as shown by display 416*l*. Once a connection in established and while the ATS 410 remains in wireless communication mode, the flashing may terminate and the display element 620 may be illuminated blue, as shown by display 416*m*. In this embodiment, wireless communications can be employed during any mode of operation and the control system 412 may continue to operate the display 416 in accordance with the existing mode of operation. Wireless communications may be used to transfer relating to operation of the ATS 410 to a remote location, such as filter life data for the various filters, speed and time of operation of the blower motor and dust sensor readings over time. Wireless communications may also be used to send diagnostic information, including data that might allow individuals at a remote location to assess operation of the ATS 410 to determine whether maintenance or repair is necessary. Further, wireless communications may be used to update firmware and/or any other programming or data contained within the control system 412.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. An air treatment system comprising:
   a flow path including an inlet, a filter housing and an outlet;
   a plurality of filters arranged in said filter housing along said flow path;
   a blower for moving air through said flow path and said plurality of filters; and
   a self-contained electronics module including control circuitry, a user interface, and a dust sensor with a sensor duct to communicate air flow to said dust sensor, said self-contained electronics module being a complete unit capable of testing and calibration prior to installation within the air treatment system.

2. The air treatment system of claim 1 wherein said user interface includes a dead front display having a plurality of light sources, a screen defining a plurality of display icons and a light duct array guiding light from said light sources to said display icons.

3. The air treatment system of claim 2 further including a front cover, said front cover covering said filters and said display, said front cover including a translucent portion allowing said display to be viewed through said front cover.

4. The air treatment system of claim 3 wherein said translucent portion is a translucent window.

5. The air treatment system of claim 2 wherein said display includes a plurality of display elements, said control circuitry configured to provide a dynamic display by selectively illuminating different sets of said display elements depending on the operating mode of the air treatment system.

6. The air treatment system of claim 2 wherein said dead front display includes a plurality of touch sensors.

7. The air treatment system of claim 6 wherein each of said touch sensors is a capacitive touch sensor.

8. The air treatment system of claim 7 wherein each of said touch sensors includes a transparent capacitive film.

9. The air treatment system of claim 6 wherein each of said touch sensors includes a trace disposed on a circuit board.

10. The air treatment system of claim 3 wherein said electronics module includes a housing supporting said screen, said front cover engaged with said housing, said engagement between said front cover and said housing providing registration between said translucent portion and said screen.

11. The air treatment system of claim 1 wherein said dust sensor includes an inlet in communication with said flow path, said inlet being disposed in said flow path upstream from said filters, whereby air is drawn through said dust sensor by said blower and is treated before being discharged through said outlet.

12. The air treatment system of claim 11 wherein said electronics module includes a housing supporting said screen, said dust sensor including a dust sensor inlet mounted in said housing and exposed to the environment.

13. The air treatment system of claim 2 wherein said display includes a filter life display, a blower speed display and a dust level display.

14. The air treatment system of claim 3 wherein each of said display elements includes a light source, a light duct and a screen, said screen including a masking layer and a diffusing layer, said light source being of sufficient brightness to shine through said translucent portion when illuminated, said translucent portion presenting an opaque appearance when said light source is not illuminated.

15. The air treatment system of claim 4 wherein each of said display elements includes a light source, a light duct and a screen, said screen including a masking layer and a diffusing layer, said light source being of sufficient brightness to shine through said translucent window when illuminated, said screen being hidden by said translucent window when said light source is not illuminated.

16. The air treatment system of claim 14 wherein at least one of said display elements includes a segment of capacitive film, said control circuitry capable of determining a touch based on measurements taken from said segment of capacitive film.

17. The air treatment system of claim 16 wherein said capacitive film is contained within said electronics module.

18. The air treatment system of claim 14 wherein at least one of said display elements includes a trace extending at least partially around said light duct for said display element, said control circuitry capable of determining a touch based on measurements taken from said trace.

19. The air treatment system of claim 16 wherein said control circuitry includes an interlock for determining when said front cover has been removed, said control circuitry recognizing a touch based on a comparison of a threshold against measurements taken from said segment of capacitive film, said control circuitry operating based on a first threshold when said front cover is present an a second threshold different from said first threshold when said front cover is removed.

20. The air treatment system of claim 19 wherein said interlock include a hall-effect sensor in said electronics module; and
wherein said front cover includes a magnet positioned to affect said hall-effect sensor when said front cover is installed.

21. The air treatment system of claim 18 wherein said control circuitry includes a capacitive sensor for determining when said front cover has been removed, said control circuitry recognizing a touch based on measurements taken from said traces, said control circuitry operating based on a first threshold when said front cover is present an a second threshold different from said first threshold when said front cover is removed.

22. The air treatment system of claim 1 further including an RFID reader/writer, said RFID reader/writer being positioned in said filter housing adjacent, said control circuitry configured to operate said RFID reader/writer to maintain filter life data on an RFID tag included in at least one of said filters.

23. The air treatment system of claim 22 wherein said control circuitry is configured to operate said RFID reader/writer to obtain a serial number from an RFID tag included in at least one of said filters.

24. The air treatment of claim 14 wherein said light source includes at least two light emitting elements, whereby each of said display elements is capable of being illuminated in at least two different states.

25. The air treatment system of claim 1 wherein said electronics module includes a wireless transceiver, said control circuitry capable of receiving operator input from a remote electronic device through said wireless receiver.

26. The air treatment system of claim 1 wherein said electronics module includes a wireless transceiver, said control circuitry capable of receiving operator input from a remote electronic device through said wireless receiver, said control circuitry capable of transmitting information regarding said air treatment system to a remote electronic device.

27. The air treatment system of claim 1 wherein said sensor duct communicates air flow from an air inlet to said self-contained electronics module through said self-contained electronics module to said dust sensor located within said self-contained electronics module.

28. The air treatment system of claim 1 wherein said self-contained electronics module is a replaceable unit.

29. The air treatment system of claim 1 wherein said self-contained electronics module is configured to be tested and calibrated prior to installation within said air treatment system.

30. The air treatment system of claim 1 whereby said self-contained electronics module includes all of the electronic components of the air treatment system except for the power supply components.

31. The air treatment system of claim 30 wherein said self-contained electronics module is calibratable and testable before installation and assembly of said air treatment system.

* * * * *

UNITED STATES PATENT AND TRADEMARK OFFICE
CERTIFICATE OF CORRECTION

PATENT NO. : 9,808,754 B2
APPLICATION NO. : 14/704105
DATED : November 7, 2017
INVENTOR(S) : William T. Stoner, Jr. et al.

Page 1 of 2

It is certified that error appears in the above-identified patent and that said Letters Patent is hereby corrected as shown below:

In the Claims

Column 36, Claim 5, Line 22:
"5. The air treatment system of claim 2 wherein said"
Should be:
-- 5. The air treatment system of claim 4 wherein said --

Column 36, Claim 10, Line 37:
"10. The air treatment system of claim 3 wherein said"
Should be:
-- 10. The air treatment system of claim 4 wherein said --

Column 36, Claim 14, Line 56:
"14. The air treatment system of claim 3 wherein each of"
Should be:
-- 14. The air treatment system of claim 5 wherein each of --

Column 36, Claim 15, Line 63:
"15. The air treatment system of claim 4 wherein each of"
Should be:
-- 15. The air treatment system of claim 5 wherein each of --

Column 38, Claim 25, Line 15:
"remote electronic device through said wireless receiver."
Should be:
-- remote electronic device through said wireless transceiver. --

Column 38, Claim 26, Line 19:
"remote electronic device through said wireless receiver, said"

Signed and Sealed this
Twenty-fourth Day of March, 2020

Andrei Iancu
*Director of the United States Patent and Trademark Office*

Should be:
-- remote electronic device through said wireless transceiver, said --